United States Patent
Sadalgi et al.

(10) Patent No.: US 12,444,109 B2
(45) Date of Patent: Oct. 14, 2025

(54) MACHINE LEARNING TECHNIQUES FOR GENERATING PRODUCT IMAGERY AND THEIR APPLICATIONS

(71) Applicant: Wayfair LLC, Boston, MA (US)

(72) Inventors: Shrenik Sadalgi, Cambridge, MA (US); Rachana Sreedhar, Boston, MA (US); Christian Vázquez, Revere, MA (US)

(73) Assignee: Wayfair LLC, Boston, MA (US)

( * ) Notice: Subject to any disclaimer, the term of this patent is extended or adjusted under 35 U.S.C. 154(b) by 154 days.

(21) Appl. No.: 18/288,334

(22) PCT Filed: Apr. 27, 2022

(86) PCT No.: PCT/US2022/026447
§ 371 (c)(1),
(2) Date: Oct. 25, 2023

(87) PCT Pub. No.: WO2022/232214
PCT Pub. Date: Nov. 3, 2022

(65) Prior Publication Data
US 2024/0212243 A1    Jun. 27, 2024

Related U.S. Application Data

(60) Provisional application No. 63/229,394, filed on Aug. 4, 2021, provisional application No. 63/180,831, filed on Apr. 28, 2021.

(51) Int. Cl.
*G06T 11/60* (2006.01)
*G06F 3/04847* (2022.01)
*G06Q 30/0601* (2023.01)

(52) U.S. Cl.
CPC .......... *G06T 11/60* (2013.01); *G06F 3/04847* (2013.01); *G06Q 30/0621* (2013.01); *G06Q 30/0643* (2013.01)

(58) Field of Classification Search
CPC .......... G06T 11/60; G06T 2207/20084; G06T 2200/24; G06T 2207/20081;
(Continued)

(56) References Cited

U.S. PATENT DOCUMENTS

2020/0356591 A1* 11/2020 Yada .................. G06F 3/04855

FOREIGN PATENT DOCUMENTS

WO    WO 2020/226750 A1    11/2020

OTHER PUBLICATIONS

International Search Report and Written Opinion for International Application No. PCT/US2022/026447 mailed Aug. 9, 2022.
(Continued)

*Primary Examiner* — William A Beutel
(74) *Attorney, Agent, or Firm* — Wolf, Greenfield & Sacks, P.C.

(57) ABSTRACT

Techniques for generating images of furniture and using the generated images for image-based search. The techniques include obtaining a first image depicting first furniture, generating, using the first image and a neural network model, a second image depicting second furniture different from the first furniture, searching for one or more images of furniture similar to the second furniture using the second image to obtain search results comprising a third image of furniture, and outputting the third image.

19 Claims, 32 Drawing Sheets

(58) Field of Classification Search
CPC ............ G06F 3/04847; G06Q 30/0621; G06Q 30/0643; G06Q 30/0623; G06N 3/045; G06N 3/047; G06N 3/08
See application file for complete search history.

(56) References Cited

OTHER PUBLICATIONS

Collins et al., Editing in style: Uncovering the local semantics of gans. Proceedings of the IEEE/CVF Conference on Computer Vision and Pattern Recognition 2020:5570-9.
Lewis et al., Vogue: Try-on by stylegan interpolation optimization. arXiv preprint arXiv:2101.02285. Jan. 6, 2021. 15 pages.

* cited by examiner

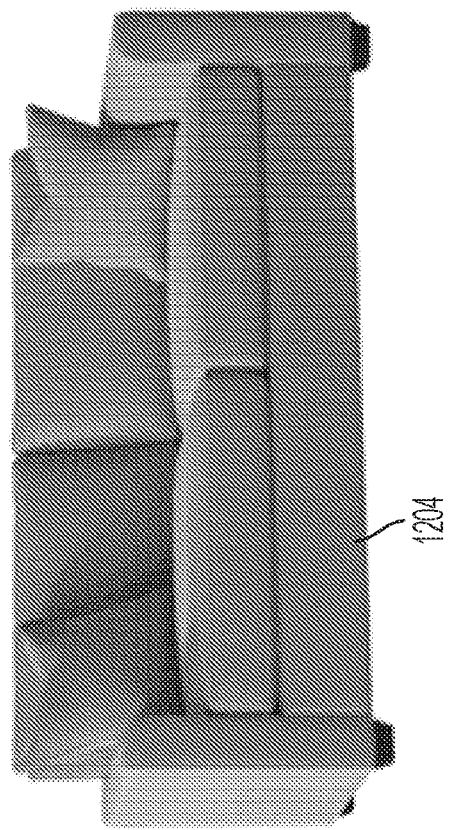
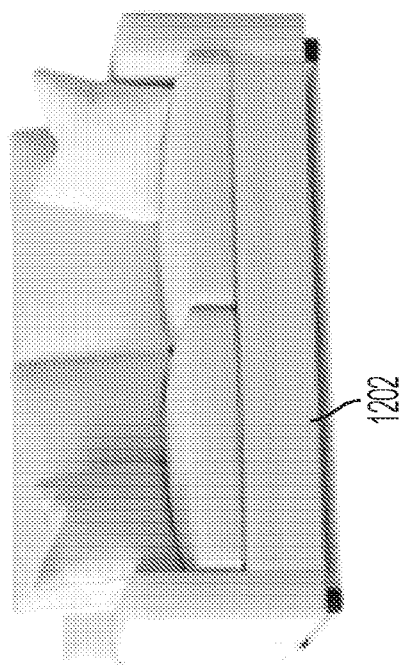
FIG. 12

 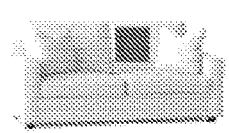 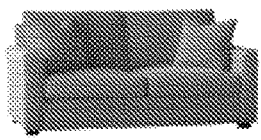 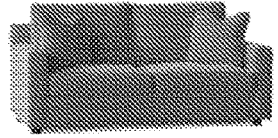
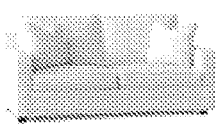 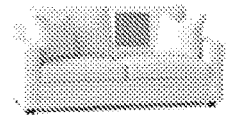  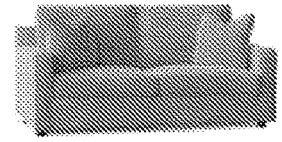
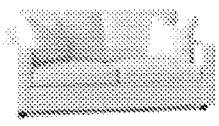 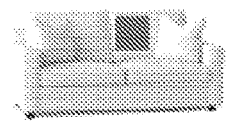  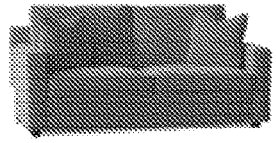
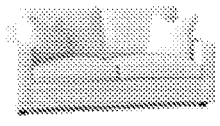 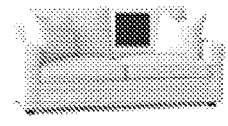 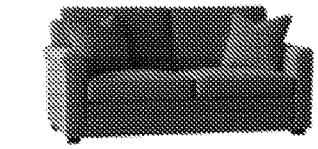 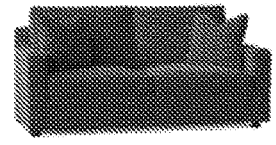
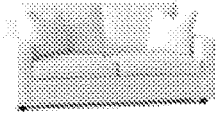 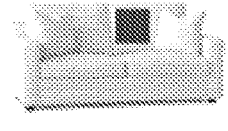 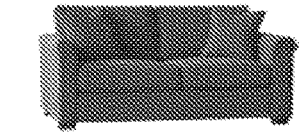 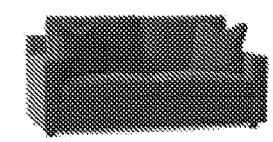
FIG. 22A   FIG. 22B   FIG. 22C   FIG. 22D

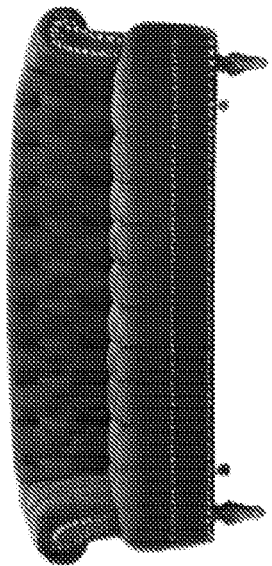
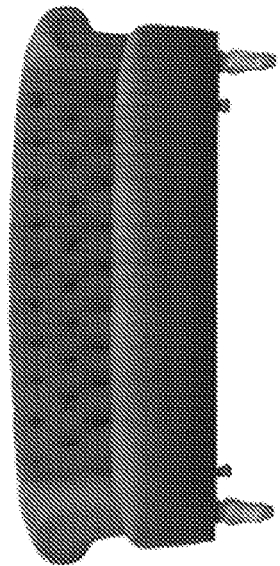
FIG. 24B
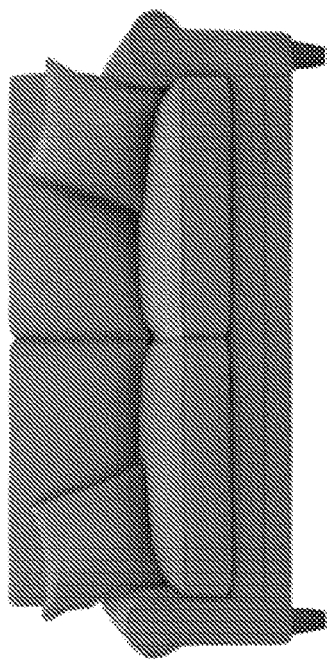
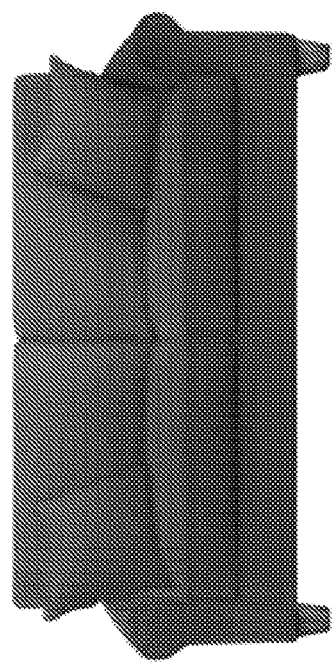
FIG. 24A

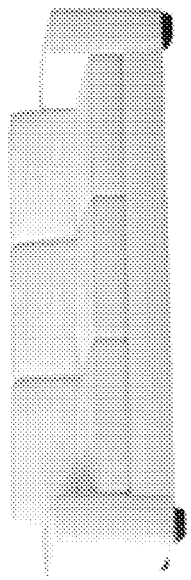
FIG. 24C
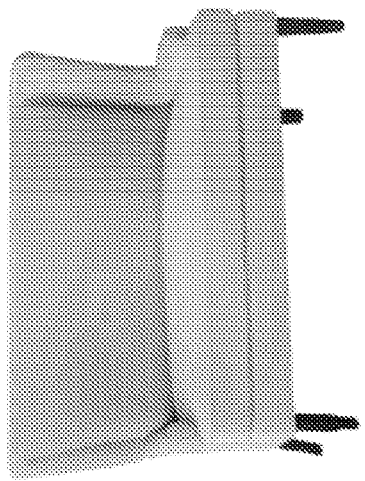
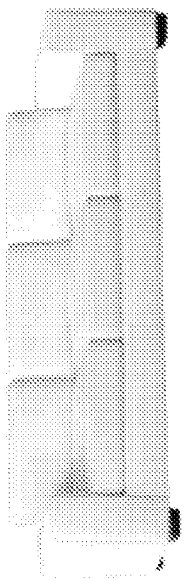
FIG. 24D
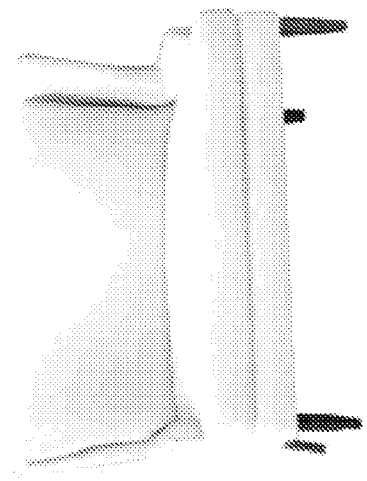

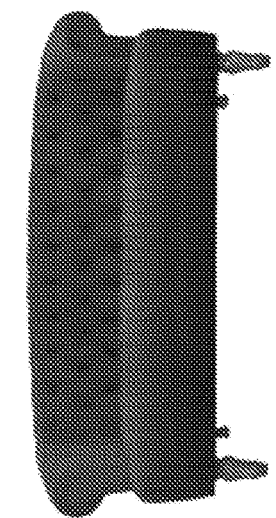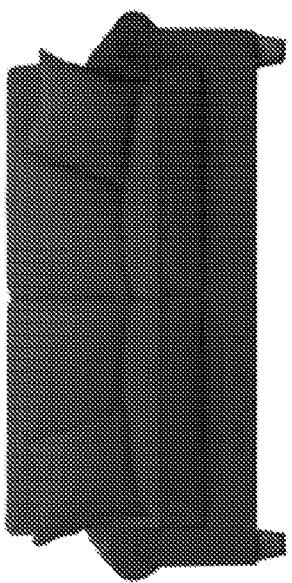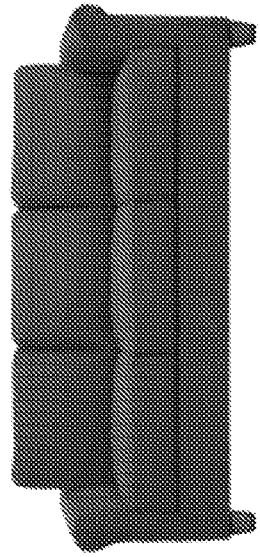
FIG. 24E
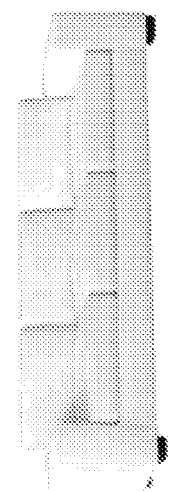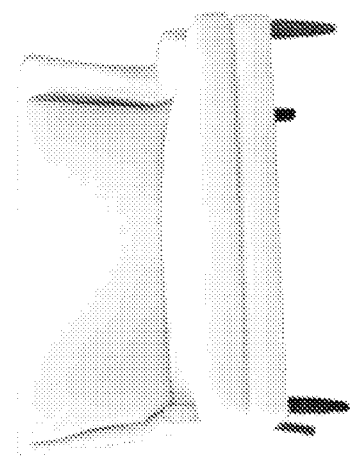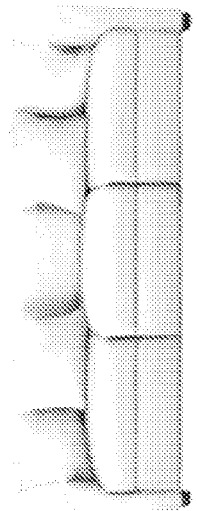
FIG. 24F

MACHINE LEARNING TECHNIQUES FOR GENERATING PRODUCT IMAGERY AND THEIR APPLICATIONS

CROSS-REFERENCE TO RELATED APPLICATIONS

This application is a national stage filing under 35 U.S.C. 371 of International Patent Application Serial No. PCT/US2022/026447, filed Apr. 27, 2022, which claims the benefit of U.S. Provisional Application No. 63/180,831, filed Apr. 28, 2021, entitled, "IMAGINARY FURNITURE: APPLYING GENERATIVE ADVERSARIAL NETWORKS TO E-COMMERCE," and U.S. Provisional Application No. 63/229,394, filed Aug. 4, 2021, entitled, "MACHINE LEARNING TECHNIQUES FOR GENERATING PRODUCT IMAGERY AND THEIR APPLICATIONS," the entire contents of these applications are incorporated herein by reference.

BACKGROUND

Online retailers primarily sell products (e.g., furnishings, appliances, toys, etc.) through a web-based computer interface. Customers may access the web-based interface using an Internet browser or dedicated computer software program (e.g., an "app" on a smartphone) to browse among products on sale, search for products of interest, purchase products, and have the products delivered to their homes.

Online retailers typically offer a wider range of products than brick-and-mortar retailers. For example, an online retailer may offer millions of different products, while the products offered by a brick-and-mortar retailer may number in the hundreds or low thousands.

SUMMARY

Some embodiments provide for a method, comprising using at least one computer hardware processor to perform: obtaining an input image depicting first furniture; obtaining, using a graphical user interface, at least one user selection indicative of a change in at least one furniture characteristic; and generating, using a neural network model, the input image, and the at least one user selection, an output image depicting second furniture different from the first furniture.

Some embodiments provide for a system comprising: at least one computer hardware processor; at least one non-transitory computer-readable storage medium storing processor-executable instructions that, when executed by the at least one computer hardware processor, cause the at least one computer hardware processor to perform: obtaining an input image depicting first furniture; obtaining, using a graphical user interface, at least one user selection indicative of a change in at least one furniture characteristic; and generating, using a neural network model, the input image, and the at least one user selection, an output image depicting second furniture different from the first furniture.

Some embodiments provide for at least one non-transitory computer-readable storage medium storing processor-executable instructions that, when executed by at least one computer hardware processor, cause the at least one computer hardware processor to perform: obtaining an input image depicting first furniture; obtaining, using a graphical user interface, at least one user selection indicative of a change in at least one furniture characteristic; and generating, using a neural network model, the input image, and the at least one user selection, an output image depicting second furniture different from the first furniture.

Some embodiments provide for a method comprising using at least one computer hardware processor to perform: obtaining an input image depicting furniture; obtaining information indicative of a furniture characteristic not depicted in the input image; and generating an output image using a neural network model, the input image, and the information indicative of the furniture characteristic not depicted in the input image.

Some embodiments provide for a system comprising: at least one computer hardware processor; at least one non-transitory computer-readable storage medium storing processor-executable instructions that, when executed by the at least one computer hardware processor, cause the at least one computer hardware processor to perform: obtaining an input image depicting furniture; obtaining information indicative of a furniture characteristic not depicted in the input image; and generating an output image using a neural network model, the input image, and the information indicative of the furniture characteristic not depicted in the input image.

Some embodiments provide for at least one non-transitory computer-readable storage medium storing processor-executable instructions that, when executed by at least one computer hardware processor, cause the at least one computer hardware processor to perform: obtaining an input image depicting furniture; obtaining information indicative of a furniture characteristic not depicted in the input image; and generating an output image using a neural network model, the input image, and the information indicative of the furniture characteristic not depicted in the input image.

Some embodiments provide for a method for generating a furniture image by blending furniture images, the method comprising using at least one computer hardware processor to perform: obtaining a first image depicting first furniture having a first furniture characteristic; obtaining a second image depicting second furniture having a second furniture characteristic; and generating an output image using a neural network model, the first image and the second image, wherein the output image depicts third furniture different from the first furniture and the second furniture.

Some embodiments provide for a system comprising: at least one computer hardware processor; at least one non-transitory computer-readable storage medium storing processor-executable instructions that, when executed by the at least one computer hardware processor, cause the at least one computer hardware processor to perform a method for generating a furniture image by blending furniture images, the method comprising: obtaining a first image depicting first furniture having a first furniture characteristic; obtaining a second image depicting second furniture having a second furniture characteristic; and generating an output image using a neural network model, the first image and the second image, wherein the output image depicts third furniture different from the first furniture and the second furniture.

Some embodiments provide for at least one non-transitory computer-readable storage medium storing processor-executable instructions that, when executed by the at least one computer hardware processor, cause the at least one computer hardware processor to perform a method for generating a furniture image by blending furniture images, the method comprising: obtaining a first image depicting first furniture having a first furniture characteristic; obtaining a second image depicting second furniture having a second furniture characteristic; and generating an output image using a neural network model, the first image and the second image, wherein the output image depicts third furniture different from the first furniture and the second furniture.

Some embodiments provide for a method, comprising using at least one computer hardware processor to perform: obtaining a first image depicting first furniture; generating, using the first image and a neural network model, a second image depicting second furniture different from the first furniture; searching for one or more images of furniture similar to the second furniture using the second image to obtain search results comprising a third image of furniture; and outputting the third image.

Some embodiments provide for a system comprising: at least one computer hardware processor; at least one non-transitory computer-readable storage medium storing processor-executable instructions that, when executed by the at least one computer hardware processor, cause the at least one computer hardware processor to perform: obtaining a first image depicting first furniture; generating, using the first image and a neural network model, a second image depicting second furniture different from the first furniture; searching for one or more images of furniture similar to the second furniture using the second image to obtain search results comprising a third image of furniture; and outputting the third image.

Some embodiments provide for at least one non-transitory computer-readable storage medium storing processor-executable instructions that, when executed by the at least one computer hardware processor, cause the at least one computer hardware processor to perform: obtaining a first image depicting first furniture; generating, using the first image and a neural network model, a second image depicting second furniture different from the first furniture; searching for one or more images of furniture similar to the second furniture using the second image to obtain search results comprising a third image of furniture; and outputting the third image.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 12 shows an example of a real sofa (left) and an image (right) generated by a neural network from a point in the latent space of the neural network that was identified using the image of the real sofa, in accordance with some embodiments of the technology described herein.

FIGS. 22A and 22B respectively show examples of input images and the input images overlaid with images showing desired furniture characteristics (different colors, in this example), in accordance with some embodiments of the technology described herein.

FIGS. 22C and 22D show examples of output images generated from input images shown in FIG. 22A and the images shown in FIG. 22B, in accordance with some embodiments of the technology described herein.

FIGS. 24A-D each show multiple example training images depicting furniture in a respective style, in accordance with some embodiments of the technology described herein.

FIGS. 24E-F each show multiple example training images depicting furniture in a respective color, in accordance with some embodiments of the technology described herein.

DETAILED DESCRIPTION

Figure 1:
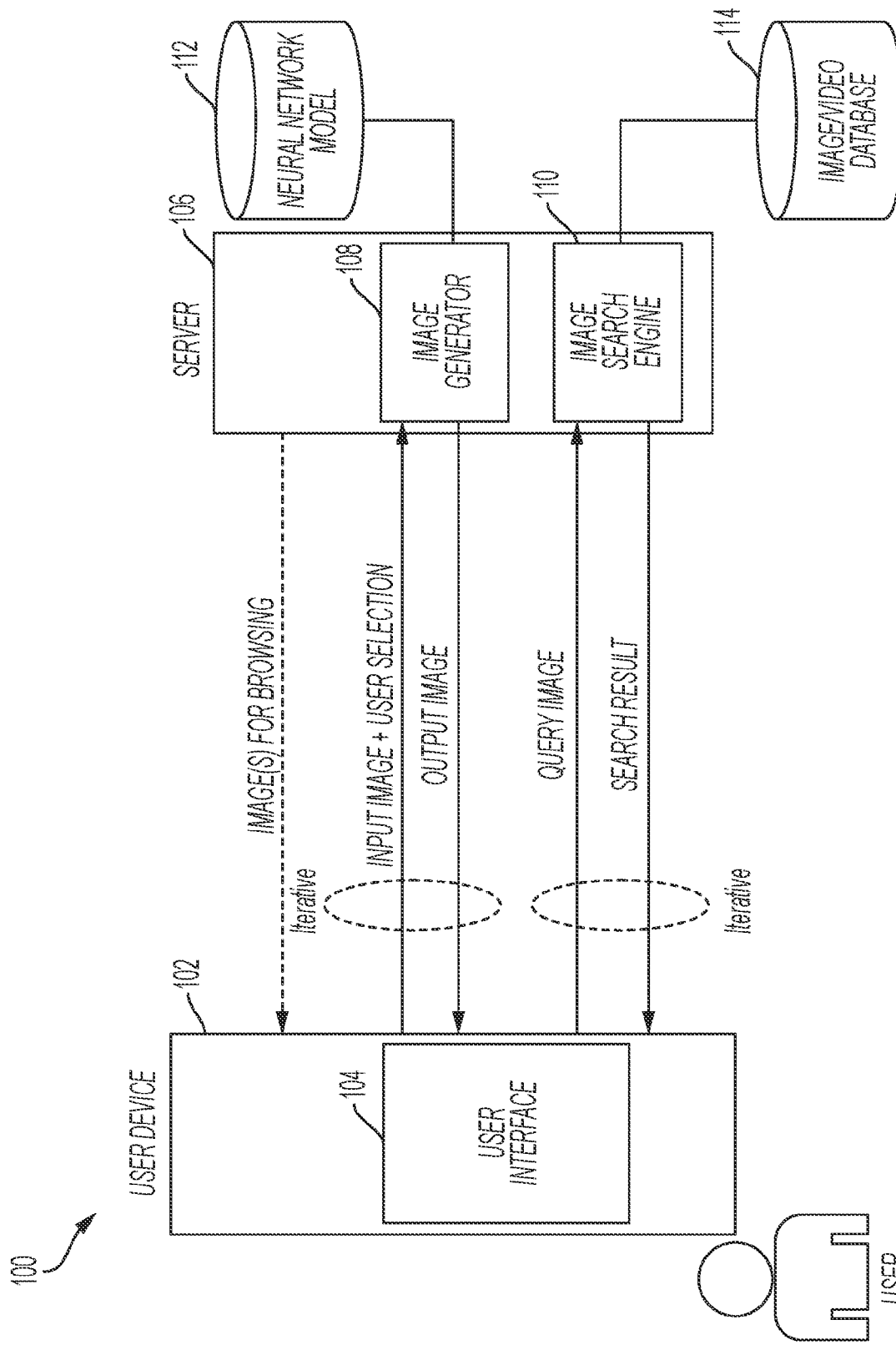
FIG. 1 shows a block diagram of an example system in which some embodiments of the technology described herein may be implemented.

As described above, an online retailer may offer tens of thousands or even millions of products for sale. Many of the products offered by an online retailer may come in different versions (e.g., different colors, different styles, different designs, etc.). Moreover, aspects of some products offered by an online retailer may be customized based on a user's preferences. As a result, there is a vast number of possible products available to a consumer of an online retailer, and it is challenging for consumers to identify the product(s) they are seeking.

The inventors have recognized that one specific challenge facing consumers is being able to precisely specify the product they are seeking when using software (e.g., a web browser or an app) for interfacing with an online retailer, and that conventional techniques that allow users to search for products may be improved upon.

One conventional technique for searching for products offered by an online retailer involves text-based search. A user uses a search engine integrated with an online retailer's catalog to enter a text search query comprising one or more keywords. In turn, the search engine identifies results by matching the text in the user's search query with tags or other text associated with products. Closely matching products are identified and results including the identified products are provided to the user. However, such techniques are limited for a number of reasons. First, the user may not know which keywords/text to use to identify relevant results. Second, the tags and/or categories (to which keywords in the text query are compared) associated with products from different manufacturers may not be consistent, which may result in incomplete or inaccurate results. As an example, suppose a consumer wishes to purchase a piece of furniture having certain characteristics such as a desired style (e.g., particular type of legs and armrests, a particular fabric material, a particular fabric pattern, a particular color, etc.). Such characteristics may not be consistently labeled or named by manufacturers, which makes it difficult to identify such products using text-based search; the search query keywords may simply not match the labels associated with the relevant products.

Some conventional techniques allow for use of natural language queries to improve online searching. For example, a natural language based system may be able to process a natural language query such as, "I want to buy a beige sofa in a Victorian style, with short legs, no armrests and no pillows. The fabric should be microfiber." As part of processing such a query, the system may isolate keywords such as "Victorian," "legs," "armrest," "pillows," "microfiber," and "beige," and provide these keywords to a text-based search engine. However, involvement of a text-based search engine means that natural language queries suffer from the same shortcomings as described above for text queries.

Some conventional systems allow a user to search for products with images. Instead of text, a user may provide an image as the search query. The image is then matched by a search engine against images of products and/or keywords extracted from the query image (e.g., via object detection and classification techniques) may be matched against product tags. However, a shortcoming of this approach is that a user may simply not have an image available of the product the user is seeking. Returning to the above example, it is highly unlikely that a user has an image of exactly the type of sofa specified in the query.

Some online retailers allow users to change characteristics of products while shopping. For example, a user may be permitted to change certain characteristics of a product. For example, a system may display an image of furniture in one color, and provide a menu of colors which the user can select. If a user selects a different color, the image of the furniture may be updated to reflect the selected color. However, while such techniques may assist the user to visually evaluate a particular product once it is found, they do not help the user find that product in the first instance.

The inventors have developed new machine learning techniques to help users search for products offered by an online retailer. The machine learning techniques enable the users to generate images of the types of products that the user is seeking. In turn, a generated image of a desired product may be used to identify products offered by the online retailer (or capable of being manufactured by the retailer or a manufacturer associated with the retailer) that most closely resembles the generated images.

For example, the machine learning techniques developed by the inventors enable a user to generate an image of the type of furniture (e.g., sofa) or other product that the user is seeking. In turn, the generated furniture image may be used as part of an image-based search query to identify one or more pieces of furniture offered by the online retailer that the user may browse and, potentially, purchase.

The machine learning techniques developed by the inventors provide multiple different ways in which an image of a product having desired characteristics may be generated. In some embodiments, the machine learning techniques involve using deep neural network models to generate the new images. In some embodiments, the deep neural network models utilized may comprise generative adversarial neural networks (GANs).

As one example of such a machine learning technique, in some embodiments, a user may be provided with a graphical user interface (GUI) through which the user may modify characteristics of an input image (which may be provided by the user or obtained from a different source). Each modification of a characteristic is used, together with the input image, to generate a new image of the product through a generative adversarial neural network model, examples of which are provided herein.

For example, a user may be presented with a gallery of images including images of a sofa having various styles and colors. The user may select one of the several images that is closest to the style of the sofa the user desires. In turn, the system may provide a user with access to a selection tool for the user to manipulate the sofa in the selected image by changing certain characteristics (e.g., the width and height, the material, the gloss, etc.) as desired. The system may then generate a synthesized output image depicting a sofa that has the characteristics desired by the user. In turn, the output image may be used to search for a product most similar to the one shown in the output image from among the products available through an online retailer.

Accordingly, some embodiments provide for a method comprising: (A) obtaining an input image depicting first furniture (or any other product, as aspects of the technology described herein are not limited in this respect); (B) obtaining, using a graphical user interface, at least one user selection indicative of a change in at least one furniture characteristic; and (C) generating, using a neural network model (e.g., a synthesis network part of a generative network), the input image, and the at least one user selection, an output image depicting second furniture different from the first furniture.

In turn, the output image may be used to search for one or more images of furniture similar to the second furniture in the output image. The output image may also be presented to a user on a webpage, in an e-mail or other electronic communication, in a virtual reality (VR) or an augmented reality (AR) environment.

The input image may be obtained in any suitable way. For example, in some embodiments, obtaining the input image comprises receiving the input image over at least one communication network (e.g., Internet) or accessing the input image from a non-transitory computer-readable storage medium (e.g., from a memory in a user's computing device, like a laptop or smartphone). As another example, in some embodiments, multiple images may be generated at random (e.g., using respective points in a latent space associated with the neural network model, for example, with the respective points being selected at random in some embodiments), presented to a user via a graphical user interface, and the input image may be obtained as a result of a selection by the user of one of the multiple images, with the selection being made via the graphical user interface. As another example, the initial image may be identified by a search engine in response to a text-based or natural language query provided as input by the user. As another example, the initial image may be provided by the online retailer as a recommendation made based on information about the user (e.g., information in a user's profile, such as the user's shopping history, preferences, browsing history, and the like.)

In some embodiments, generating the output image comprises: mapping the input image to a first point in a latent space associated with the neural network model (this "mapping" may be referred to as an "inversion process" herein); identifying a second point in the latent space using the first point and at least one user selection; and generating the output image using the second point in the latent space. In some embodiments, the latent space may be one of an input latent space associated with the neural network model or an intermediate latent space associated with the neural network model. In some embodiments, the first and second points may both be in the input latent space or may both be in the intermediate space.

In some embodiments, the inversion process may be performed using an iterative optimization technique to minimize an error between an image generated by the neural network from a point in the latent space and the input image. In this way, the optimization may start from an initial point in the latent space and search for the mapped point of the input image in the latent space. In some examples, the initial point may be a random point. In other examples, the system may use an encoder network of the neural network model to find the initial point in the latent space and converge to the mapped point from the initial point.

In some embodiments, where the latent space is the intermediate space and the first point comprises a plurality of values each associated with a respective dimension of the latent space. Identifying the second point comprises identifying one or more changes in the plurality of values based on the at least one user selection.

In some embodiments, the neural network model comprises a generative network, the generative network comprising: a mapping network configured to map a point in the input latent space to a point in the intermediate latent space; and a synthesis network configured to generate images from respective points in the intermediate latent space.

In some embodiments, the output image may be generated using the synthesis network. To this end, in some embodiments, operations in a plurality of layers in the synthesis network may be performed based on a plurality of control values each associated with a respective one of the plurality of layers. In some embodiments, a point in the intermediate latent space has a plurality of values associated with respective dimensions in the intermediate latent space, and the method further comprising providing the plurality of control values based on one or more values of the point in the intermediate latent space.

In some embodiments, the GUI through which a user can provide a selection indicative of a change in at least one furniture characteristic may include one or more graphical user elements (e.g., one or more slide bars, one or more dials, one or more drop-down menus, one or more check boxes, one or more radio buttons, one or more selectable GUI elements, one or more text fields, and/or any other suitable selectable and/or controllable GUI elements) through which a user can provide the user selection indicative of the change in the at least one furniture characteristic.

As another example of a machine learning technique developed by the inventors to generate images of products, in some embodiments, a new image may be generated based on an input image of a product and information indicative of a feature missing in the input image (e.g., an image of a swatch having a color different than the color of the product in the input image, an image of a sofa armrest different from the armrest of the sofa in the image, etc.). In a non-limiting example, a user may like a sofa having certain characteristics, but would like to have a different fabric material. The system may allow the user to make a selection in a GUI to indicate the desired material to replace that of the furniture in the input image.

Accordingly, some embodiments provide for a method comprising: (A) obtaining an input image depicting furniture; (B) obtaining information indicative of a furniture characteristic not depicted in the input image; and (C) generating an output image using a neural network model, the input image, and the information indicative of the furniture characteristic not depicted in the input image. In turn, the output image may be used to search for one or more images of furniture having the furniture characteristic not depicted in the input image.

In some embodiments, the information indicative of the furniture characteristic not depicted in the input image comprises an image depicting the furniture characteristic. In some embodiments, the image depicting the missing furniture characteristic may represent a desired material, such as a fabric, texture, pattern, wood grain, polish, and/or color. In some embodiments, the image depicting the furniture characteristic comprises an image of a material sample.

Obtaining information indicative of the desired furniture characteristic may be implemented in various ways. In some embodiments, the system may provide a GUI that allows the user to indicate which furniture characteristic in the image is to be replaced with the desired missing furniture characteristic. For example, the system may display an image of sample depicting desired characteristics, e.g., a fabric material and/or a color of a chair. In an example, the image depicting the desired characteristic may be a mask image in square, circle, or any other shape. The system may allow a user to indicate which part of the furniture needs to be replaced by allowing the user to overlay the image depicting the desired characteristic (e.g., a mask) on a portion of the furniture having the characteristics to be replaced. In a non-limiting example, the system may allow a user to move a mask image depicting black leather to a portion of a sofa chair (e.g., the back of a sofa) to indicate that the fabric of the sofa needs to be replaced by black leather. In another example, the system may allow a user to move a mask image depicting certain gloss to overlay on a surface of a piece of furniture to indicate that the gloss of the furniture's surface needs to be changed.

In some embodiments, generating the output image at act (C) comprises: generating a mixed image by overlaying the input image with the image depicting the furniture characteristic; mapping the mixed image to a first point in a latent space associated with the neural network model; and identifying a second point in the latent space via an iterative search based on the first point in the latent space and an error metric computed in a region of the mixed image corresponding to the image depicting the furniture characteristic. The latent space may be an input latent space associated with the neural network model or an intermediate latent space associated with the neural network model. The first and second points may be both in the input latent space or the intermediate latent space.

As described above, in some embodiments, the neural network model comprises a generative network, the generative network comprising: a mapping network configured to map a point in the input latent space to a point in the intermediate latent space; and a synthesis network configured to generate images from respective points in the intermediate latent space.

As another example of a machine learning technique developed by the inventors to generate images of products, in some embodiments, a new image may be generated by mixing desirable product characteristics in different product images. A user may identify characteristics of interest in two different images of a product and a neural network model may be used to synthesize a new image of the product having desirable characteristics.

For example, if the user is looking for a contemporary sofa having a specific color, the user may be presented multiple images of contemporary sofas (but the color may vary) and with multiple images of sofas having the specific color (but the style may vary). The user may select, from among the first group of images, an image of a contemporary sofa appealing to the user. The user may also select, from the second group of images, an image of a sofa having the specific color and appealing to the user. A neural network model may in turn generate a new image of a sofa from the two selected images. This image will depict a sofa that is likely more appealing to the user than either of the sofas in the two images selected by the user. This image, in turn, may be used to perform an image-based search of the online retailer's offerings.

Accordingly, some embodiments provide a method for generating a furniture image by blending furniture images. The method includes: (A) obtaining a first image depicting first furniture having a first furniture characteristic; (B) obtaining a second image depicting second furniture having a second furniture characteristic; and (C) generating an output image using a neural network model, the first image and the second image, wherein the output image depicts third furniture different from the first furniture and the second furniture.

In some embodiments, obtaining the first image comprises: (i) displaying, using a graphical user interface, a plurality of first images having the first furniture characteristic; and (ii) receiving a user selection indicative of the first image from the plurality of first images; and obtaining the second image comprises: (i) displaying, using the graphical user interface, a plurality of second images having the second furniture characteristic; and (ii) receiving a user selection indicative of the second image from the plurality of second images.

In some embodiments, the first and second images are obtained using a graphical user interface. The GUI is also used to obtain a user selection indicative of mixing the first furniture characteristic in the first image with the second furniture characteristic in the second image; and the output images is generated based on the user selection.

In some embodiments, the neural network model for generating the output image may be a generative neural network model associated with a latent space (e.g., an input latent space and/or an intermediate latent space), and generating the output image may involve: (i) mapping the first image to a first point in a latent space associated with the neural network model; (ii) mapping the second image to a second point in the latent space associated with the neural network model; and (iii) generating the output image using the first point and the second point in the latent space. (The first and second points may both be in the input latent space or in the intermediate latent space.) The generative neural network may include: a mapping network configured to map a point in the input latent space to a point in the intermediate latent space; and a synthesis network configured to generate images from respective points in the intermediate latent space.

As used herein, the term "furniture" may refer to any article used in readying a space (e.g., a room, a patio, etc.) for occupancy and/or use. Non-limiting examples of furniture include: living room furniture (e.g., sofas, sectionals, loveseats, coffee tables, end tables, tv stands, media storage, chairs, seating, ottomans, poufs, bookcases, cabinets, chests, console tables, futons, daybeds, fireplaces, etc.), bedroom furniture (beds, headboards, dressers, chests, nightstands, daybeds, vanities, stools, armoires, wardrobes, benches, bunk beds, etc.), mirrors, tables and chairs, kitchen and dining furniture (e.g., dining tables and chairs, bar tables and stools, kitchen carts, sideboards, buffets, display cabinets, china cabinets, baker's racks, food pantries, wine racks, etc.), office furniture (e.g., desks, chairs, bookcases, filing cabinets, storage cabinets, computer equipment stands, etc.), entry and mudroom furniture (e.g., console tables, hall trees, cabinets, storage benches, shoe storage, coat racks, umbrella stands, etc.), outdoor and patio furniture (e.g., tables, chairs, umbrellas, etc.), bathroom furniture (e.g., vanities, cabinets, etc.), game furniture, rugs, artwork, and/or any other suitable furniture and/or furnishing.

The techniques described herein are sometimes explained with reference to furniture. However, the techniques described may be used in connection with any types of products (e.g., furniture, appliances, clothing, furnishings, fixtures, cars, etc.), as aspects of the technology described herein are not limited in this respect. For example, the techniques described herein may be used to generate images of any type of product for which an image-based search may be implemented via an online retailer.

Reference is made herein to images depicting furniture. An image depicting furniture may show one or more pieces of furniture. In some embodiments, a piece of furniture may be shown partially in the image such that at least a part of the piece of furniture is not visible, for example, as a result of being occluded by something else in the image or being only partially included in the image. In some embodiments, a piece of furniture may be shown in the image without any background, or with a background such as a living room.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 shows a block diagram of an example system in which some embodiments of the technology described herein may be implemented. In some embodiments, system 100 may be provided to enable a user to shop in an online store, such as an online store selling furnishings, appliances, or any other suitable type of product. System 100 may include a user interface 104 installable on a user device, e.g., 102. The user interface 104 may be an application downloadable from the Internet. The user device 102 may be an electronic portable device, such as a smart phone or a tablet PC. In other examples, the user device 102 may be a computer (e.g., a desktop computer, a tablet PC, a terminal device) in a brick-and-mortar store that the user may use to browse the store's online catalog. The user interface 104 may be a browser capable of displaying available furniture images provided by the furniture online store and executable on the user device on which the user interface is installed. The user interface 104 may enable a user to select a query image from furniture images provided by the furniture online store. The user interface 104 may also enable a user to select a query image that is accessed/retrieved elsewhere, where the query image contains furniture having user desired characteristics. For example, the query image may be an image of a sofa having the style and color the user desires.

In some embodiments, system 100 may include a server 106, which may include a search engine 110. The search engine 110 may receive from a user device 102 a query image depicting furniture, search an online database, such as an image/video database 114, and return the search result to the user device 102. The returned image may depict furniture having similar furniture characteristics as the furniture in the query image.

The inventors have recognized that a user may not be able to provide a query image that has the exact characteristics of the furniture the user desires to purchase. In fact, an online store may not provide an image for every style and every color a product it carries. An online store may not even provide an image for every product it carries. Accordingly, in some embodiments, a user may provide an input image to the server 106. The input image may depict furniture close to what the user desires to purchase but not having all of the user desired furniture characteristics. Server 106 may be configured to generate an output image depicting furniture having the user desired characteristics.

In some embodiments, server 106 may include an image generator 108 configured to receive an input image from the user device 102. The image generator 108 may also be configured to receive user selection from the user device. In some examples, the user selection may contain information about the manipulations to be performed on the furniture in the input image, where the manipulations include a change of one or more characteristics of the furniture in the input image to the user desired characteristics. Examples of manipulations may include adjusting the furniture height, the gloss of the furniture, the color of the furniture, the style of the furniture, the material of the fabric etc. In some examples, furniture manipulations may be provided and selectable in the user interface 104. For example, the user interface 104 may have one or more widgets, e.g., a slide bar, a dial, a drop-down menu, an editing tool, or any other suitable graphical tools.

Image generator 106 may generate an output image using a neural network model 112, the input image and the user selection. The image generator 108 may perform the manipulations contained in the user selection, where the output image depicts furniture different from the furniture in the input image and contains furniture having the user desired characteristics. In some embodiments, server 106 may send the output image to the user device 102, which may display the output image to the user. If the user determines that the furniture in the output image has all the desired characteristics, the user may decide to use the output image to search the online database. In such case, the user may operate the user device 102 to cause it to send the output image to the server 106, as the query image. Accordingly, the various blocks in the system 100 enable a user to manipulate an existing image depicting furniture to create a query image depicting synthesized furniture that has the user desired characteristics. This will result in improved accuracy of image search and help user to find the desired product for purchase quickly, providing an enhanced user experience in online shopping.

With further reference to FIG. 1, there may be various ways for the user device 102 to provide the input image to the server 106. The user device 102 may access a local non-transitory computer-readable storage medium and determine the input image depicting furniture. The user device 102 may also access a remote database over a communication network to select an input image depicting furniture. In some embodiments, server 106 may obtain one or more images depicting furniture and send the one or more images depicting furniture to the user device 102 over at least one communication network. The user device 102 receives the image(s) from the server 106 and displays the images for user to browse and select, for example, via user interface 104. The server 106 may obtain the image(s) for the user to browse in several ways. For example, the server may obtain the image(s) based on an initial user query. The initial query may be entered by user via user interface 104, where the initial query may include user's preference of furniture characteristics, such as the type of furniture (e.g., sofa, loveseat, or a single chair), the style (e.g., traditional, contemporary), the material (e.g., leather, fabric) and/or the color. Based on the initial query, the server may search in a database (e.g., image/video database 114) for images that have one or more of the furniture characteristics in the user's initial query. Alternatively, and/or additionally, the server may obtain the one or more images using a recommendation engine and send the recommended image(s) to the user device 102. In obtaining the recommended image(s), various recommendation algorithms existing or later developed may be used.

Figure 11:
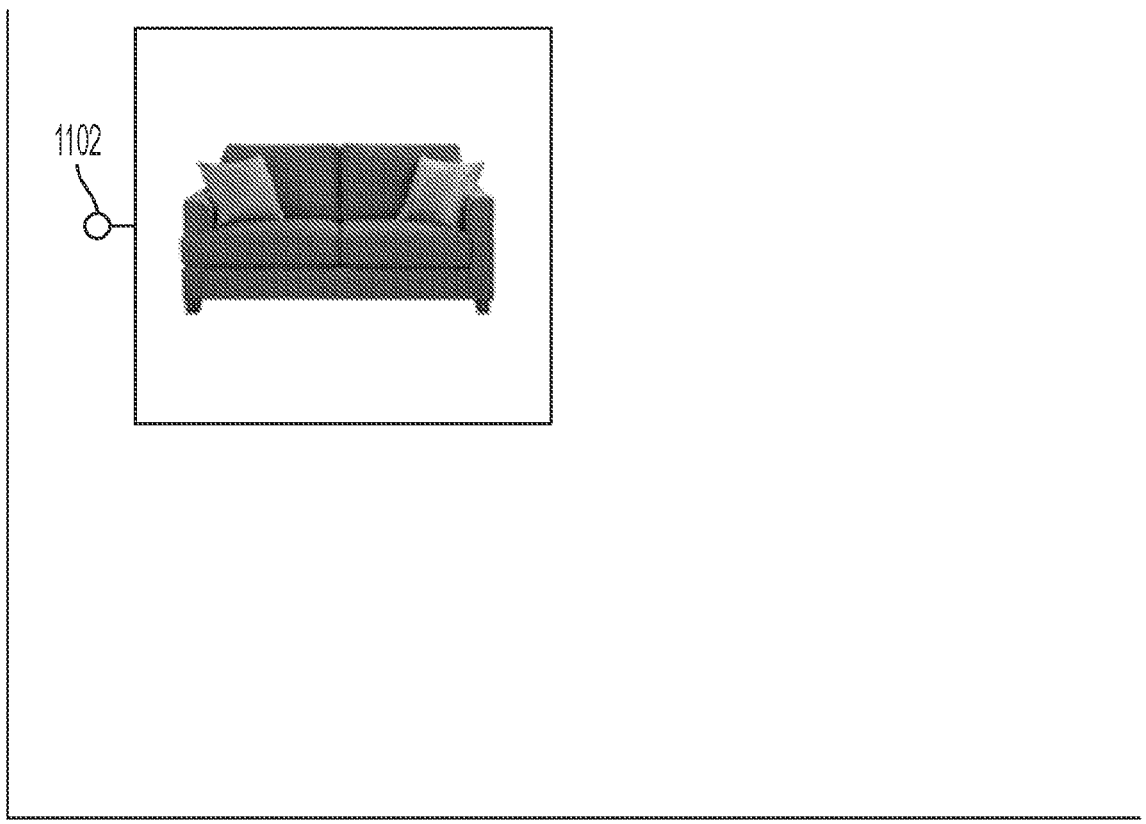
FIG. 11 shows an example latent space containing a point 1102 representing a piece of furniture having certain characteristics, in accordance with some embodiments of the technology described herein.

Alternatively, and/or additionally, server 106 may obtain the one or more images for user to browse using a neural network model 112. The neural network model 102 may be a trained generative network, which may be configured to generate images depicting furniture using representations of furniture characteristics. For example, a representation of furniture characteristic may be a point in a latent space associated with the neural network model. For example, FIG. 11 shows an example latent space containing a point 1102 representing a piece of furniture having certain characteristics, in accordance with some embodiments of the technology described herein. In the example in FIG. 11, the latent space for the neural network may be multi-dimensional, for example, 512 dimensions or other suitable dimensions. A point in this space may be interpreted by a generator of the neural network model to generate an output image of an imaginary sofa. For example, a point in the latent space may be represented by a vector having multiple dimensions. Some of the vector's dimensions can determine the sofa's color or how many people can sit on it, while others specify the pillow height and its texture. Each point in this space is an instruction of how to visually build an imaginary sofa that, when interpreted by the generator, creates it in visual (uncompressed) form. In this compressed latent space, a system can be configured to make semantically meaningful changes to a point's position that would ideally allow different features of the sofa to be edited individually. The latent space and neural network model are further explained with reference to FIG. 2.

Figure 2:
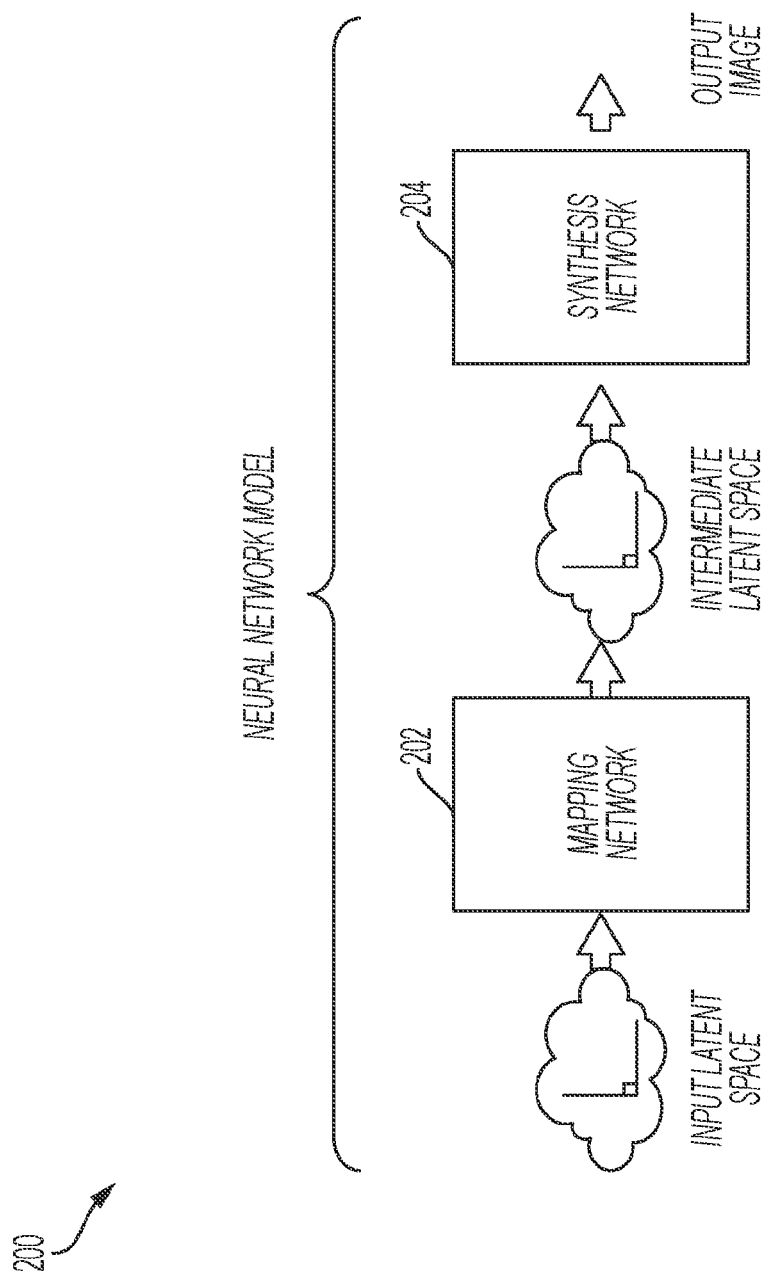
FIG. 2 shows a block diagram of an example neural network model, in accordance with some embodiments of the technology described herein.

FIG. 2 shows a block diagram of an example neural network model in accordance with some embodiments of the technology described herein. The neural network model 200 may be implemented in the neural network model 112 as a generative network. In some embodiments, the neural network model 200 may include a mapping network 202 coupled to a synthesis network 204. The neural network model 200 may be associated with one or more latent space. A latent space may be a multi-dimensional space (e.g., a 16-dimensional space, a 256-dimensional space, a 512-dimensional space, or a space having any other suitable dimension). For example, an input latent space may be associated with input to the mapping network 202. Mapping network 202 may be configured to convert a point in an input latent space to a point in an intermediate latent space. A point in the intermediate latent space may control the operation of the synthesis network 204, where the synthesis network 204 may be used to generate an output image. The dimensions of the input latent space and the intermediate latent space may be the same or may be different. The details of the mapping network 202 and synthesis network 204 are further described in FIGS. 3A-3C.

With further reference to FIG. 2, a point in a latent space of the neural network model 200 (e.g., the input latent space or the intermediate latent space) may include multiple values that contain information about the characteristics of furniture. A point in the latent space may be provided to the neural network model, which may be configured to generate an output image. As a result, the output image may depict furniture having the characteristics associated with the point in the latent space. In other words, each point in the latent space may correspond to an output image depicting furniture having certain characteristics. In case of the embodiments described above, the one or more images provided to the user device (e.g., 102 of FIG. 1) for browsing may be generated by the neural network model 200 using one or more points in an associated latent space.

In some embodiments, the system may determine multiple points in the latent space, where the multiple points correspond to certain furniture characteristics. Certain dimensions in the latent space may be associated with certain furniture characteristics each corresponding to a semantic furniture feature. For example, in a latent space, certain values of a multi-dimensional point may correspond to Victorian style sofa, whereas certain other values of the multi-dimensional point may correspond to the length of the legs of sofa, fabric material of sofa, or other furniture characteristics. Thus, two points close to each other in the latent space may generate images depicting similar sofas. Conversely, points in the latent space that are farther apart may generate images depicting sofas that are visually different.

Returning to FIG. 1, sever 106 may determine multiple points in a latent space associated with a neural network model (e.g., 200) and generate multiple images using that neural network model. In some embodiments, server 106 may determine multiple points in a latent space at random, and subsequently use the neural network model to generate multiple random images depicting furniture. Providing random images to a user may be particularly useful in some applications, where a user's preferred furniture characteristics are unknown. For example, by providing random images for the user to browse and select, a system may collect information about the user's preference. In these techniques, the user's preference may be represented by (or "compressed" into) one or more points in the latent space from which the user selected image(s) are generated. These one or more points representing the user's preference may be stored in the system. In some embodiments, the system may recommend initial images for user to browse by generating one or more images using these stored points in the latent space and the neural network model, and provide the images to the user device as previously described. In some embodiments, the system may store different sets of points per user, each set of points representing a respective user's preference of furniture characteristics.

With continued reference to FIG. 1, the sending/receiving of input image/user selection and output image may be iterative in that the input image and the output image may be transferred between the user device 102 and the server 106 multiple times, until the output image depicts furniture having the user desired characteristics. For example, the user may select an input image. The server 106 receives the input image and generates an output image based on the input image and user selection containing manipulations to be performed on the input image. The image generator 108 may generate the output image using the input image and user selection and send the output image to the user device 102. In viewing the output image, the user may want to make further adjustments on the input image, and thus, send an updated user selection to the server 106. The image generator 108 may generate an updated output image using the input image and the updated user selection and send the updated output image to the user device 102. This process may be performed iteratively, until the output image depicts furniture having the user desired characteristics. In some examples, generating the output image at image generator 108 may be computationally fast. Thus, the above iterative communication between the user device 102 and server 106 may be instantaneous, allowing the user to view the result instantly when an adjustment (e.g., movement of a slide bar) is made. Compared to convention systems that use graphics rendering techniques, the embodiments described herein enable generating a synthesized query image in real time.

System 100 may be configured to enable various embodiments in which the system may generate a synthesized output image that depicts a virtual furniture having user desired characteristics. In a first embodiment, system 100 may be provided that is configured to generate an output image depicting furniture having user desired characteristics based on an input image depicting furniture. Various embodiments of obtaining the input image are previously described in the present disclosure with respect to FIG. 1 and will not be described herein.

System 100 may further obtain, using a user interface 104, at least one user selection indicative of a change in at least one furniture characteristic over an input image. For example, the system may include a GUI (e.g., 104) that may have one or more widgets to allow the user to change one or more furniture characteristics. In a non-limiting example, the GUI may include a slide bar for furniture height, which allows the user to adjust the furniture height. In another example, the GUI may include a slide bar for the user to adjust the gloss of the furniture. Any other widgets, such as a dial, a drop-down menu, an editing tool, or any other suitable graphical tool may be used. Based on the user selection indicative of the change of furniture characteristics, server 106 may generate an output image depicting furniture. For example, image generator 108 may be configured to generate the output image using a trained neural network. Neural network models, e.g., 112 of FIG. 1 and 200 of FIG. 2 may be used. In the example neural network model in FIG. 2, the latent space that contains the first and second point may be the input latent space or the intermediate latent space associated with the neural network 200.

Image generator 108 may perform an inversion to the input image to map the input image to a first point in the latent space of the neural network. Image generator 108 may identify a second point in the latent space using the first point and the change of furniture characteristic indicated in the user selection. Thus, the changing of furniture characteristics may be implemented in a process of determining a new point from an old point in the latent space. Then, the system may use the neural network model and the new point in the latent space to generate the output image, where the output image depicts furniture having user desired characteristics. If neural network model 200 is used, then synthesis network 204 may be configured to generate the output image based on the second point in the latent space. The details of the embodiment are further described in FIG. 4.

With further reference to FIG. 1, in a second embodiment, system 100 is provided that is configured to visually change the characteristic of furniture in an input image by replacing certain characteristics with a desired one. System 100 may receive an input image from a user device. Various embodiments of obtaining the input image are previously described in the present disclosure with respect to FIG. 1 and will not be described herein.

In some embodiments, system 100 may provide a graphical user interface 104 that enables a user to visually change the characteristic of furniture by replacing certain characteristics with a desired one. For example, system 100 may obtain from the user, e.g., via user interface 104 on the user device 102, information indicative of a desired furniture characteristic not depicted in the input image. In an example, the user interface 104 may display an image of material sample depicting desired characteristics, e.g., fabric material and/or fabric color of a chair. The image depicting the desired characteristic may be a mask image. The user interface 104 may allow the user to indicate which part of the furniture needs to be replaced by the characteristics in the mask. For example, the user interface 104 may receive a user input to overlay an image depicting the desired characteristic (e.g., a mask) on a portion of the furniture to indicate which characteristics of the furniture need to be replaced. The user input for overlaying may include operations, such as drag and drop, copy and paste, or other manipulations.

In response to receiving the input image and information indicative of a desired furniture characteristic not depicted in the input image, image generator 108 may use a neural network model, e.g., 112 of FIG. 1, 200 of FIG. 2 to generate an output image, which depicts furniture have certain furniture characteristics replaced with the user desired ones. If neural network model 200 is used, then synthesis network 204 may be configured to generate the output image. In doing so, image generator 108 may be configured to generate a mixed image by overlaying the mask image over the input image. Image generator 108 may further map the mixed image to a point in the latent space of the neural network model using an inversion process, as previously disclosed. The mapped point in the latent space from the inversion process may be used as an initial point. The system may start from the initial point, then identify a second point in the latent space in an optimization process. For example, the system may iteratively search and update the next point using gradient descent. A point in the latent space from each iteration may be used to generate/update the output image using the neural network model. A loss function (e.g., error metrics) in the gradient descent may indicate the closeness between the output image and the mixed image. For example, the loss function may be calculated by comparing image pixels in the output image and the mixed image. In some examples, comparison of image pixels may be limited to a region in each image, where the region corresponds to the mask image. Once the optimization process is completed, the output image in the current iteration will be the final output image, which contains the desired furniture characteristics. The details of the embodiment are further described in FIG. 5.

With further reference to FIG. 1, in a third embodiment, system 100 is provided that is configured to visually mix characteristics of different furniture. For example, user interface 104 in system 100 may be provided to allow a user to mix various furniture characteristics shown in different images. System 100 may obtain a first image and a second image, as input images from a user device. In some embodiments, the first image and the second image may be stored on the user device. For example, the input images may be captured by the user device from real furniture. The input images may also be downloaded by the user device from an online store. Alternatively, and/or additionally, the system may obtain one or more images depicting furniture for the user to browse. Various ways of obtaining one or more images for the user to browse were described in the present disclosure, and for ease of description, the descriptions of those are not repeated. The user may, via user interface 104, select a first image and a second image from multiple images, where the first and second images each depicts furniture having some different furniture characteristics. For example, the furniture in the first image and the furniture in the second image may be of different styles, different fabric materials, and/or different colors. As shown in FIG. 1, the user device 102 may send the input images (which may include the first image and the second image) to the server 106.

In response to receiving the input images from user device 102, server 106 may use image generator 108 to generate an output image using a neural network model, e.g., 112 of FIG. 1, 200 of FIG. 2., where the output image depicts furniture different from the furniture in the first image and the furniture in the second image. In some examples, the furniture depicted in the output image may mix different characteristics shown in different images. For example, in the example above, the furniture in the output image may include a sofa in contemporary style shown in the first image and having the desired fabric shown in the second image. In determining how the furniture characteristics shown in the first image and the second image are mixed, in some examples, the system may provide a graphical user interface tool, e.g., user interface 104, to enable a user to select which furniture characteristic in the first image is to be mixed with which furniture characteristic in the second image. Thus, image generator 108 may generate the output image using neural network model 112, the first and second images, and the user selection concerning how the furniture characteristics are mixed.

In generating the output image, the image generator may perform inversion upon the first image and the second image, in a similar manner as previously described in other embodiments for performing inversion upon the input image. In the inversion process, the first image and the second image may be mapped to respective points in the latent space of the neural network model. In some examples, the neural network model may include a generative neural network, e.g., neural network model 200 of FIG. 2. The synthesis network 204 of neural network model 200 may be configured to generate an output image using the first point and the second point in the latent space. In some embodiments, synthesis network 204 may include multiple convolutional layers, where a first subset of the layers is controlled by the first point in the latent space, and a second subset of the layers are controlled by the second point in the latent space. The details of the embodiment are further described in FIG. 6.

Returning to FIG. 1, various embodiments described above may generate an output image depicting a virtual furniture containing the user desired characteristics. Thus, the various embodiments in the present disclosure may be implemented to improve an online shopping system. For example, upon receiving at the user device 102, the synthesized output image generated by the server 106, the user may wish to purchase furniture having the characteristics depicted in the output image. The user device 102 may send the output image, or a variation of the output image (e.g., via some editing, such as cropping, touching up etc.), as a visual query image to the server 106 to initiate an image search. In response, the server 106 may perform an image search (e.g., at image search engine 110) using the received query image. The image search may generate one or more images of furniture similar to the furniture in the synthesized image.

In some or other scenarios, various embodiments disclosed in the present disclosure may be implemented in an online system, such as an online browsing or catalog system, which can be configured to generate synthesized images and display the synthesized images. In other examples, various embodiments disclosed herein can also be implemented in an extended reality (XR) system, which may include virtual reality, augmented reality, or mixed reality. In an XR system, such as an XR system for online furniture shopping, synthesized images depict furniture having various user desired furniture characteristics may be generated and displayed. In other examples, the synthesized images that may be generated in various embodiments disclosed herein may also be transmitted, via a communication network, to another electronic device (e.g., server of a catalog system or print or prepress house) for processing.

Figure 3A:
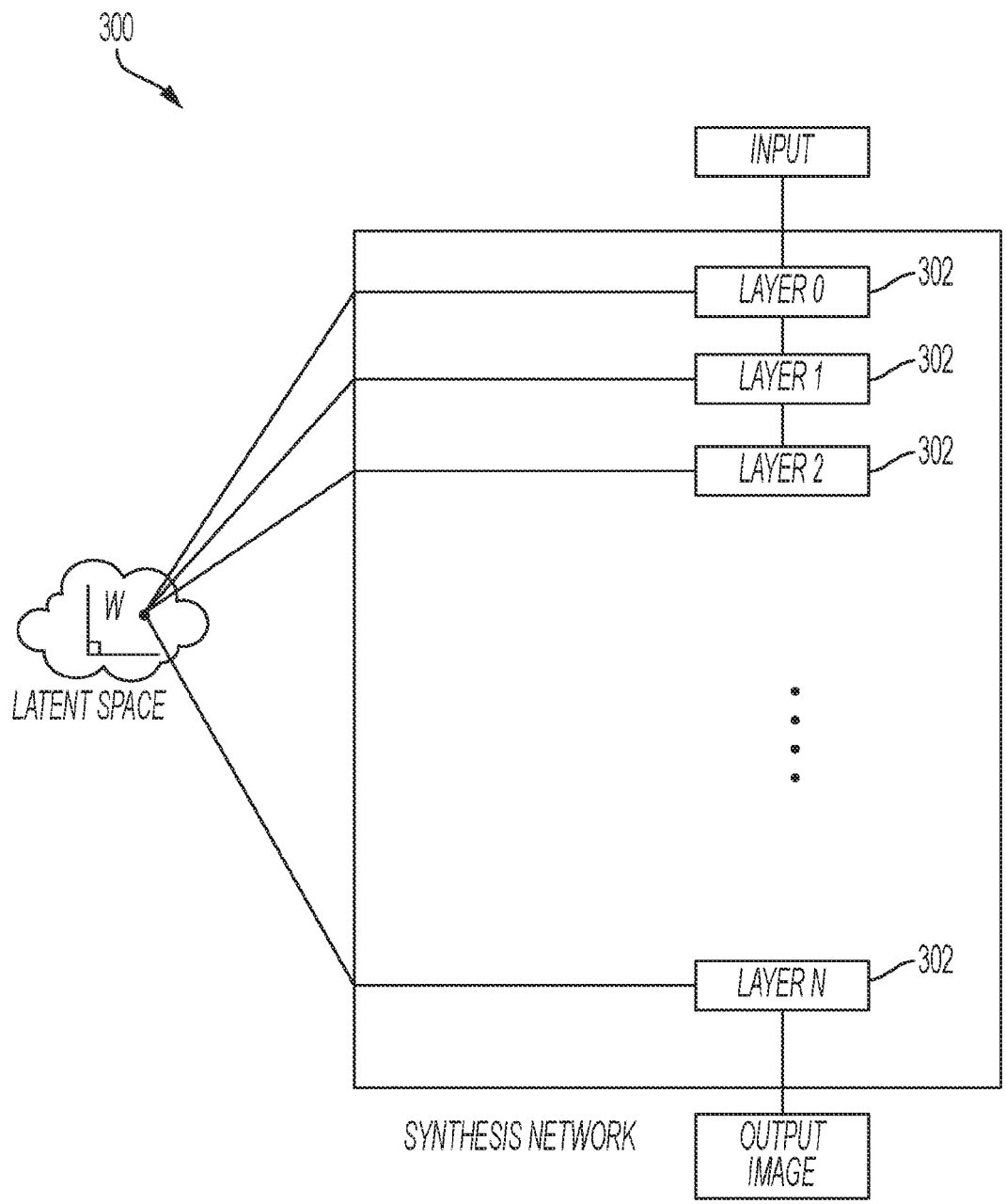
FIG. 3A shows a block diagram of an example synthesis network of a neural network model, in accordance with some embodiments of the technology described herein.

FIG. 3A shows a block diagram of an example synthesis network of a generative neural network model in accordance with some embodiments of the technology described herein. In some embodiments, synthesis network 300 may be implemented in neural network model 112 of FIG. 1 and synthesis network 204 of generative neural network model 200 of FIG. 2. In some examples, the synthesis network 300 may include a plurality of layers 302, which may be controlled by one or more points in the latent space W. With reference to FIG. 2, the latent space W may be an intermediate latent space. Thus, the synthesis network 300 may be configured to perform computations in multiple layers to generate an output image, where each layer is controlled by one or more points that may be associated with certain dimensions in the intermediate latent space. In some embodiments, the input to the synthesis network 300 may be a constant input. For example, the input may be a constant tensor, where the size of the tensor depends on the size of the convolutional layers in the synthesis network and the dimension of the latent space. The constant input may also be trained. When applying this network 300 to furniture images, in some examples, certain layers in the network may correspond to certain semantic features of furniture represented by certain dimensions in the latent space. Thus, a point in the latent space for furniture may be used by the synthesis network 300 to generate an output image containing certain visual furniture characteristics as represented by that point.

Figure 3B:
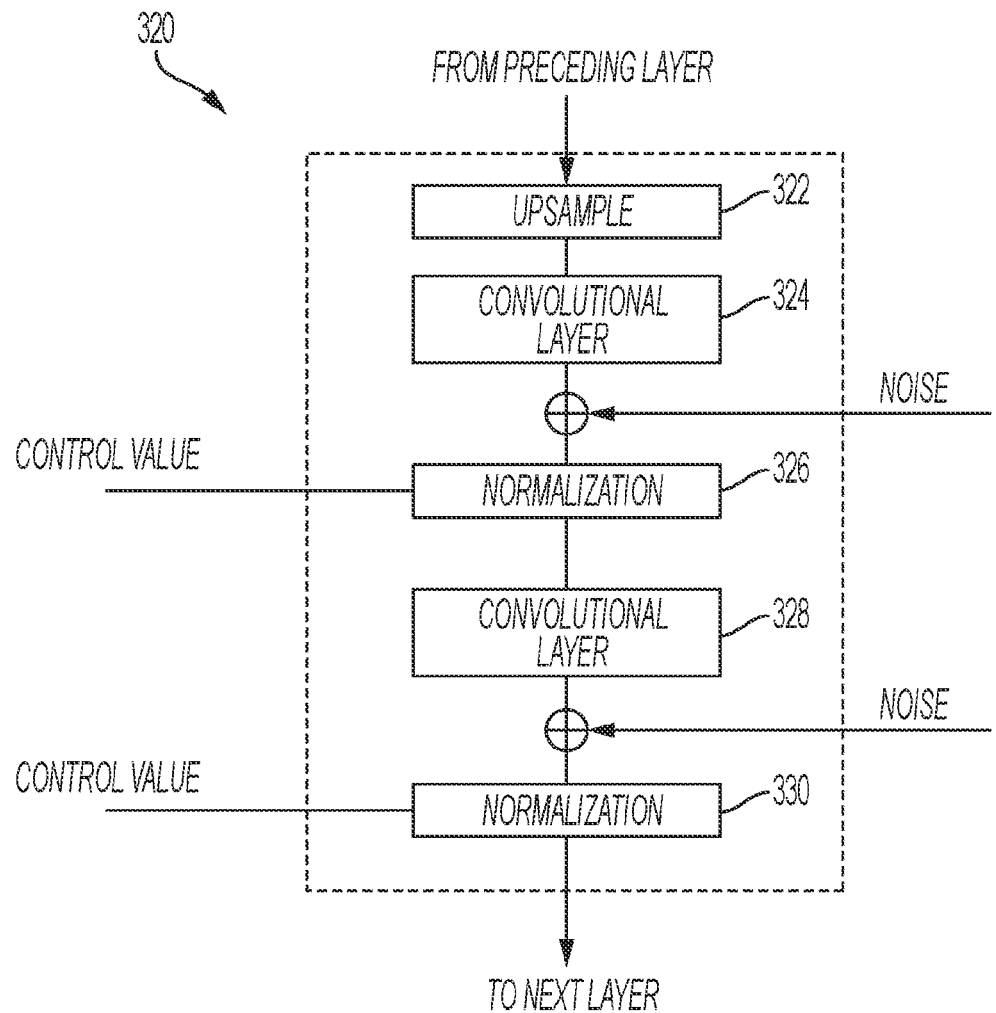
FIG. 3B shows a block diagram of an example synthesis network including two convolutional layers, in accordance with some embodiments of the technology described herein.

FIG. 3B shows a block diagram of an example synthesis network including two convolutional layers in accordance with some embodiments of the technology described herein. In some embodiments, block 320 that includes two convolutional layers 324, 328 may be implemented in the synthesis network 300 of FIG. 3A. In the example shown, two convolutional layers 324, 328 may be arranged in a pair and serially coupled. Multiple pairs in similar structure as block 320 may be coupled in series. The first convolutional layer 324 in the pair may be coupled to an upsampler at input. Thus, in operation, data provided to block 320 may first be upsampled and subsequently provided to the first layer 324. Data generated by each layer 324, 328 may further be normalized through normalization operations 326, 330, where the normalization operations are each controlled by a respective control value. As described with reference to FIG. 3A, each control value may be associated with one or more dimensional values of a point in the latent space. Additionally, noise may be added to the output of each convolutional layer 324, 328 before the output is normalized. This may add finer details in the output image generated by the neural network model. For example, the noise may add inconsequential variations in the features of an image. In an example for a sofa, the variations may represent randomness in the texture of a couch. In some examples, the noise may be Gaussian noise or other computer generated noise. The noise may be added to each convolutional layer on a per-pixel basis. In some examples, the noise added to each convolutional layer may be independent, so that no stochastic effect is passed from one convolutional layer to the next.

Figure 3C:
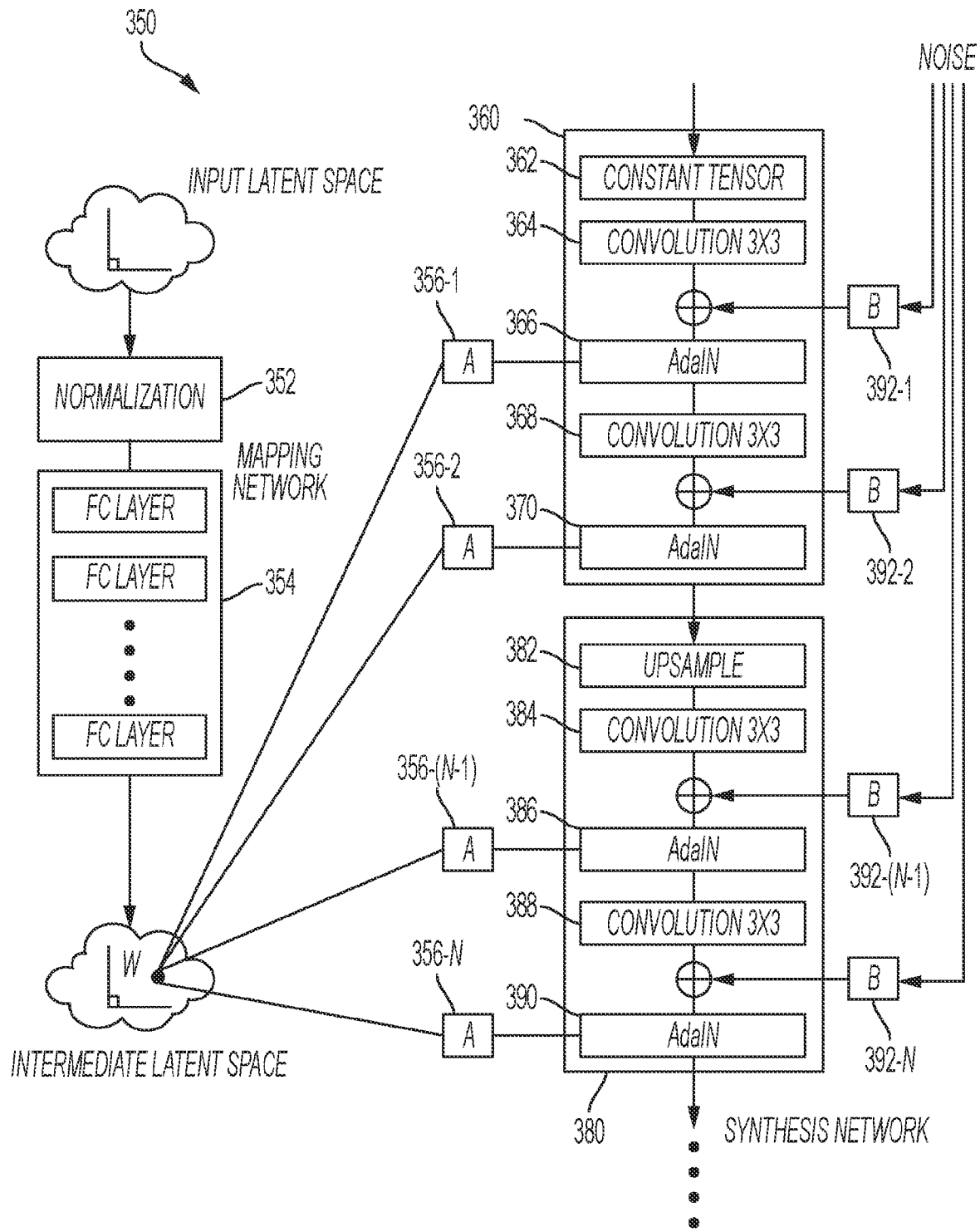
FIG. 3C shows a block diagram of an example neural network model including a mapping network and a synthesis network, in accordance with some embodiments of the technology described herein.

FIG. 3C shows a block diagram of an example neural network model including a mapping network and a synthesis network, in accordance with some embodiments of the technology described herein. In some embodiments, block 300 of FIG. 3A and 320 of FIG. 3B may be implemented in neural network model 350 of FIG. 3C, which may also be implemented in neural network model 112 of FIG. 1 and generative neural network model 200 of FIG. 2. FIG. 3C shows details of the generative neural network in FIGS. 2, 3A and 3B. For example, the mapping network 354 may include a plurality of fully connected layers. In some examples, the number of fully connected layers may be 4, 8, 16, or any suitable number. Additionally, and/or alternatively, the mapping network 354 may be coupled to a normalization operation 352 at input. As shown in the figure, the mapping network 354 may be configured to convert a point in the input latent space to a point in the intermediate latent space. The input latent space and the intermediate latent space may have the same dimension, e.g., 512, 1024, or any other suitable dimension. In other examples, the input latent space and the intermediate latent space may have different dimensions.

With further reference to FIG. 3C, the normalization operation at each convolutional layer may include an adaptive instance normalization (AdaIN), e.g., 366, 370, 386, 390. As such, the control values (shown in FIG. 3B) may control the synthesis network through a respective AdaIN operation. Additionally, and/or alternatively, each convolutional layer may be coupled to a respective affine transformation of one or more affine transformations 356. The affine transformations 356 may be learned during training so that a point in the latent space may be converted to one or more control values for controlling the AdaIN operations of each convolutional layer. In some embodiments, the noise for each convolutional layer may be added through a respective per-channel scaling factor of one or more scaling factors 392. The scaling factors 392 may also be learned during training. In some examples, the neural network model shown in FIGS. 3A-3C may include a generator architecture for generative adversarial networks described in T. Karras et. al., "A Style-Based Generator Architecture for Generative Adversarial Networks," 2019 IEEE/CVF Conference on Computer Vision and Pattern Recognition (CVPR), 2019, pp. 4396-4405, doi: 10.1109/CVPR.2019.00453, which is incorporated by reference herein in its entirety.

With reference to the neural network models in FIGS. 1-3C, various methods may be used in the inversion process to map an image to a point in the latent space. For example, in finding a point in the latent space, the system may use a projection method that uses an iterative optimization technique to minimize an error between the input image (to be mapped to the latent space) and the image generated by the neural network model based on the projected point (in the latent space). FIG. 12 shows an example of a real sofa 1202 (left) and an image 1204 (right) generated by a neural network from a point in the latent space of the neural network that was identified using the image of the real sofa, in accordance with some embodiments of the technology described herein. In other words, image 1204 may be viewed as a latent space representation of the image 1202. In an example, to find a point in the latent space that creates an image of a real sofa (e.g., by an inversion process), the system may start with a random point in the latent space (as an initial guess) and provide it to a generator of the neural network model (e.g., the synthesis network). The system may find the optimal point in the latent space in an optimization process using gradient descent, where the optimal point is the closest to the image (to be inverted) in accordance with a loss function. In the optimization process, at each iterative search, the system may find a gradient that moves in a direction by comparing the output of the generator and the target sofa image to be inverted. For example, the neural network may be a convolutional neural network (VGG) described in K. Simonyan and A. Zisserman, "Very Deep Convolutional Networks for Large-Scale Image Recognition," Proceedings of International Conference on Learning Representations, 2015, which is incorporated by reference herein in its entirety.

Other methods of inversion may also be possible. In some embodiments, the system may use an encoder network of a neural network to find an initial point in the latent space and converge to the mapped point from the initial point in an optimization process. A loss function of the optimization process may be tuned depending on the task. Such methods are described in T. Karras et. al., "Analyzing and Improving the Image Quality of StyleGAN," Proceedings of the IEEE/CVF Conference on Computer Vision and Pattern Recognition (CVPR), 2020, pp. 8110-8119 and T. Karras et. al., "Training Generative Adversarial Networks with Limited Data," $34^{th}$ Conference on Neural Information Processing Systems (NeurIPS 2020), Dec. 6, 2020, which are incorporated by reference herein in their entireties. In some embodiments, the neural network that includes the encoder network may include a residual neural network (ResNet) or a variation thereof. In some embodiments, the ResNet may be trained using a generative neural network, such as the neural network shown in FIGS. 2-3C. A trained ResNet may be used to generate an initial point in the latent space that may converge to the optimal projected point from the initial point in fewer iterative searches in the optimization process than converging from a random point described above.

In some embodiments, other variations of the inversion may include using an encoder network of a neural network that can be trained to understand the mapping of semantic visual features to a latent vector in the latent space. For example, the encoder network may be deeply embedded in the learning of an in-domain generative neural network. The system may first lean a domain-guided encoder to project the input image to a point in the latent space of the neural network, and then use the encoder to fine-tune the point in the latent space. This process may ensure the inverted point in the latent space is semantically meaningful. Using in-domain generative neural network is described in J. Zhu et. al., "In-Domain GAN Inversion for Real Image Editing," In: Vedaldi A., Bischof H., Brox T., Frahm J M. (eds) Computer Vision—ECCV 2020. Lecture Notes in Computer Science, vol 12362. Springer, Cham. pp. 592-608, which is incorporated by reference herein in its entirety. In the example described above, a neural network such as the neural network shown in FIGS. 2-3C, may be used.

Figure 4:
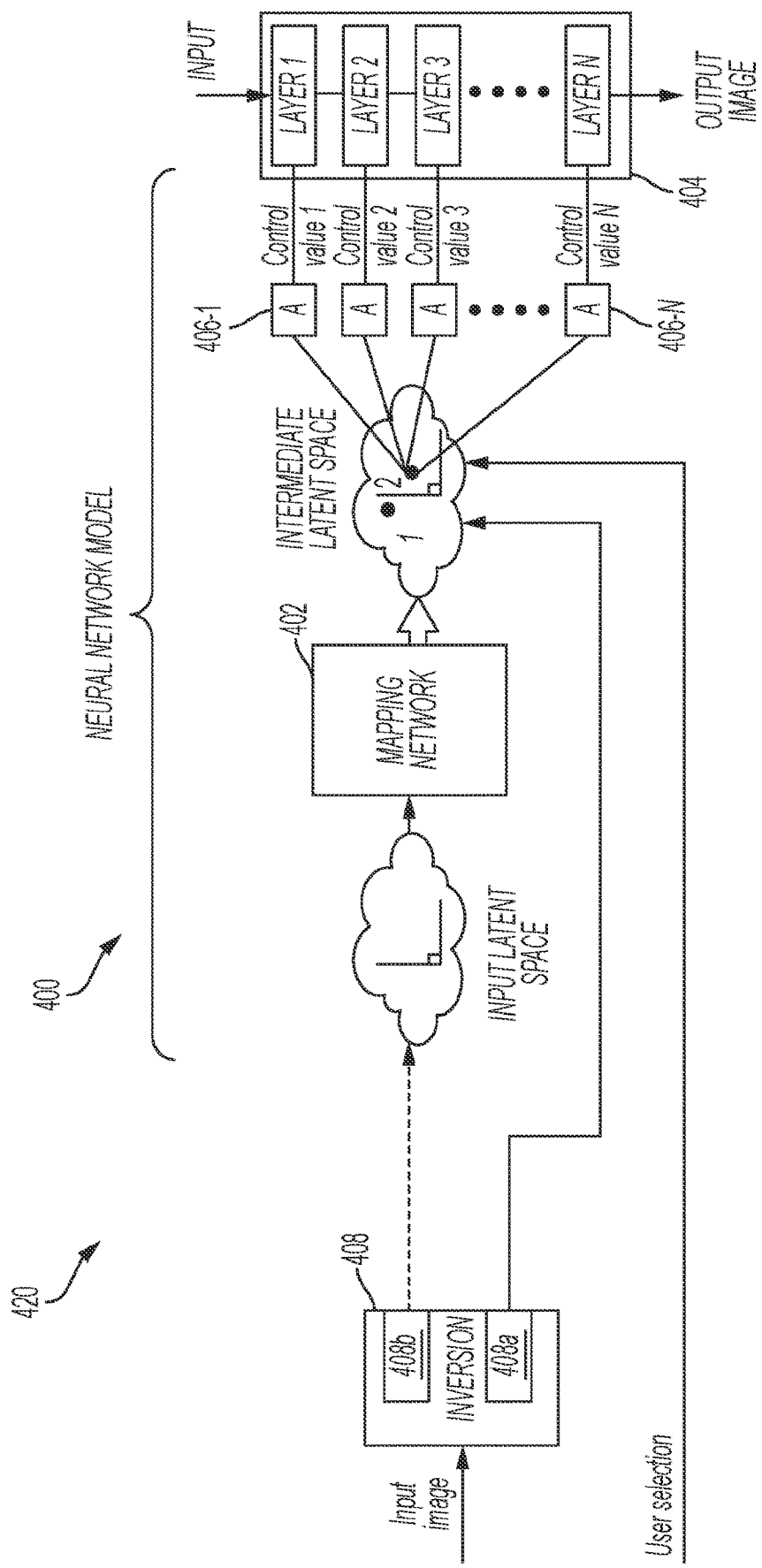
FIG. 4 shows a block diagram of a portion of an example system for generating an output image using an input image and a neural network model, in accordance with some embodiments of the technology described herein.

FIG. 4 shows a block diagram of a portion of an example system for generating an output image using an input image and a neural network model, in accordance with some embodiments of the technology described herein. In some embodiments, a portion 420 of an example system may be implemented in system 100 of FIG. 1. The portion 420 of the system may include a neural network model 400, which may be implemented in neural network model 112 of FIG. 1 or neural network model 200 of FIG. 2. Neural network model 400 may have similar structures as shown in blocks 300 of FIG. 3A, 320 of FIG. 3B or 350 of FIG. 3C. The portion 420 of the system may be configured to implement some embodiments previously described. With reference to FIGS. 1 and 4, in some embodiments, a system, such as system 100 of FIG. 1, may be configured to provide a tool to generate a virtual image depicting furniture having user desired characteristics based on an input image of furniture.

In some embodiments, the example system may receive an input image depicting furniture from a user device. The input may be stored on the user device. For example, the input image may be captured by the user device from real furniture. The input image may also be downloaded by the user device from an online store. Alternatively, and/or additionally, the system may obtain one or more images depicting furniture for the user to browse. The system may subsequently receive an input image selected by the user. Various ways of obtaining one or more images for the user to select are described in the present disclosure, and for ease of description, the descriptions of those are not repeated.

In some embodiments, the example system may obtain, using a user interface (e.g., 104 of FIG. 1), at least one user selection indicative of a change in at least one furniture characteristic over the input image. For example, the user interface may have one or more widgets to allow the user to change one or more furniture characteristics. In some non-limiting examples shown in FIG. 13 and FIG. 18, software tools 1300 and 1804 are provided to include a plurality of slide bars. These slide bars may be configured to allow a user to change one or more furniture characteristics over a selected image, such as, width, height, orientation, color, and/or gloss of the furniture depicted in the image. These slide bar may also be configured to allow a user to change characteristics of furniture materials and/or fabric, such as plush, color, material and/or pillow height. Other examples of furniture characteristics may include lighting, shadow, and/or any characteristics specific to certain materials, such as the leather grain or fabric texture, and/or gloss of paint etc. Any other widgets, such as a dial, a drop-down menu, an editing tool, or any other suitable graphical tool may be used.

Based on the user selection indicative of the change of furniture characteristics, the system may generate an output image depicting furniture. For example, image generator 108 of server 106 (FIG. 1) may be configured to generate the output image using the input image and a trained neural network, e.g., neural network model 112. With reference to FIG. 4, the neural network model 400 may be implemented in the neural network model 112 of FIG. 1. Neural network model 400 may be a generative neural network and may have similar structure as shown in FIGS. 2 and 3A-3C. For example, neural network model 400 may include a mapping network 402 coupled to a synthesis network 404.

Figure 13:
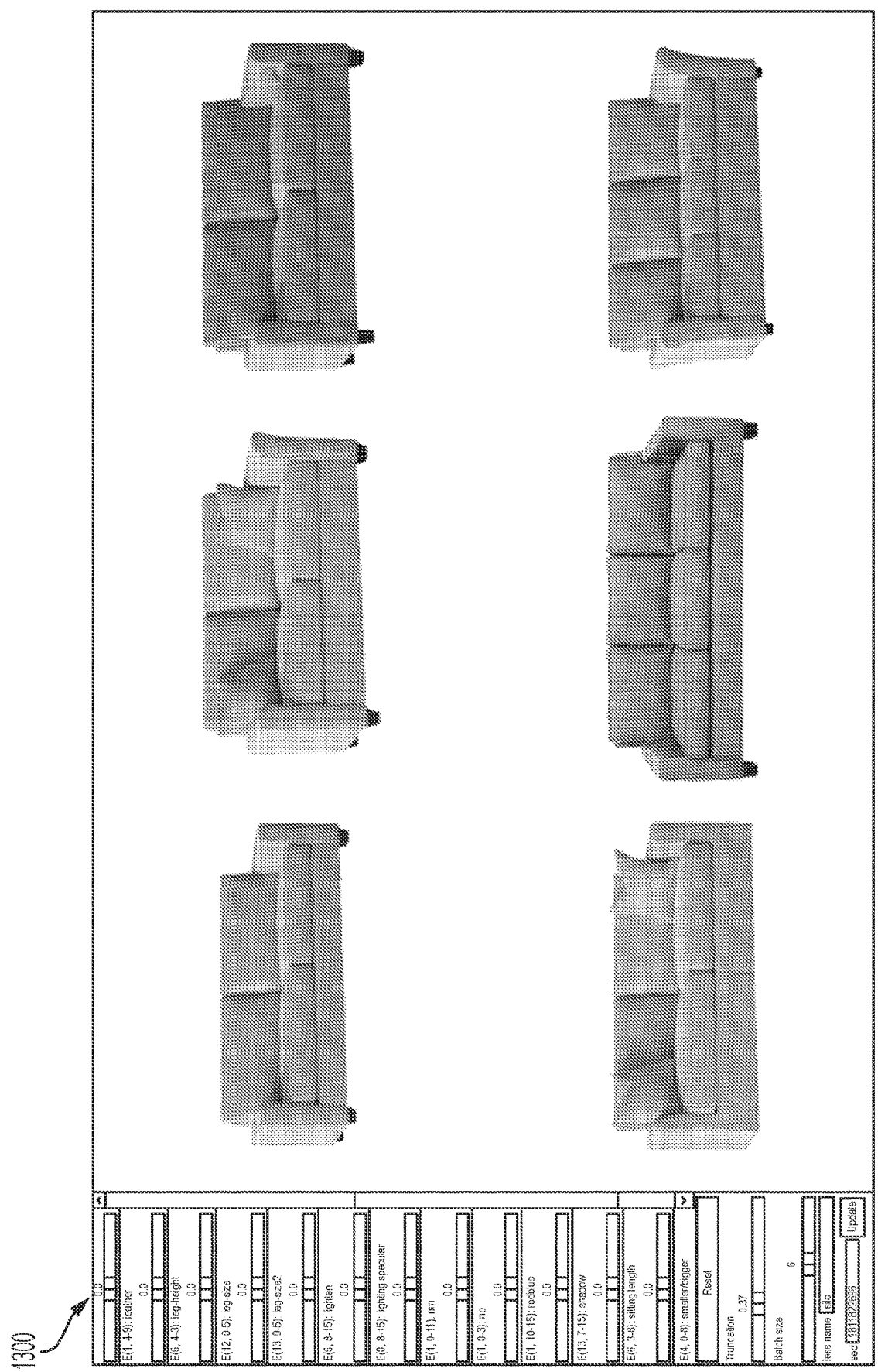
FIG. 13 shows an example software tool for allowing a user to vary characteristics of furniture, which results in different output images, in accordance with some embodiments of the technology described herein.
Figure 18:
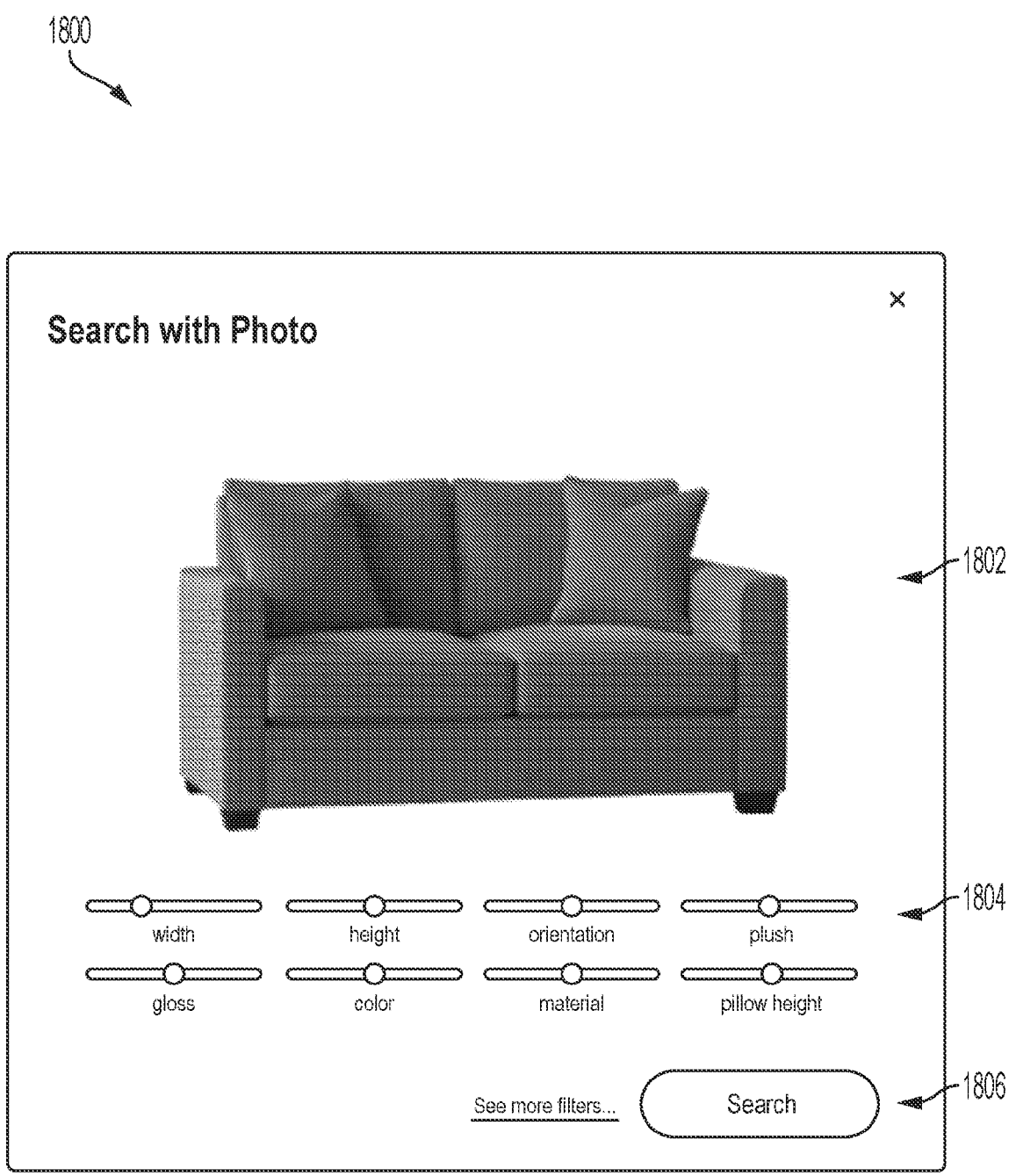
FIG. 18 shows an example web-based user interface allowing a user to vary characteristics of furniture shown in an image in order to generate a furniture image with which to search for one or more pieces of furniture, in accordance with some embodiments of the technology described herein.

In generating the output image, the system may perform an inversion operation (e.g., 408) to map the input image to a first point in a latent space associated with the neural network model 400. The first point may be in the input latent space of the neural network or the intermediate latent space. In some embodiments, the system may perform an inversion operation 408a to map the input image to a first point in the intermediate latent space of the neural network model. In some other embodiments, the system may perform an inversion operation 408b to map the input image to a first point in the input latent space. The system may further identify a second point in the latent space using the first point and the at least one user selection. As previously described, a user selection may indicate a change in at least one furniture characteristic, such as sliding one or more slide bars as shown in FIGS. 13 and 18. A slide bar may have a value range corresponding to a furniture characteristic. A value indicated by a user selection in the user interface may correspond to a change of furniture characteristics. This change of characteristics may correspond to a change of direction in the latent space. For example, if the user moves the slide bar for the height of the furniture, a direction corresponding to the height of the furniture may be applied to the first point in the latent space to identify a second point. In some examples, each of the first point and the second point in the latent space may have a plurality of values. If the first and second points in the latent space are expressed in vectors $\vec{V1}$ and $\vec{V2}$, then $\vec{V2}=\vec{V1}+\Delta c$, where $\Delta c$ corresponds to a change of furniture characteristics indicated by the user selection. It is appreciated that $\Delta c$ may include a change of a furniture characteristic that results from user adjustment of a slide bar, or include a combination of changes of multiple furniture characteristics, which may result from user adjustments of multiple slide bars at the same time. The change to one or more furniture characteristics may also result from input provided by a user in any suitable way, for example, via one or more slide bars, one or more dials, one or more drop-down menus, one or more check boxes, one or more radio buttons, one or more selectable GUI elements, one or more text fields, and/or any other suitable selectable and/or controllable GUI elements.

With further reference to FIG. 4, the mapping network 402 of the neural network model 400 may be configured to map a point in the input latent space to a point in the intermediate latent space; and synthesis network 404 may be configured to generate output images from respective points in the intermediate latent space. As described in FIGS. 3A-3C, the synthesis network 404 may include a plurality of layers, each layer is associated with a respective control value. Thus, in generating the output image, the synthesis network 404 may be configured to perform operations in a plurality of layers in the synthesis network based on a plurality of control values each associated with a respective one of the plurality of layers. In the example shown, the plurality of control values may be associated with respective dimensions in the intermediate latent space. In generating the output image from the second point in the intermediate latent space, the plurality of control values may correspond to one or more values of the second point in the intermediate latent space.

With reference to FIGS. 1 and 4, the example system, which may implement portion 420 may be implemented in an online search system. For example, upon receiving at the user device 102 the synthesized output image generated by the server 106, the user may wish to purchase furniture having the characteristics shown in the output image. The user device 102 may send the output image, or a variation of the output image (e.g., via some editing, such as cropping, touching up etc.), as a visual query image to the server 106 to initiate an image search. In response, the server 106 may perform an image search (e.g., at image search engine 110) using the received query image. The image search may generate one or more images of furniture similar to the furniture in the query image.

The example system may also be implemented in an online system, such as an online browsing or catalog system, which can be configured to generate synthesized images and display the synthesized images. In other examples, various embodiments disclosed herein can also be implemented in an extended reality (XR) system, which may include virtual reality, augmented reality, or mixed reality. In an XR system, such as an XR system for online furniture shopping, synthesized images depict furniture having various user desired furniture characteristics may be generated and displayed. In other examples, the synthesized images that may be generated in various embodiments disclosed herein may also be transmitted, via a communication network, to another electronic device (e.g., server of a catalog system or print or prepress house) for processing.

Figure 5:
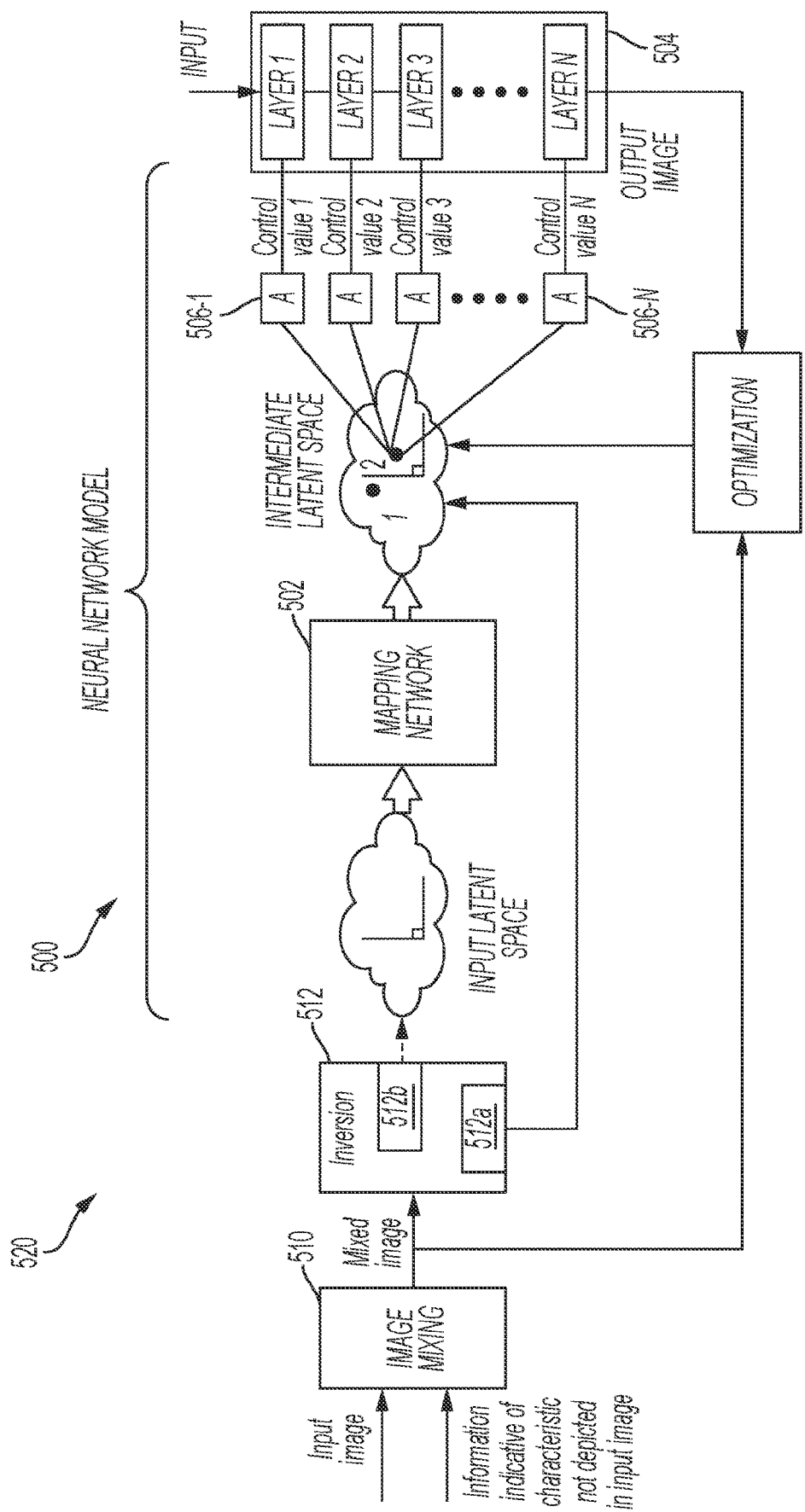
FIG. 5 shows a block diagram of a portion of an example system for generating an output image using an input image and information indicative of a characteristic not depicted in the input image, in accordance with some embodiments of the technology described herein.

FIG. 5 shows a block diagram of a portion of an example system for generating an output image using an input image and information indicative of a characteristic not depicted in the input image, in accordance with some embodiments of the technology described herein. In some embodiments, a portion 520 of an example system may be implemented in system 100 of FIG. 1. The portion 520 of the system may include a neural network model 500, which may be implemented in neural network model 112 of FIG. 1 or neural network model 200 of FIG. 2. Neural network model 500 may have similar structures as the structure shown in blocks 300 of FIG. 3A, 320 of FIG. 3B or 350 of FIG. 3C. The portion 520 of the system may be configured to implement some embodiments previously described. With reference to FIGS. 1 and 5, in some embodiments, a system, such as system 100 of FIG. 1, may be configured to enable a user to visually change the characteristic of furniture in an input image by replacing certain characteristics with a desired one.

In some embodiments, the example system may receive an input image depicting furniture from a user device. The input image may be stored on the user device. For example, the input image may be captured by the user device from real furniture. The input image may also be downloaded by the user device from an online store. Alternatively, and/or additionally, the system may obtain one or more images depicting furniture for the user to browse. The system may subsequently receive a user selection to select one of the images as an input image. Various ways of obtaining one or more images for the user to select are described in the present disclosure, and for ease of description, the descriptions of those are not repeated herein.

In some embodiments, the example system may obtain, using a graphical user interface (e.g., 104), information indicative of a furniture characteristic not depicted in the input image. The system may generate an output image using a neural network model, the input image, and the information indicative of the furniture characteristic not depicted in the input image. For example, image generator 108 of server 106 (FIG. 1) may be configured to generate the output image may using the input image and a trained neural network, e.g., neural network model 112. With reference to FIG. 5, the neural network model 500 may be implemented in the neural network model 112 of FIG. 1. Neural network model 500 may be a generative neural network and may have similar structure as shown in FIGS. 2 and 3A-3C. For example, neural network model 500 may include a mapping network 502 coupled to a synthesis network 504.

In some examples, the information indicative of a furniture characteristic not depicted in the input image may include an image depicting furniture having a desired characteristic that the user wishes to replace certain furniture characteristics in the input image. For example, the image depicting the furniture having a desired characteristic may include an image of a material sample. The system may allow a user to make a selection in a graphical user interface to indicate the desired material to be used to replace certain furniture characteristics in the input image. Examples of the user interface for obtaining information indicative of a furniture characteristic not depicted in the input image are illustrated in FIGS. 20A-20C.

Figure 20A:
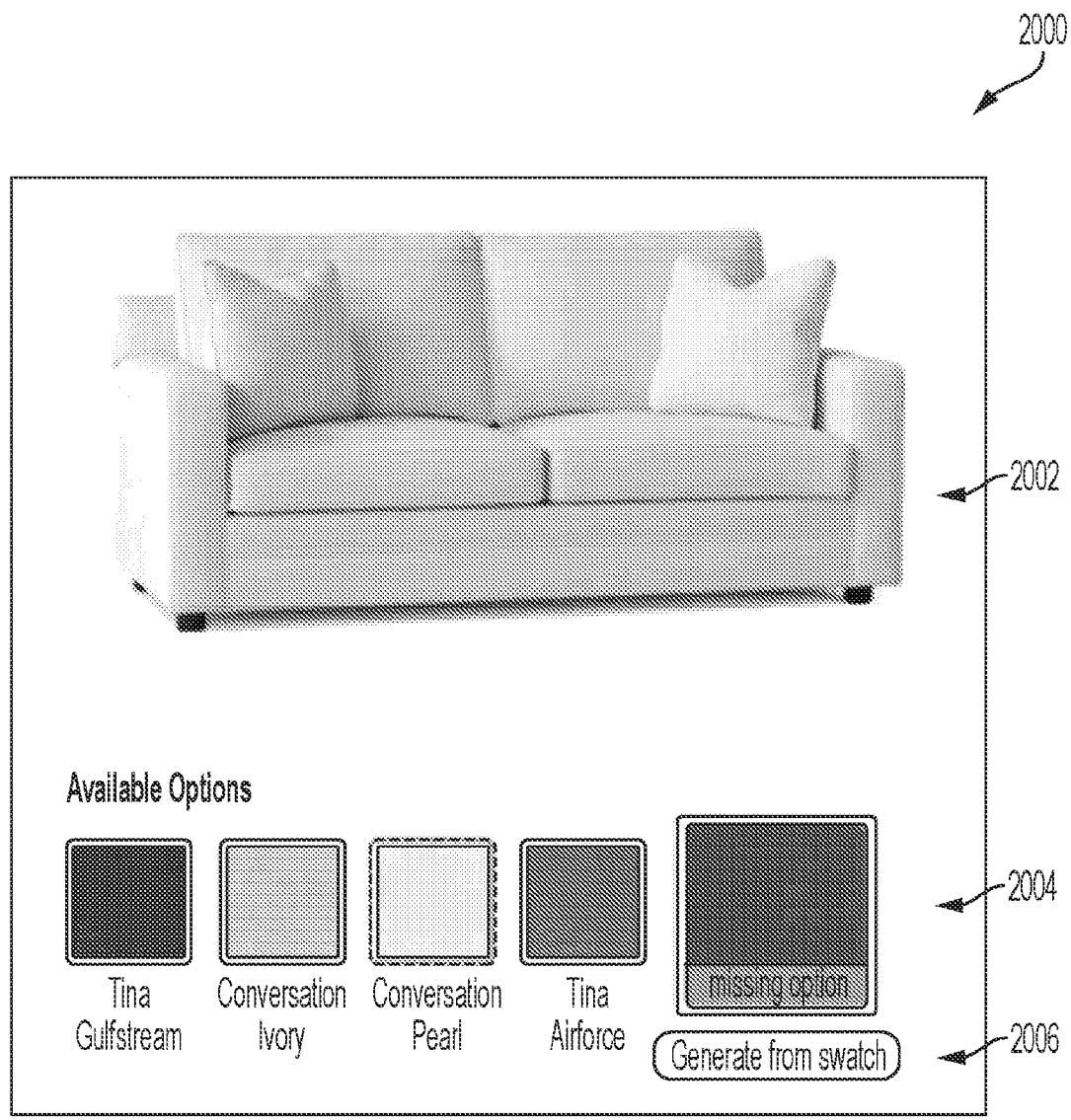
FIG. 20A shows an example web-based user interface that enables users to select a furniture characteristic (e.g., color, style, etc.), which may be missing in available furniture images, and trigger generation of a new furniture image having the selected furniture characteristic, in accordance with some embodiments of the technology described herein.
Figure 20C:
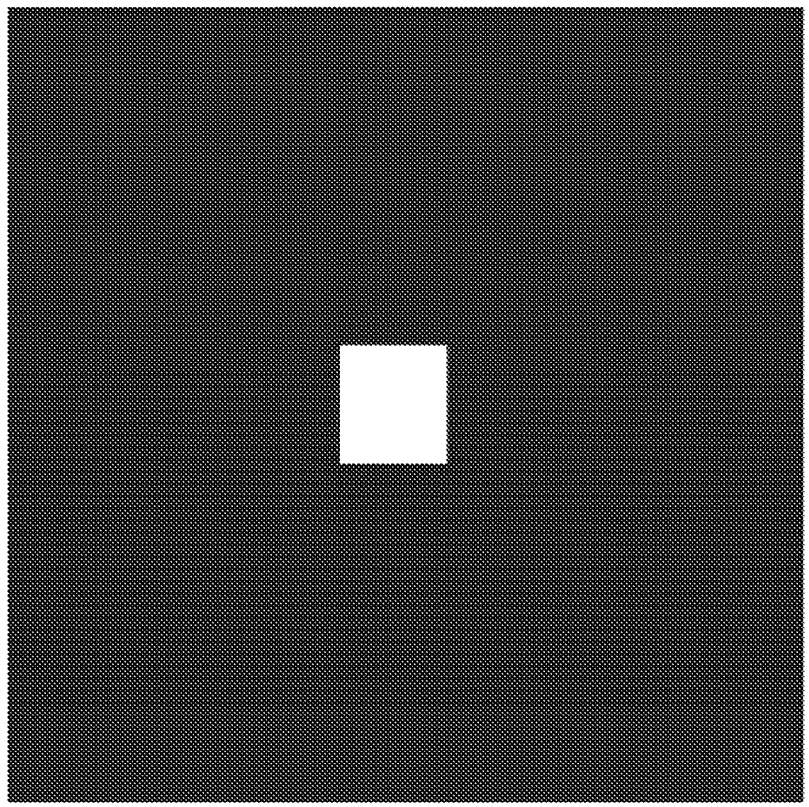
FIG. 20C shows an example of a mask indicative of the region of overlay shown in FIG. 20B, in accordance with some embodiments of the technology described herein.
Figure 20B:
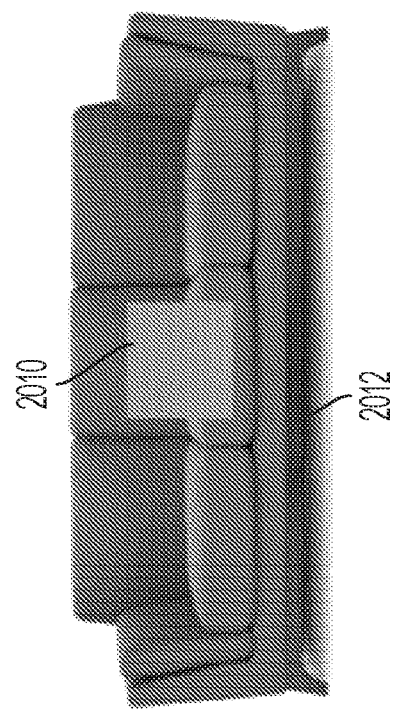
FIG. 20B shows an example of an input image being overlaid with an image depicting a furniture characteristic missing in the input image, in accordance with some embodiments of the technology described herein.

FIG. 20A shows an example web-based user interface that enables users to select a furniture characteristic (e.g., color, style, etc.), which may be missing in available furniture images, and trigger generation of a new furniture image having the selected furniture characteristic, in accordance with some embodiments of the technology described herein. A sample user interface 2000 may be implemented in the user interface 104, in some embodiments. The user interface 2000 may display a user selected input image 2002 and an image 2004 depicting the furniture characteristic user desires. In the example in FIG. 20A, the image 2004 depicting the furniture characteristic includes an image of a material sample 2006. FIG. 20B shows an example of an input image being overlaid with an image depicting a furniture characteristic missing in the input image, in accordance with some embodiments of the technology described herein. In some examples, the user interface (e.g., user interface 104 of FIG. 1) may allow a user to overlay an image mask of a material sample 2010 onto furniture 2012, where the location where the image mask is overlaid on the furniture indicates which furniture characteristic in the input image of the furniture 2012 (in this case, the sofa fabric) should be replaced by the furniture characteristic in the image mask 2010.

Although the example image of material sample 2006 in FIG. 20A shows a different color, the image of material sample may include other suitable furniture characteristics, such as fabric material, fabric texture, paint gloss, paint color, pillow types etc. The mask image 2010 in FIG. 20B may also include other shapes, such as square, circle, or any other shape. The mask image may also have a suitable size, for example, a size that is a portion of the size of the input image. In some examples, the system may be configured to enable a user to move a mask image depicting missing characteristics (e.g., black leather) to a portion of the furniture in the image (e.g., the back of a sofa) to indicate that the fabric in the back of the sofa needs to be changed. In another example, the system may allow a user to move a mask image depicting certain gloss to overlay on a surface of a piece of furniture to indicate that the polish of the furniture's surface needs to be changed.

Returning to FIG. 5, in generating the output image, the system may perform an image mixing operation 510. The mixing operation 510 may mix the input image and the image depicting missing characteristics to generate a mixed image. For example, the system may generate the mixed image by overlaying a mask image containing the desired furniture characteristics over the input image. An example of a mixed image is shown in FIG. 20B.

In some embodiments, neural network model 500 may have a similar structure as the neural network model 400 of FIG. 4. The neural network model 500 may be a generative neural network. The neural network model 500 may include a mapping network 502 coupled to a synthesis network 504.

An input latent space and an intermediate latent space may be associated with the neural network model 500, where the mapping network 502 is configured to convert a point in the input latent space to a point in the intermediate latent space. The system may use an inversion operation (e.g., 512) to map the mixed image to a first point in a latent space associated with the neural network model 500. The inversion process is described in the disclosure and, for ease of description, the description of the inversion process will not be repeated. The first point could be in the input latent space of the neural network or the intermediate latent space. In some embodiments, the system may perform an inversion operation 512a to map the mixed image to a first point in the intermediate latent space of the neural network model. In some other embodiments, the system may perform an inversion operation 512b to map the mixed image to a first point in the input latent space.

The mapped first point in the latent space from the inversion process may be used as an initial point. The system may start from the initial point and identify a second point in the latent space via an iterative search based on the first point and a loss function (e.g., an error metric). A point in the latent space from each iteration may be used to generate/update the output image using the synthesis network 504 of neural network model 500. The iterative search may be performed in an optimization operation 514 using gradient descent. The error metric in the optimization operation 514 may indicate the closeness between the output image and the mixed image. In some examples, the error metric may be computed in a region of the mixed image corresponding to the image depicting the furniture characteristic. For example, as shown in FIG. 20B, only the pixels in a region in the mixed image where the mask image 2010 is overlaid are compared to corresponding pixels in the target output image. FIG. 20C shows an example of a mask indicative of the region of overlay in FIG. 20B in accordance with some embodiments of the technology described herein. The example mask may be used to only calculate the loss in the output image by only calculating the difference between the generated image and the region with the overlapping mixed image. In some embodiments, the optimization process may end when the calculated loss is below a threshold value. In other embodiments, the optimization process may end when the number of iterations exceeds a threshold number. Once the optimization process is completed, the output image in the current iteration will be the final output image, which depicts furniture having certain characteristics in the input image replaced by the desired missing furniture characteristics. In some examples, the loss function may depend on pixel-loss and features extracted from a VGG neural network. For example, one method that may be used is described in J. Zhu et. al., "In-Domain GAN Inversion for Real Image Editing," In: Vedaldi A., Bischof H., Brox T., Frahm J M. (eds) Computer Vision—ECCV 2020. Lecture Notes in Computer Science, vol 12362. Springer, Cham. pp. 592-608, which is incorporated by reference herein in its entirety.

With further reference to FIG. 5, in identifying the second point in the latent space as described above, for each updates second point in the iterative search, the synthesis network 504 may be configured to generate an updated output image based on the updated second point in the latent space. Similar to the synthesis network 404 of FIG. 4, synthesis network 504 may include a plurality of layers, each layer is associated with a respective control value. Thus, in generating the output image in each iterative search, the synthesis network 504 may be configured to performing operations in a plurality of layers in the synthesis network based on a plurality of control values each associated with a respective one of the plurality of layer. In the example shown, the plurality of control values may be associated with respective dimensions in the intermediate latent space. In generating the output image from the second point in the intermediate latent space, the plurality of control values may correspond to one or more values of the second point in the intermediate latent space.

With reference to FIGS. 1 and 5, the example system, which may implement portion 520, may be implemented in an online search system. For example, upon receiving the synthesized output image generated by the server 106 at the user device 102, the user may wish to purchase furniture having the characteristics shown in the output image. The user device 102 may send the output image, or a variation of the output image (e.g., via some editing, such as cropping, touching up etc.), as a visual query image to the server 106 to initiate an image search. In response, the server 106 may perform an image search (e.g., at image search engine 110) using the received query image. The image search may generate one or more images of furniture similar to the furniture in the query image.

The example system may also be implemented in an online system, such as an online browsing or catalog system, which can be configured to generate synthesized images and display the synthesized images. In other examples, various embodiments disclosed herein can also be implemented in an extended reality (XR) system, which may include virtual reality, augmented reality, or mixed reality. In an XR system, such as an XR system for online furniture shopping, synthesized images depict furniture having various user desired furniture characteristics may be generated and displayed. In other examples, the synthesized images that may be generated in various embodiments disclosed herein may also be transmitted, via a communication network, to another electronic device (e.g., server of a catalog system or print or prepress house) for processing.

Figure 6:
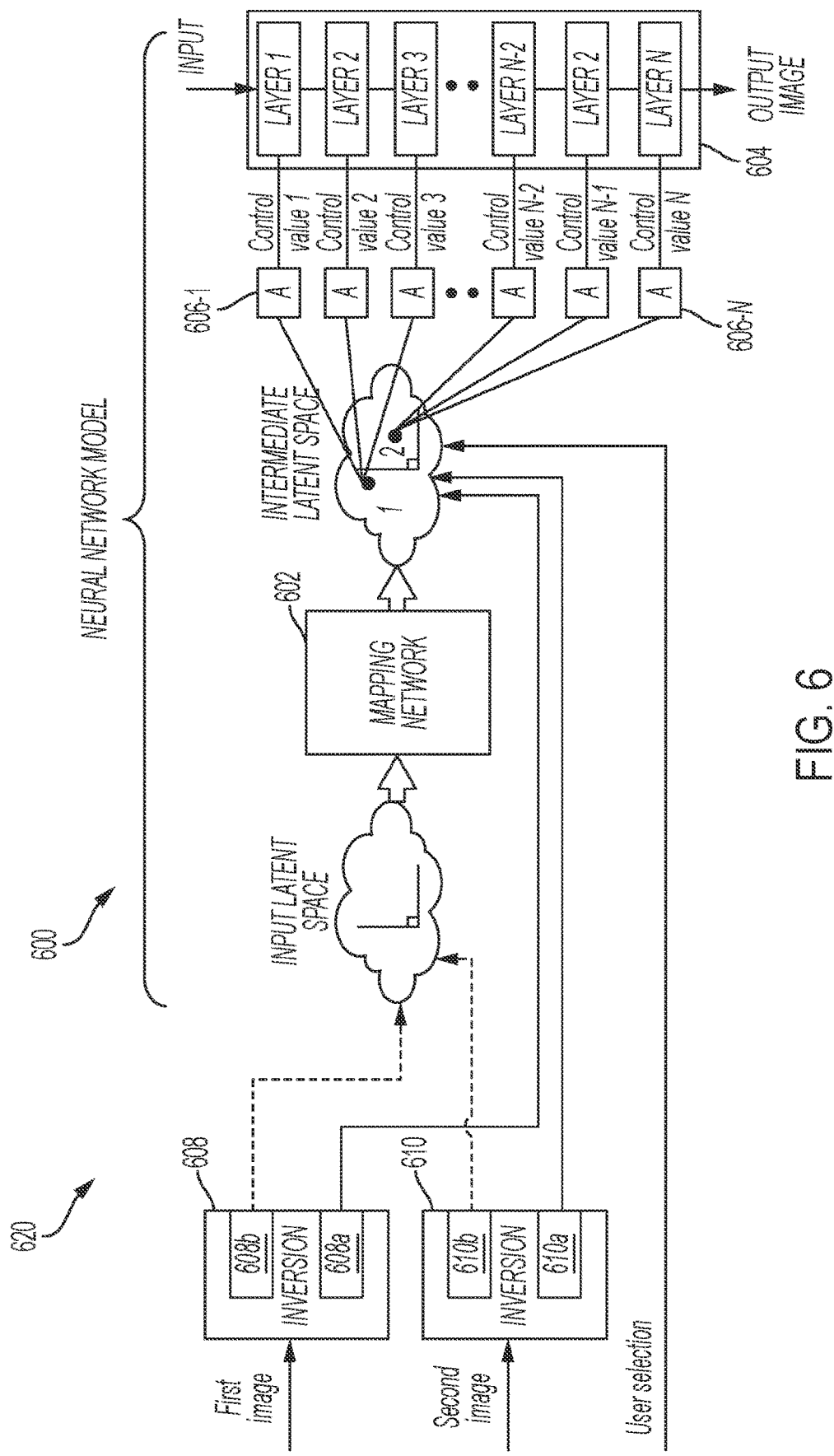
FIG. 6 shows a block diagram of a portion of an example system for generating an output image by mixing characteristics of furniture in two images, in accordance with some embodiments of the technology described herein.

FIG. 6 shows a block diagram of a portion of an example system for generating an output image by mixing characteristics of furniture in two images in accordance with some embodiments of the technology described herein. In some embodiments, a portion 620 of an example system may be implemented in system 100 of FIG. 1. The portion 620 of the system may include a neural network model 600, which may be implemented in neural network model 112 of FIG. 1 or neural network model 200 of FIG. 2. Neural network model 600 may have similar structures as shown in blocks 300 of FIG. 3A, 320 of FIG. 3B or 350 of FIG. 3C. The portion 620 of the system may be configured to implement some embodiments previously described. With reference to FIGS. 1 and 6, in some embodiments, a system, such as system 100 of FIG. 1, may be configured to enable a user to mix various furniture characteristics shown in different images.

In some embodiments, the example system may obtain a first image and a second image, as input images, from a user device. The first image and the second image may be stored on the user device. For example, the input images may be captured by the user device from real furniture. The input images may also be downloaded by the user device from an online store. Alternatively, and/or additionally, the system may obtain one or more images depicting furniture for the user to browse. Various ways of obtaining one or more images for the user to select were described in the present disclosure, and for ease of description, the descriptions of those are not repeated. The user may, via user interface (e.g., 104 in FIG. 1), select a first image and a second image from multiple images, where the first and second images each depicts furniture having some different furniture characteristics. For example, the furniture in the first image and the furniture in the second image may be of different styles, different fabric materials, and/or different colors. In a non-limiting example, if the user is shopping for a sofa in contemporary style and having certain kind of fabric, the system may display multiple first images depicting furniture in contemporary style for the user to select a first image from the multiple first images. The system may also display multiple second images depicting furniture in the user desired fabric for the user to select a second image from the multiple second images. In this case, the first image selected by the user may include a sofa in a contemporary style in leather, whereas the second image may include a sofa in Victorian style having the desired fabric.

In some embodiments, the example system may subsequently receive the first input image and the second input image selected by the user. The system may generate an output image using the first image and the second image and a neural network model. For example, image generator 108 of server 106 (FIG. 1) may be configured to generate an output image depicting a third furniture different from the first furniture and the second furniture. In some embodiments, the example system may, via a user interface (e.g., 104 in FIG. 1) obtain user selection indicative of mixing the first furniture characteristic in the first image with the second furniture characteristic in the second image. The user interface (e.g., 104 of FIG. 1) may be configured to receive user selection indicating how the furniture characteristics shown in the first image and the second image are mixed. For example, the user may select to mix the sofa style in the first image with the fabric shown in the second image. Thus, the system may be configured to generate an output image additionally using the user selection. The output image may depict furniture different from the furniture in the first image and the furniture in the second image, wherein the furniture depicted in the output image includes different characteristics from different images in the manner as indicated in the user selection.

In some embodiments, neural network model 600 may have a similar structure as the neural network model 400 of FIG. 4 and 500 of FIG. 5. The neural network model 600 may be a generative neural network. Neural network model 600 may include a mapping network 602 coupled to a synthesis network 604. An input latent space and an intermediate latent space may be associated with the neural network model, where the mapping network is configured to convert a point in the input latent space to a point in the intermediate latent space. In generating the output image, the system may perform an inversion operation (e.g., 608) to map the first image to a first point in a latent space associated with the neural network model 600. The system may perform another inversion operation (e.g., 610) to map the second image to a second point in the latent space associated with the neural network model 600. The inversion process is described previously in the present disclosure, and thus, the description of the inversion process will not be repeated herein for ease of description. In some embodiments, the system may perform an inversion operation 608a to map the first image to a first point in the intermediate latent space of the neural network model, and perform an inversion operation 610a to map the second image to a second point in the intermediate latent space. In some other embodiments, the system may perform an inversion operation 608b to map the first image to a first point in the input latent space of the neural network model, and perform an inversion operation 610b to map the second image to a second point in the intermediate space.

In some embodiments, synthesis network 604 of neural network model 600 may be configured to generate an output image using the first point and the second point in the latent space. In some examples, the synthesis network 604 of neural network model 600 may be configured to perform operations in a plurality of layers based on a plurality of control values each associated with a respective one of the plurality of layers. In some examples, a first set of control values in the plurality of control values are provided based on the first point in the latent space; and a second set of control values in the plurality of control values are provided based on the second point in the latent space. The first set of control values and the second set of control values may each correspond to certain dimensions in the latent space associated with the neural network value 600. Thus, for a point in the intermediate latent space, certain dimensional values of the point may drive the first set of control values, and certain other dimensional values of the point may drive the second set of control values. In a non-limiting example, the system may take the dimensions of the latent vector associated with the sofa's color, and apply it to another vector that retains coarser details from the second sofa such as armrest length and backseat style.

In some examples, certain layers in the synthesis network 604 may affect certain attributes of furniture. For example, a first set of layers in the synthesis network 604 (e.g., higher layers, or coarse layers) may affect the sofa style, and a second set of layers (e.g., lower layers) in the synthesis network may affect the fabric color of sofa. If the user selection indicates that the furniture style of a sofa in the first image is to be mixed with the fabric color of a sofa in the second image, then the first set of control values may be arranged to include the control values associated with the first set of layers in the synthesis network 604. The second set of control values may be arranged to include the control values associated with the second set of layers in the synthesis network 604.

In implementing such arrangement, in some examples, a mixed vector in the latent space may be created by combining the first point and the second point. For example, the mixed vector may take values in the first point that correspond to the style of a sofa and values in the second point that correspond to the fabric color of a sofa. Consequently, the mixed vector in the latent space may drive the plurality of control values for the synthesis network 604 of neural network model 600, to generate an output image that depicts furniture having blended characteristics respectively from the first image and the second image.

In some embodiments, a training process may be implemented to use a training set including a plurality of training images to determine the correspondence between certain furniture characteristics and certain dimensions of the latent space of the neural network model. FIGS. 24A-D each show multiple example training images depicting furniture in a respective style, in accordance with some embodiments of the technology described herein. FIGS. 24E-F each show multiple example training images depicting furniture in a respective color, in accordance with some embodiments of the technology described herein. For example, the couches in each of FIGS. 24A-24D contribute to respective coarse features, such as the shape and legs and armrests. The couches in each of FIGS. 24E and 24F contribute to a respective feature such as the furniture color.

With reference to FIGS. 1 and 6, the example system, which may implement portion 620 may be implemented in an online search system. For example, upon receiving the synthesized output image generated by the server 106 at the user device 102, the user may wish to purchase furniture having the characteristics shown in the output image. The user device 102 may send the output image, or a variation of the output image (e.g., via some editing, such as cropping, touching up etc.), as a visual query image to the server 106 to initiate an image search. In response, the server 106 may perform an image search (e.g., at image search engine 110) using the received query image. The image search may generate one or more images of furniture similar to the furniture in the query image.

The example system may also be implemented in an online system, such as an online browsing or catalog system, which can be configured to generate synthesized images and display the synthesized images. In other examples, various embodiments disclosed herein can also be implemented in an extended reality (XR) system, which may include virtual reality, augmented reality, or mixed reality. In an XR system, such as an XR system for online furniture shopping, synthesized images depict furniture having various user desired furniture characteristics may be generated and displayed. In other examples, the synthesized images that may be generated in various embodiments disclosed herein may also be transmitted, via a communication network, to another electronic device (e.g., server of a catalog system or print or prepress house) for processing.

FIG. 7A is a flowchart of an example process 700 for generating an output image using an input image, in accordance with some embodiments of the technology described herein. The process 700 may be performed to generate an image depicting furniture having user desired characteristics based on an input image depicting furniture and user selection. In some embodiments, process 700 may be implemented in a computing system such as server 106 of FIG. 1, portion 420 of FIG. 4. In these implementations, neural network models or portions thereof, such as 112 of FIG. 1, 200 of FIG. 2, 300 of FIG. 3A, 320 of FIG. 3B, 350 of FIG. 3C, and 400 of FIG. 4, may be used.

In some examples used to describe the techniques herein, process 700 begins at act 702, where an input image depicting furniture is obtained. The input image may depict furniture having user desired characteristics or that is close to the user desired furniture. The input image may be of any suitable size and in any suitable format, as aspects of the technology described herein are not limited in this respect.

In some embodiments, the input image may be received over at least one communication network or accessed from a non-transitory computer-readable storage medium. For example, a server (e.g., 106 of FIG. 1) may receive the input image from a user device (e.g., 102 of FIG. 1) over a communication network. In providing the input image, the user device may, via a user interface (e.g., 104 of FIG. 1), enable a user to access the user device's local storage and select an image, e.g., capturing an image of real furniture. In some embodiments, the user interface may allow a user to select the input image from one or more images provided by a server (e.g., server 106 of FIG. 1). For example, the server may obtain one or more images depicting furniture and send the one or more images to the user device 102 over at least one communication network. The user device 102 receives the image(s) from the server 106 and displays the images for user to browse and select, for example, via user interface 104. The server 106 may obtain the image(s) for the user to browse and select using various techniques, the details of which are described in embodiments with respect to FIG. 1.

With further reference to FIG. 7A, process 700 may also include act 704 of obtaining user selection. In some embodiments, the user selection may be indicative of a change over the input image in at least one furniture characteristic. The user selection may be provided by a user via a user interface (e.g., 104 of FIG. 1) installed on a user device (e.g., 102). The user interface may include a graphical user element through which a user can provide the user selection indicative of the change in furniture characteristic. For example, the graphical user element may include one or more slide bars, each having a value range corresponding to at least one furniture characteristic. The examples of the slide bars are described in detail in FIGS. 13 and 18.

As previously described, furniture characteristics may be "compressed" into one or more multi-dimensional points in a latent space associated with a neural network model. The neural network model may be used to generate an image depicting furniture from a point in the latent space associated with the neural network model. A neural network model may be a generative neural network model, such as 400 of FIG. 4, 500 of FIG. 5 or 600 of FIG. 6. In these example neural network models, there may be input latent space and intermediate latent space associated with them. The multi-dimensional point representing the furniture characteristics may be in the input latent space or the intermediate latent space. Changing furniture characteristics may be implemented by finding a new point in the latent space based on an old point, where the old point represents the furniture characteristics depicted in the old image and the new point represents the furniture characteristics depicted in the new image. A change of values represented by the graphical user element (e.g., slide bars) may correspond to a change of furniture characteristics in the latent space of the neural network model. For example, a change of furniture characteristics may correspond to a direction in the latent space. When the direction is applied to a first point in the latent space, a new point is identified. The relationship between the one or more slide bars (or other widgets) and furniture characteristics in the latent space may be learned through a training process. The training process may use a neural network model and a plurality of training images to determine how movements in certain directions in the latent space change the appearance of furniture in each training image. The directions that produce the most notable changes may be isolated and associated with assigned slide bars. Details of the graphical element for receiving user selection and the configuration thereof are described in FIGS. 13 and 18.

With further reference to FIG. 7A, process 700 may further include act 706 of mapping the input image to a first point in a latent space associated with a neural network model. As previously described, furniture characteristics may be "compressed" into one or more multi-dimensional points in a latent space associated with a neural network model. Based on a point in a latent space of a neural network model, the neural network model may generate an image depicting furniture having the characteristics that correspond to that point in the latent space. Act 706 is thus an inversion process that may be implemented to find the point in the latent space that generated the target image, namely the input image.

Various inversion methods that may be used to map the input image to the first point in the latent space are described in the present disclosure, such as in the embodiments described in FIGS. 3A-3C. For example, the process may use a projection method that uses an iterative optimization technique to minimize an error between the input image (to be mapped to the latent space) and the image generated by the neural network model based on the projected point (in the latent space). In some examples, the optimization process may use gradient descent. A loss function may be used to measure closeness between the input image and the image generated by a projected point in the latent space. The process may start with a random point in the latent space as an initial point and update the projected point in an iterative search. In some examples, the process may use an encoder network of the neural network model to find an initial point in the latent space and converge to the mapped point from the initial point in an optimization process described as above. In such case, the initial point generated by the encoder network may be close to the user desired furniture characteristics, as thus, the inversion may converge faster. As described previously, the neural network model used in the inversion process may be a generative network, such as a GAN.

Process 700 may further include act 708 of identifying a second point in the latent space using the first point in the latent space and the user selection, where the user selection may be indicative of a change over the input image in at least one furniture characteristic. Process 700 may also include act 710 of generating the output image from the second point in the latent space. The output image may be generated using the neural network model associated with the latent space. In this process, the transformation from the input image to the output image is performed in the latent space, in which the first point corresponds to the characteristics of furniture depicted in the input image, and the second point corresponds to new characteristics of furniture the user desired.

FIG. 7B is a flowchart of an example process 750 for obtaining an input image, which may be implemented in act 702 of FIG. 7A, in accordance with some embodiments of the technology described herein. Process 750 may be performed to obtain input image that may be used in process 700. For example, process 750 describes an example implementation of act 702. In some embodiments, process 750 may be implemented in a computing system such as server 106 of FIG. 1, portion 420 of FIG. 4. Neural network models or portions thereof, such as 112 of FIG. 1, 200 of FIG. 2, 300 of FIG. 3A, 320 of FIG. 3B, 350 of FIG. 3C, and 400 of FIG. 4, may be used.

In some embodiments, process 750 may begin with act 752 of selecting points in a latent space associated with a neural network model. The neural network model used herein may be the same neural network model used in process 700. In some examples, multiple points may be selected based on a user profile that contains information of user preferred furniture characteristics. Thus, the multiple images generated from the multiple points using the neural network model may depict furniture having characteristics close to user desired characteristics. In some other examples, multiple points may be selected randomly in the latent space. Details of obtaining multiple images are described in embodiments described in FIGS. 1 and 2, and thus, will not be repeated. Process 750 may proceed to act 754 of generating multiple images using the multiple points in the latent space. As previously described, a generative neural network may be used to generate an image from a point in the latent space. Details of the generative neural network are described in embodiments with respect to FIGS. 2-3C.

With continued reference to FIG. 7B, process 700 may further include act 756, where the multiple images generated from act 754 may be presented to the user. For example, the multiple images are generated at a server (e.g., 106 of FIG. 1) and are transmitted to user device, e.g., 102 of FIG. 1. The user may receive the multiple images, for example, at user device 102, and select an input image, via a user interface (e.g., 104 of FIG. 1). Process 750 may further include act 758 of obtaining user input indicative of selection of image from the multiple images and act 760 of obtaining the input image. For example, the input image may be provided from the user device to the server. The obtained input image may be used in process 700, in some embodiments.

The processes 700 and 750 described with respect to FIGS. 7A-7B are illustrative and there are variations. For example, instead of obtaining input image depicting furniture at act 702 from a user device, a server may use a pre-stored image or access an image from the network without requiring the user to send the input image. In that case, process 750 may be entirely optional. In other variations, the server may pre-calculate and store the mapped point for the input image. Thus, instead of performing act 706, process 700 may obtain the first point in the latent space by accessing a storage medium or downloading from the network. In other examples, the first point in the latent space may be sent by the user along with the input image. It is thus appreciated that the input image and its corresponding point in the latent space may be obtained or pre-stored from any suitable device and on any suitable storage.

Figure 8:
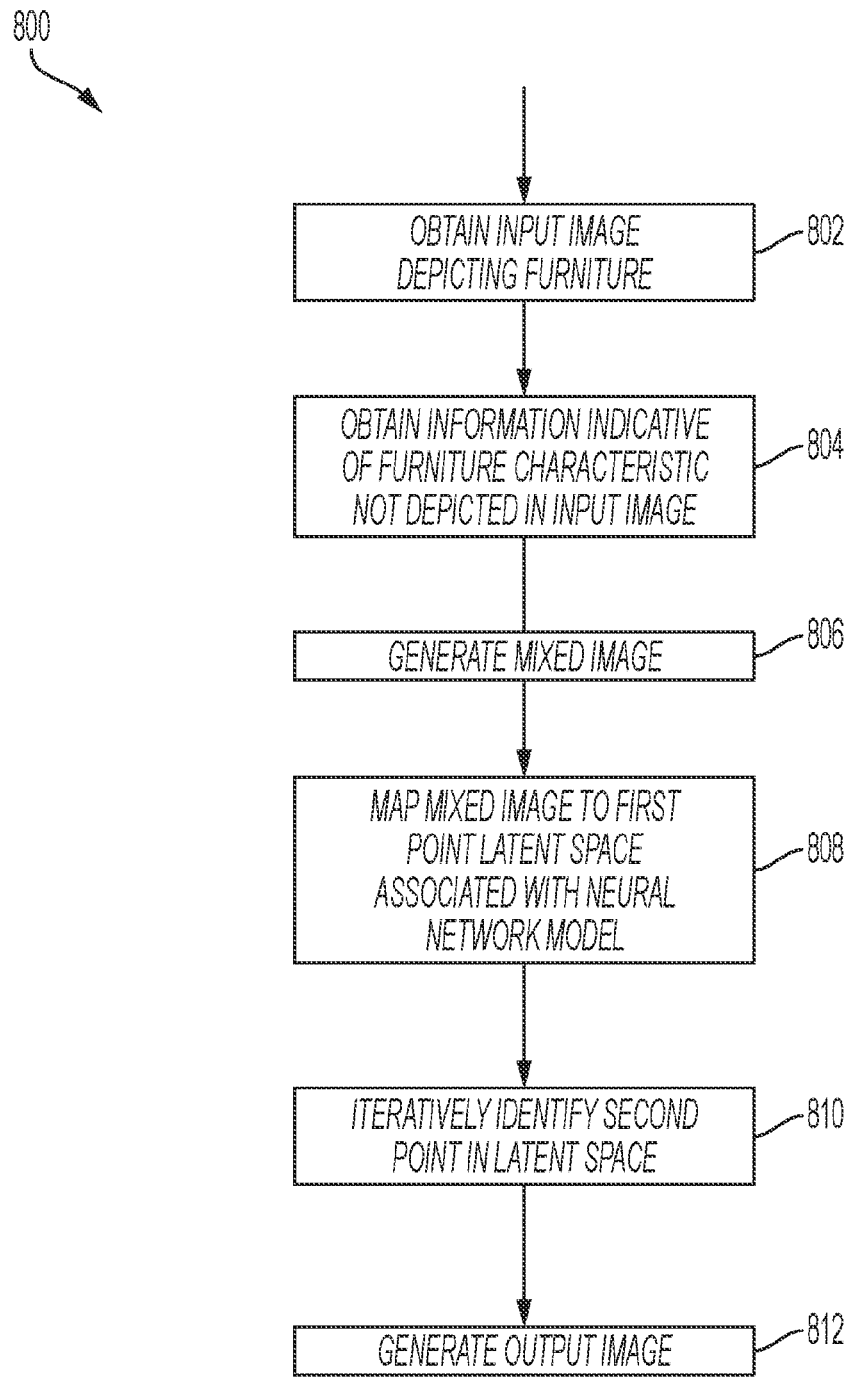
FIG. 8 is a flowchart of an example process for generating an output image using an input image and information indicative of a characteristic not depicted in the input image, in accordance with some embodiments of the technology described herein.

FIG. 8 is a flowchart of an example process 800 for generating an output image using an input image and information indicative of a characteristic not depicted in the input image, in accordance with some embodiments of the technology described herein. The process 800 may be performed to visually change the characteristic of furniture in the input image by replacing certain characteristics with a desired one. In some embodiments, process 800 may be implemented in a computing system such as server 100 of FIG. 1, portion 520 of FIG. 5.

In some examples used to describe the techniques herein, process 800 begins at act 802, where an input image depicting furniture is obtained. The input image may be obtained in a similar manner as described with respect to act 702 of process 700, where the input image may depict furniture having certain characteristics. In some scenarios, the furniture in the input image may have one or more user desired characteristics not depicted in the image. For example, the furniture in the input image is a sofa and the fabric color of the sofa may not be the user's desired color. In such case, process 800 may include act 804 of obtaining information indicative of furniture characteristic not depicted in the input image. Information indicative of furniture characteristics not depicted in the input image may be provided by the user and may indicate missing characteristics that the user desires. In the above example, the information may include the fabric color of user's desire. In some examples, the user may use a user interface, e.g., 104 of FIG. 1 installable on a user device 102 to select the user desired furniture characteristic that is not depicted in the input image. For example, the user interface may provide one or more images of sample materials desired by the user. An example of the user interface that includes multiple mask images is shown in FIG. 20A, in which each mask image contains a different fabric color.

In some examples, information indicative of furniture characteristics not depicted in the input image may additionally include information indicative of which furniture characteristics in the input image the user wishes to replace with the furniture characteristics not depicted in the image. Examples of user interface that may be implemented to allow user to provide information indicative of furniture characteristics to be replaced are further described previously in the present disclosure with reference to FIG. 20B.

With continued reference to FIG. 8, acts 806-812 may be implemented to replace certain characteristics of the furniture depicted in the input image with user desired one using the information described above that is indicative of furniture characteristics not depicted in the input image. In these implementations, neural network models or portions thereof, such as 112 of FIG. 1, 200 of FIG. 2, 300 of FIG. 3A, 320 of FIG. 3B, 350 of FIG. 3C, and 500 of FIG. 5, may be used.

In some examples act 806 may be implemented to generate a mixed image from the input image. For example, as shown in FIGS. 20B, 21A, 21B, and 22B, a mixed image may include the input image with a mask image overlaid at where the furniture characteristic in the input image needs to be replaced, where the mask image may include the user desired missing characteristic that is not depicted in the input image. Process 800 may further include act 808 of mapping the mixed image to a first point in a latent space of the neural network model. Inversion process that is previously described, for example, in act 706 of process 700 (FIG. 7A) may be used. Once act 808 is performed, the mapped first point in the latent space of the neural network model may represent certain furniture characteristics in both the input image and the mask image. This first point mapped from the mixed image may be used as an initial point in an optimization process to identify and update a second point in the latent space. This optimization process is further explained with reference to acts 810 and 812 in process 800.

At act 810, a second point in the latent space may be iteratively identified and updated from the initial point mapped from the mixed image based on a loss function (e.g., an error metric). A point in the latent space from each iteration may be used to generate/update the output image at act 812 using the neural network model that was used in the inversion process in connection with act 808. The iteration may be performed in an optimization process using gradient descent. The error metric in the optimization process may indicate the closeness between the output image and the mixed image. In some examples, the error metric may be computed in a region of the mixed image instead of the entire image, where the region corresponds to the image depicting the furniture characteristic. FIG. 20C shows an example of a mask indicative of the region of overlay in FIG. 20B in accordance with some embodiments of the technology described herein. The example mask may be used to only calculate the loss in the output image by only calculating the difference between the generated image and the region with the overlapping mixed image.

In some embodiments, the optimization process may end when the calculated loss is below a threshold value. In other embodiments, the optimization process may end when the number of iterations exceeds a threshold number. Once the optimization process is completed, the output image in the current iteration will be the final output image, which depicts furniture having certain characteristics in the input image replaced by the desired missing furniture characteristics.

The process 800 described with respect to FIG. 8 is illustrative and there are variations. For example, act 804 of obtaining information indicative of furniture characteristic not depicted in the input image may not be limited to using an image of material sample or a mask image. Other tools/widgets, such as a painting tool, may be available to allow a user to select the user desired characteristic and/or furniture characteristics in the input image that need to be replaced with the desired one.

Figure 9:
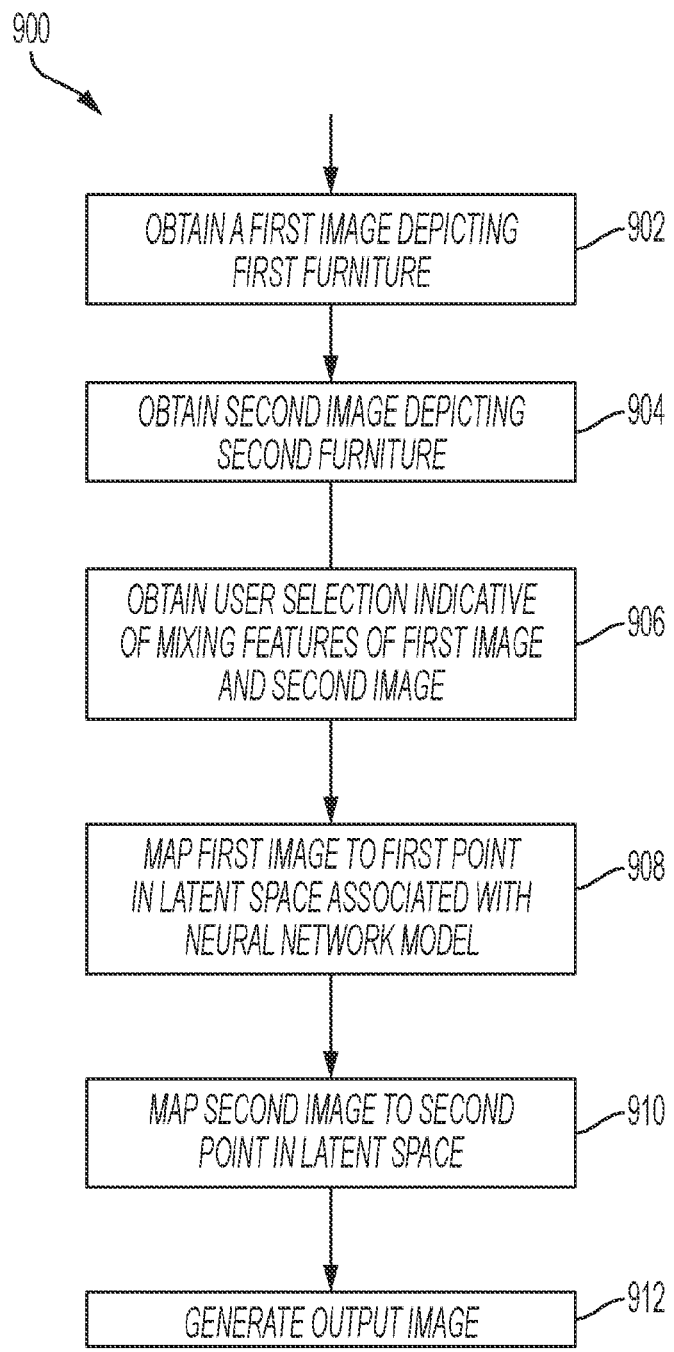
FIG. 9 is a flowchart of an example process for generating an output image of furniture from two images depicting objects having different characteristics, in accordance with some embodiments of the technology described herein.

FIG. 9 is a flowchart of an example process 900 for generating an output image of furniture from two images depicting objects having different characteristics, in accordance with some embodiments of the technology described herein. The process 900 may be performed to visually mix characteristics of different furniture. In some embodiments, process 900 may be implemented in a computing system such as server 100 of FIG. 1, portion 620 of FIG. 6.

In some examples used to describe the techniques herein, process 900 begins at act 902, where a first image depicting first furniture is obtained, and act 904, where a second image depicting second furniture is obtained. In some scenarios, the furniture depicted in the first image and second image may have different characteristics. For example, the furniture in the first image and the furniture in the second image may be of different styles, different fabric materials, and/or different colors. In a non-limiting scenario, the first image selected by the user may include a sofa in a contemporary style in leather, whereas the second image may include a sofa in Victorian style having the desired fabric. The first image and second image may each be obtained in a similar manner as described with respect to act 702 of process 700 and act 802 of process 800, where the input image may depict furniture having certain characteristics. Being different from processes 700 and 800, instead of selecting one input image depicting furniture for user to manipulate, process 900 allows a user to select two images each depicting different characteristics and mix the different furniture characteristics shown in the two images to generate an output image.

Process 900 may further include act 906 of obtaining user selection indicative of mixing features of furniture in the first image and the second image. In some embodiments, a user interface (e.g., 104 in FIG. 1) may be used to obtain user selection indicative of mixing the first furniture characteristic in the first image with the second furniture characteristic in the second image. The user interface (e.g., 104 of FIG. 1) may be configured to receive user selection indicating how the furniture characteristics from the first image and the second image are mixed. For example, the user may select to mix the style of a sofa shown in the first image with the fabric of a sofa shown in the second image.

Acts 908-912 of process 900 further describe operations to mix different furniture characteristics from the first image and the second image to generate an output image using a neural network model. In some embodiments, neural network models or portions thereof that are previously described in the present disclosure, such as 112 of FIG. 1, 200 of FIG. 2, 300 of FIG. 3A, 320 of FIG. 3B, 350 of FIG. 3C, and 600 of FIG. 6, may be used. In some embodiments, at act 908, the first image may be mapped to a first point in a latent space associated with the neural network model. This mapping may be performed using an inversion process, the descriptions of which are disclosed previously in the present disclosure, such as in embodiments in FIGS. 2-3C, and thus, will not be repeated. At act 910, the second image may be mapped to a second point in the latent space associated with the neural network model. The first point and the second point may be in an input latent space, or in an intermediate latent space associated with the neural network model. For example, as result of the inversion operation, the first image and the second image may be mapped to respective points in the intermediate latent space of the neural network model.

At act 912, the output image may be generated using a neural network model. For example, the neural network model used in the inversion process may be used. In some embodiments, a synthesis network (e.g., 604) of a generative neural network model (e.g., 600) may be configured to generate an output image using the first point and the second point in the latent space. The synthesis network may be configured to perform operations in a plurality of layers based on a plurality of control values each associated with a respective one of the plurality of layers. In some examples, a first set of control values in the plurality of control values may be provided based on the first point in the latent space; and a second set of control values in the plurality of control values may be provided based on the second point in the latent space. The first set of control values and the second set of control values may each correspond to certain dimensions in the latent space associated with the neural network model. Thus, for a point in the intermediate latent space, certain dimensional values of the point may drive the first set of control values, and certain other dimensional values of the point may drive the second set of control values.

In some examples, certain layers in the synthesis network may affect certain attributes of furniture. For example, a first set of layers in the synthesis network (e.g., higher layers, or coarse layers) may affect the sofa style, and a second set of layers (e.g., lower layers) in the synthesis network may affect the fabric color of sofa. If the user selection indicates that the furniture style of a sofa in the first image is to be mixed with the fabric color of a sofa in the second image, then the first set of control values may be arranged to include the control values associated with the first set of layers in the synthesis network. The second set of control values may be arranged to include the control values associated with the second set of layers in the synthesis network.

In implementing such arrangement, in some examples, a mixed vector in the latent space may be created by combining the first point and the second point. For example, the mixed vector may take values in the first point that correspond to the style of a sofa and values in the second point that correspond to the fabric color of a sofa. Consequently, the mixed vector in the latent space may drive the plurality of control values for the synthesis network of neural network model, to generate an output image that depicts furniture having mixed characteristics respectively from the first image and the second image.

The process 900 described with respect to FIG. 9 is illustrative and there are variations. For example, act 906 may be optional. In some embodiments, the user prompt the system to provide images of two user desired furniture characteristics, e.g., Victorian style, cherry color. The system may provide user with a first set of images containing a first furniture characteristic (e.g., Victorian style) and a second set of images containing a second furniture characteristics (e.g., Cherry color). In this example, the user may select the first input image from the first set of images and select the second input image from the second set of images. Once the first and second input images are selected, the system will already know that the style of the furniture in the first input image should be mixed with the color of the furniture in the second image. As such, act 906 will not be needed. Other variations may also be possible. For example, acts 908 and 910 may be optional, whereas the mapped points in the latent space of the neural network model may be generated and stored in a storage previously for later retrieval, which may result in the performance of the process in speed. In other variations, the characteristics or the images depicting furniture are not limited to two. In other words, process 900 may be implemented to mix more than two furniture characteristics shown in more than two images.

Figure 7:
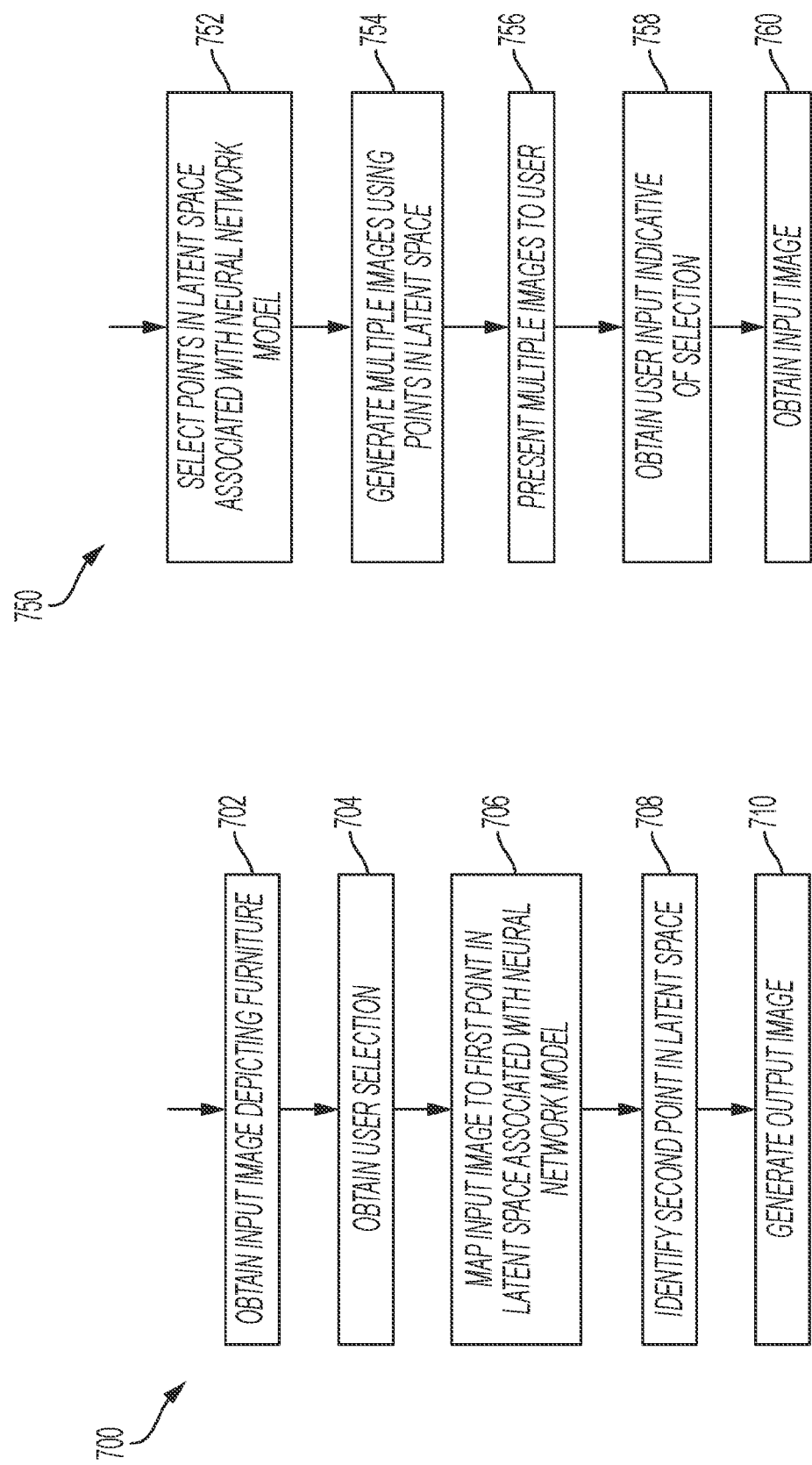
FIG. 7A is a flowchart of an example process for generating an output image using an input image, in accordance with some embodiments of the technology described herein.
FIG. 7B is a flowchart of an example process for obtaining an input image, which may be implemented as part of act 702 of FIG. 7A, in accordance with some embodiments of the technology described herein.
Figure 10:
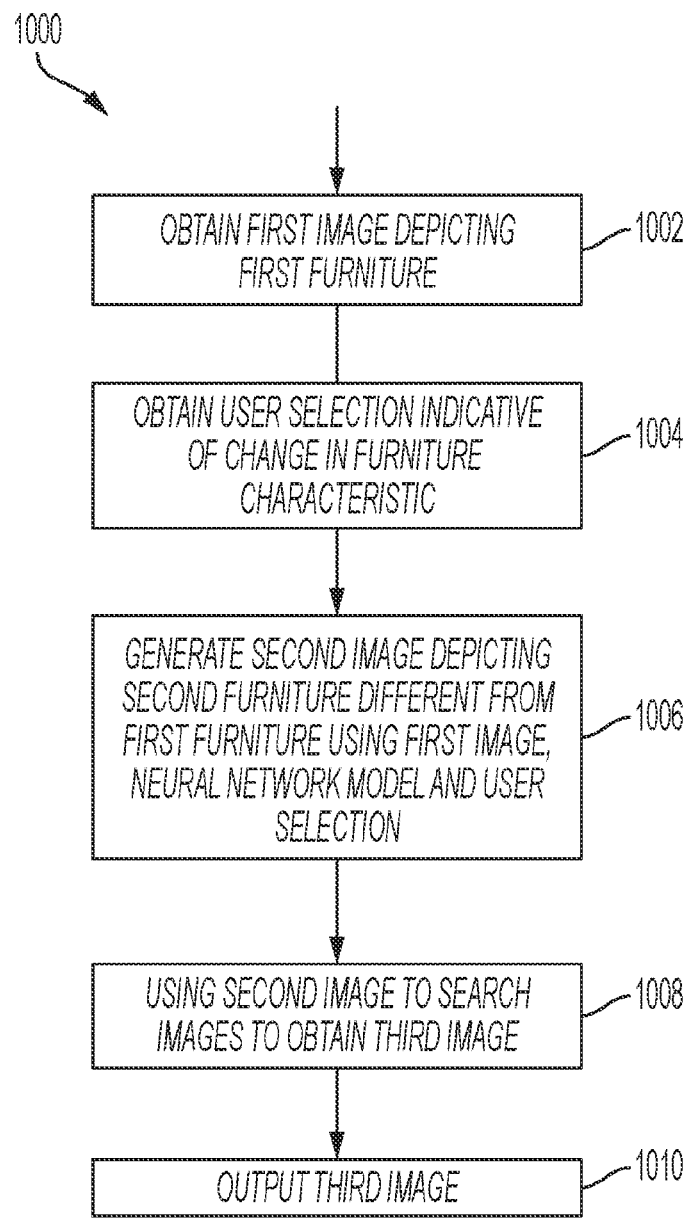
FIG. 10 is a flowchart of an example process for searching for furniture images, in accordance with some embodiments of the technology described herein.

FIG. 10 shows an example process for searching images in accordance with some embodiments of the technology described herein. The process 1000 may be performed to implement a web-based shopping system that allows user to search by visual query image, where the visual query image may be generated using any of the processes 700, 800 and 900 (FIGS. 7-9). In some embodiments, process 1000 may be implemented in a computing system such as server 100 of FIG. 1, portion 420 of FIG. 4, portion 520 of FIG. 5, or portion 620 of FIG. 6. In these implementations, neural network models or portions thereof, such as 112 of FIG. 1, 200 of FIG. 2, 300 of FIG. 3A, 320 of FIG. 3B, 350 of FIG. 3C, 400 of FIG. 4, 500 of FIG. 5, or 600 of FIG. 6 may be used.

In some examples used to describe the techniques herein, process 1000 begins at act 1002, where an input image depicting furniture is obtained. The input image may be obtained in a similar manner as act 702 of process 700, act 802 of process 800, or act 902 of process 900. Process 1000 may further include act 1004 of obtaining user input indicative of change in furniture characteristics, act 1006 of generating a second image depicting second furniture different from first furniture using the first image, a neural network model and user selection, act 1008 of using the second image to search images in an online database to obtain a third image depicting furniture having similar characteristics to the second furniture, and act 1010 of outputting the third image. These acts may be implemented to generate the second image from the first image in a similar manner as embodiments described in FIGS. 7-9.

In a first embodiment, acts 1002-1006 may be implemented to generate the second image depicting furniture having user desired characteristics based on the first image depicting furniture and user selection, in a similar manner as described in process 700 of FIG. 7A. For example, act 1002 may be implemented in a similar manner as described with respect to act 702 of FIG. 7A to obtain a first image. Act 1004 may be implemented in a similar manner as act 704 to obtain a user selection that may be indicative of a change over the first image in at least one furniture characteristic. Similar to act 704, the user selection may be provided by a user via a user interface (e.g., 104 of FIG. 1) on a user device (e.g., 102). The user interface may include a graphical user element through which a user can provide the user selection indicative of the change in furniture characteristic. For example, the graphical user element may include one or more slide bars, each having a value range corresponding to at least one furniture characteristic.

Act 1006 may be implemented in a similar manner as described in acts 706, 708, 710. For example, a neural network model, e.g., 400 in FIG. 4 may be used. The neural network model may be a generative neural network, for example. Similar to act 706, act 1006 may map the first image to a first point in a latent space associated with the neural network model using an inversion process. Various inversion methods, such as those described in the embodiments of FIGS. 2-3C may be used. Act 1006 may further identify a second point in the latent space using the first point and user selection, in a similar manner as described with respect to act 708. Similar to act 708, the first point may be in the input latent space, or intermediate latent space of the neural network model. The change of furniture characteristics in the user selection may correspond to a direction in the latent space. Thus, the second point in the latent space may be identified by applying the direction to the first point in the latent space.

Act 1006 may be implemented to further generate the second image from the second point in the latent space, in a similar manner as described with respect to act 710. For example, the second image may be generated using a synthesis network of the neural network model. In this process, transformation from the input image to the output image is performed in the latent space, in which the first point corresponds to the characteristics of furniture depicted in the first image, and the second point corresponds to new characteristics of furniture the user desires.

In a second embodiment, acts 1002-1006 may be implemented to generate a second image using a first image and information indicative missing characteristic in a similar as described with respect to process 800 of FIG. 8. For example, act 1002 may be implemented in a similar manner as act 802 of FIG. 8 to obtain a first image. Act 1004 may be implemented in a similar manner as act 804 to obtain information indicative of furniture characteristic not depicted in the first image. For example, information indicative of furniture characteristics not depicted in the input image may be provided by the user and may indicate the user desired characteristics. In some examples, the user interface may provide one or more images of sample materials desired by the user. An example of the user interface that includes multiple mask images is shown in FIG. 20A. In some examples, information indicative of furniture characteristics not depicted in the input image may additionally include information indicative of which furniture characteristics in the input image the user wishes to replace with the furniture characteristics not depicted in the image. For example, a method of overlaying a mask image of user desired characteristic onto furniture depicted in the input image is described previously in the present disclosure with reference to FIG. 20B.

Act 1006 may be implemented in a similar manner as described in acts 806-812 to replace certain characteristics of the furniture depicted in the first image with user desired one using the information described above that is indicative of furniture characteristics not depicted in the first image. For example, a neural network model, e.g., 500 in FIG. 5 may be used. The neural network model may be a generative neural network. Similar to act 806, act 1006 may be implemented to generate a mixed image from the first image. For example, as shown in FIGS. 20B, 21A, 21B, and 22B, a mixed image may include the first image with a mask image overlaid at where the furniture characteristic in the input image needs to be replaced, where the mask image may include the user desired characteristic that is not depicted in the input image.

Act 1006 may be implemented to further map the mixed image to a first point in a latent space of the neural network model in a similar manner as described with respect to act 808. For example, an inversion process that is previously described, for example, in act 706 of process 700 (FIG. 7A) may be used. Once the inversion process is performed, the mapped first point in the latent space of the neural network model may represent certain furniture characteristics in both the first image and the mask image. Similar to acts 810 and 812, act 1006 may be implemented to further identify and update a second point in the latent space from the first point (as an initial point) mapped from the mixed image in an iterative search based on a loss function. For example, a point in the latent space from each iteration may be used to generate/update the output image using the neural network model that was used in the inversion process. The iterative search may be performed in an optimization process using gradient descent. The error metric in the optimization process may indicate the closeness between the output image and the mixed image. Once the optimization process is completed, the output image will be the second image, which depicts furniture having the user desired characteristics not depicted in the first image.

In a third embodiment, acts 1002-1006 may be implemented to generate a second image by mixing characteristics of furniture in two images in a similar manner as described with respect to process 900 of FIG. 9. For example, act 1002 may be implemented in a similar manner as acts 902 and 904 of FIG. 9 to obtain a first image depicting first furniture and additionally a fourth image depicting a second furniture. Act 1004 may be implemented in a similar manner as described with respect to act 906, to obtain user selection indicative of mixing features of furniture in the first image and the fourth image. For example, act 1006 may be implemented to, via a user interface (e.g., 104 in FIG. 1), obtain user selection indicative of mixing the first furniture characteristic in the first image with the second furniture characteristic in the fourth image. The user interface (e.g., 104 of FIG. 1) may be configured to receive user selection indicating how the furniture characteristics from the first image and the fourth image are mixed. For example, the user may select to mix the sofa style in the first image with the fabric shown in the fourth image.

Act 1006 may be implemented in a similar manner as described with respect to acts 908-912 of process 900, to mix different furniture characteristics from the first image and the fourth image to generate the second image using a neural network model. For example, neural network models or portions thereof that are previously described in the present disclosure, such as 112 of FIG. 1, 200 of FIG. 2, 300 of FIG. 3A, 320 of FIG. 3B, 350 of FIG. 3C, and 600 of FIG. 6, may be used. In some embodiments, act 1006 may be implemented to map the first image to a first point in a latent space associated with the neural network model, and map the fourth image to a second point in the latent space, in a similar manner as described with respect to acts 908 and 910. The first point and the second point may be in an input latent space, or an intermediate latent space associated with the neural network model. For example, as result of the inversion operation, the first image and the fourth image are mapped to respective points in the intermediate latent space of the neural network model.

Act 1006 may further be implemented to generate the third image using the neural network, in a similar manner as described with respect to act 912. For example, the neural network model 600 of FIG. 6 may be used. In some embodiments, a synthesis network (e.g., 604) of the neural network model (e.g., 600) may be configured to generate third image using the first point and the second point in the latent space. The synthesis network may be configured to perform operations in a plurality of layers based on a plurality of control values each associated with a respective one of the plurality of layers. In some examples, a first set of control values in the plurality of control values may be provided based on the first point in the latent space; and a second set of control values in the plurality of control values may be provided based on the second point in the latent space. The first set of control values and the second set of control values may each correspond to certain dimensions in the latent space associated with the neural network model. Thus, for a point in the intermediate latent space, certain dimensional values of the point may drive the first set of control values, and certain other dimensional values of the point may drive the second set of control values.

In some examples, certain layers in the synthesis network may affect certain attributes of furniture. For example, a first set of layers in the synthesis network (e.g., higher layers, or coarse layers) may affect the sofa style, and a second set of layers (e.g., lower layers) in the synthesis network may affect the fabric color of sofa. If the user selection indicates that the furniture style of a sofa in the first image is to be mixed with the fabric color of a sofa in the fourth image, then the first set of control values may be arranged to include the control values associated with the first set of layers in the synthesis network. The second set of control values may be arranged to include the control values associated with the second set of layers in the synthesis network.

In implementing such arrangement, in some examples, a mixed vector in the latent space may be created by combining the first point and the second point. For example, the mixed vector may take values in the first point that correspond to the style of a sofa and values in the second point that correspond to the fabric color of a sofa. Consequently, the mixed vector in the latent space may drive the plurality of control values for the synthesis network of neural network model, to generate an output image that depicts furniture having mixed characteristics respectively from the first image and the fourth image.

With further reference to FIG. 10, process 1000 may further include act 1008 of using the second image to search images to obtain a third image, where the second image may be generated, as a visual query image, in various embodiments previously described with respect to acts 1002-1006. The image search may be performed to search images/videos in an image/video database, such as 114 of FIG. 1, and return the search result as the third image. Any image search algorithms now or later developed may be used. Process 1000 may further include act 1010 of returning the using the second image to search images to obtain a third image, where the third image depicts furniture with similar characteristics to the furniture in the second image (visual query image). With various embodiments previously described, the second image (visual query image) may be generated to depict furniture having the user desired characteristics. Thus, the performance of subsequent image search may be improved in terms of speed and accuracy.

FIG. 13 shows an example software tool 1300 for allowing a user to vary characteristics of furniture, which results in different output images, in accordance with some embodiments of the technology described herein. The software tool 1300 may be implemented in system 100 of FIG. 1, such as user interface 104 on the user device 102. As shown in FIG. 13, the user interface 1300 may include a plurality of slide bars. These slide bars may be configured to allow a user to change one or more furniture characteristics such as, width, height, orientation, color, and/or gloss of the furniture, over a selected image. These slide bar may also be configured to allow a user to change characteristics of furniture materials and/or fabric, such as plush, color, material and/or pillow height. Other examples of furniture characteristics may include lighting, shadow, and/or any characteristics specific to certain materials, such as the grain of letter or texture of fabric, and/or gloss of paint etc.

In some embodiments, adjusting the slide bars in the user interface, for example, changing sofa height from high to low or changing color of the furniture from white to black, may correspond to a change of direction that crosses a "boundary" in the latent space. Techniques may be used to find the "boundaries" in the latent space for editing furniture characteristics. In some embodiments, a training process may use Principal Component Analysis (PCA) to find meaningful directions of change without human supervision. For example, using PCA to find directions in a latent space of a generative adversarial network is described in E. Harkonen et. al., "GANSpace: Discovering Interpretable GAN Controls," 34$^{th}$ Conference on Neural Information Processing Systems (NeurIPS 2020), in Advances in Neural Information Processing Systems, 2020, Vol. 33, pp. 9841-9850, which is incorporated by reference herein in its entirety. Take sofa as an example, when PCA is applied, the training process may use a training set comprising a plurality of training images each depicting sofa. The training process may use a neural network model (e.g., neural network model 112 of FIG. 1, or neural network model or a portion thereof shown in FIGS. 2-6) to determine how movements in certain directions in the latent space change the appearance of sofa in each training image. The directions that produce the most notable changes may be isolated and associated with assigned slide bars. For example, directions that cause the furniture in training images to change height may be isolated and associated with a slide bar. The slide bar may also be assigned a semantic meaning, such as furniture height. Each slide bar in the user interface 1300 may be associated with multiple values. In some implementations, a unit vector may be stored and mapped to each slide bar. Each slide bar may have a "semantic meaning." As such, when user moves a slide bar by a certain value, it may indicate an amount to move in a direction corresponding to the characteristic being assigned and controlled by that slide bar.

Although PCA-based method is described to find a direction in the latent space, it is appreciated that other methods are also available. For example, a training process may be configured to "isolate" the features in the latent space by finding a direction vector in this space, such that when a point in the latent space is moved in that direction only a single aspect of the sofa changes. It may be noted that the relationship between a "semantic meaning" and a dimension in the latent space is not one-on-one. For example, some furniture characteristics may be influenced by multiple values of the vector in the latent space. In some embodiments, a training process may include labeling imagery generated by the neural network from a point in the latent space into binary categories (e.g. leather sofa/not-leather sofa). Using the labeled data, the training process may find a boundary (viewing it as a plane in the multi-dimensional latent space). When a point is moved perpendicular to the plane, the associated binary feature (e.g., leather sofa/not-leather sofa) is changed in the generated image.

Figure 14:
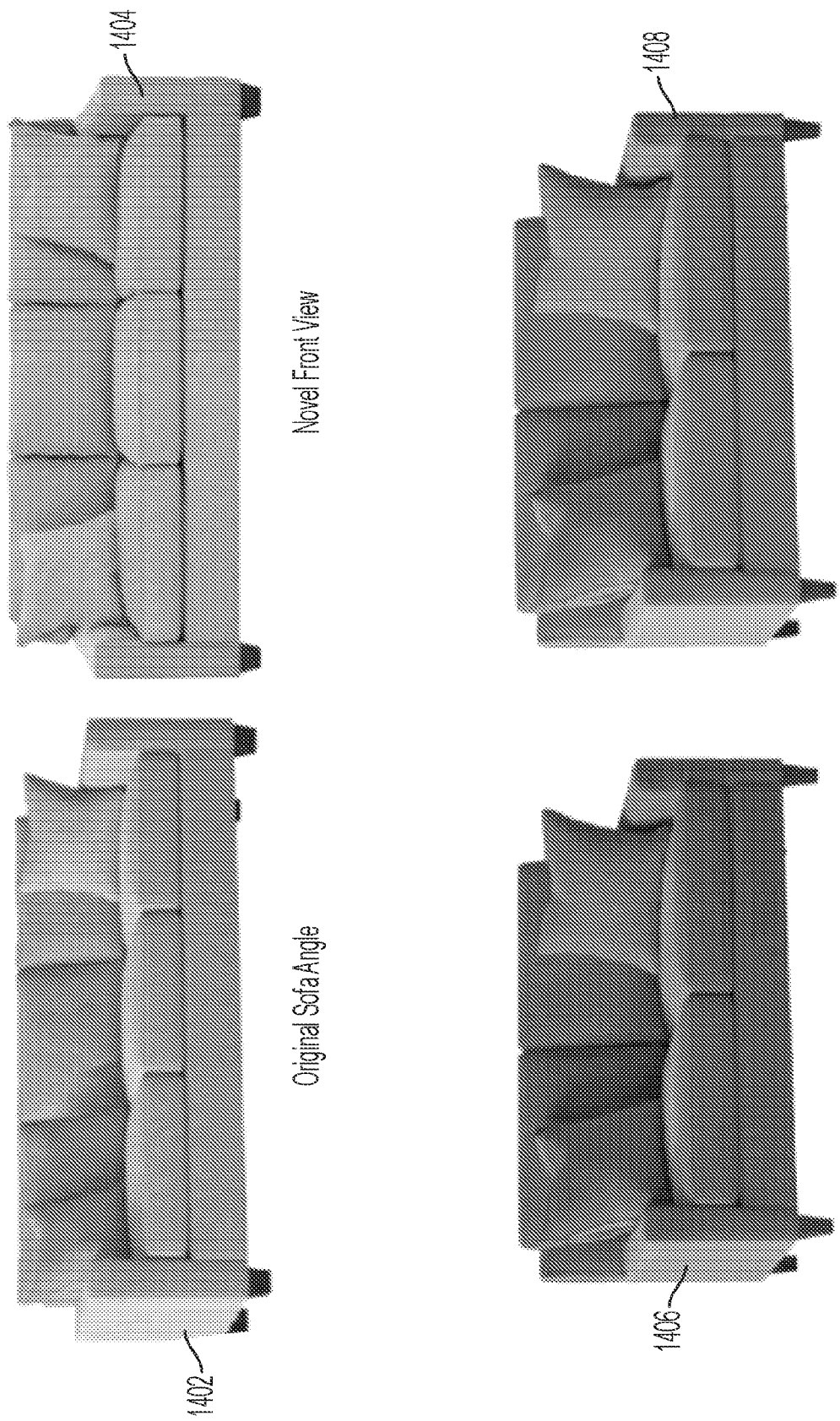
FIG. 14 shows examples of generating an output image depicting furniture from an input image depicting furniture, in accordance with some embodiments of the technology described herein.

FIG. 14 shows examples of generating an output image depicting furniture from an input image depicting furniture, in accordance with some embodiments of the technology described herein. In some embodiments, generating the output images shown in FIG. 14 may be implemented in system 100 of FIG. 1 or portion 420 of an example system in FIG. 4, or as part of process 700 of FIG. 7A. Images 1402 is an original sofa image at a particular angle. Image 1404 is generated by an image generator (e.g., 110 of FIG. 1) using a neural network model (e.g., 112 of FIG. 1, 200 of FIG. 2, 400 of FIG. 4, or any portion shown in FIGS. 3A-3C) and user selection regarding change of furniture characteristics from the original image. In this image, image 1401 is a front view of the same sofa shown in 1402. In another example, image 1406 is an original sofa image at certain lighting. Image 1408 depicts the same sofa shown in image 1406 with brighter ambient lighting.

Figure 15:
FIG. 15 shows examples of training images for training a neural network model, in accordance with some embodiments of the technology described herein.
Figure 15:
Figure 15:

FIG. 15 shows examples of training images for training a neural network model, in accordance with some embodiments of the technology described herein. In the samples shown, the training images may include sofa in variety of styles, color, sizes, and materials. In some examples, the training images may be gathered from images of sofas, user-captured images, or computer rendered graphics.

Figure 16:
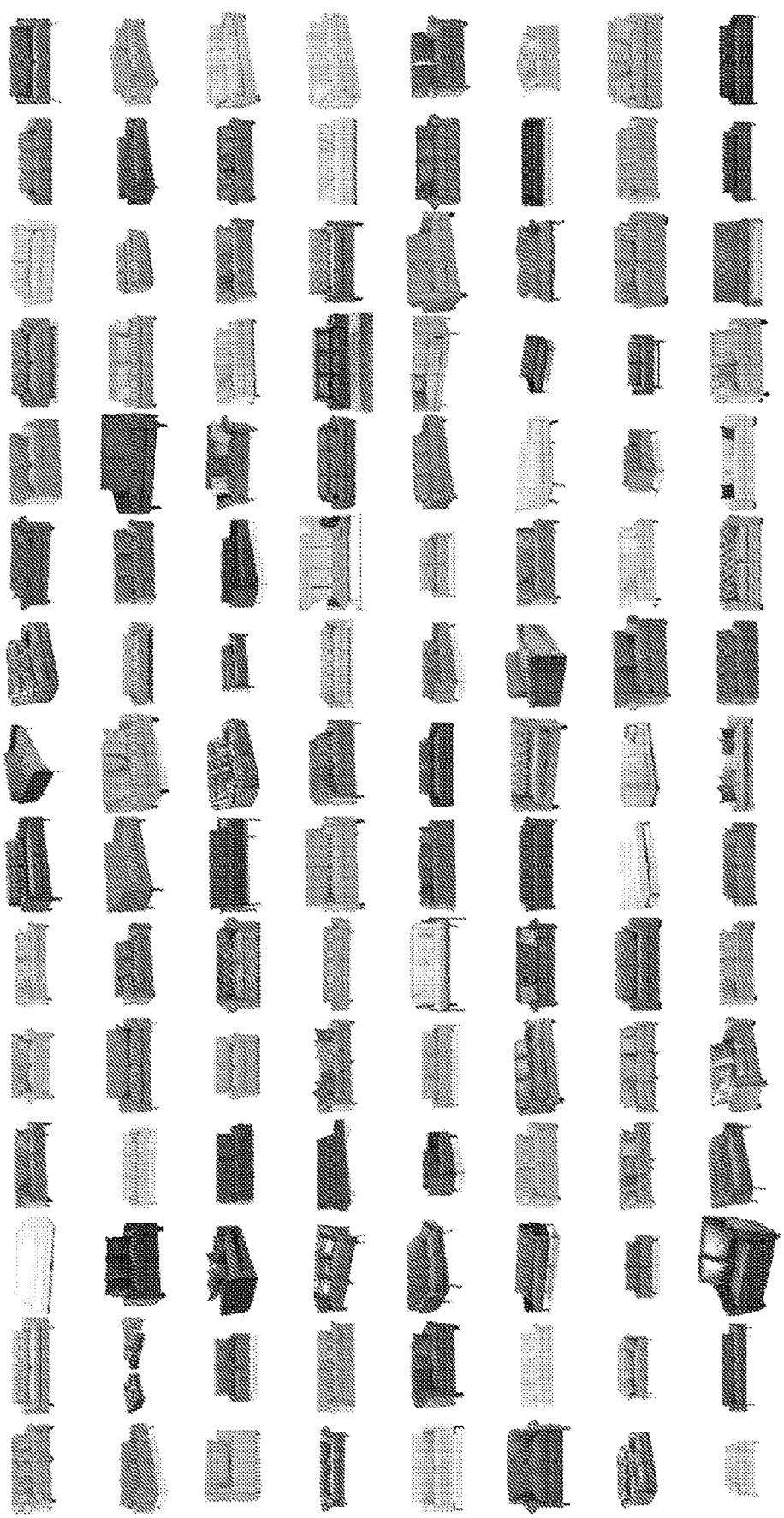
FIG. 16 shows additional examples of training images for training a neural network model, in accordance with some embodiments of the technology described herein.

FIG. 16 shows examples of additional training images for training a neural network model in accordance with some embodiments of the technology described herein. In collecting the training images, which may be obtained from images of sofas, user-captured images, or computer rendered graphics, deficiencies in the training images may exist. In some embodiments, a training process may be used to clean the data, and/or train different models on varying versions of the dataset as well as different hyperparameters. In an initial training, the training process may use horizontal mirroring to ensure symmetry in the couches because repetitive couches in a same training image may exist (see second image from left at second row). The training process may further setup the auto-hyperparameter which may derive parameters such as the minibatch, learning rate and gamma based on image resolutions. Such process makes the training images more consistent.

In some examples, the training process monitors Frechet Inception Distance (FID) and the images being generated in the training. Based on the monitoring, the training process may pause to change hyperparameters. For example, the training process may reduce the learning rate as the FID decreases. After each pause, the training process may resume from the last checkpoint created in a previous run. In some examples, the training process may restrict the orientation to only front facing sofas to make it easier for the model to learn features.

The inventors have recognized that transfer learning with a base model that's trained on a diverse and large dataset shows significantly better results than training from scratch and it reduces the amount of training data required. In some embodiments, a training process may use a pre-trained model as a base. For example, to train a model for furniture, the training process may use a Flickr-Faces-HQ (FFHQ) model as a base model. During training, the process may change different hyperparameters, such as the learning rate, for example. In some embodiments, the training process may initially keep the learning rate at a default value, such as 0.002, and then reduce it to 0.0015 and then 0.0010 (or other suitable values) as the training progresses. Additionally, and/or alternatively, the training process may monitor the augment value and FID, which are metrics indicative of whether the training is proceeding in the right direction. In some examples, the training process may ensure the augment value is consistently below a threshold value, e.g., 0.5, to ensure no overfitting. In some embodiments, the training data may be augmented by filtering, geometric and affine transforms.

Figure 17:
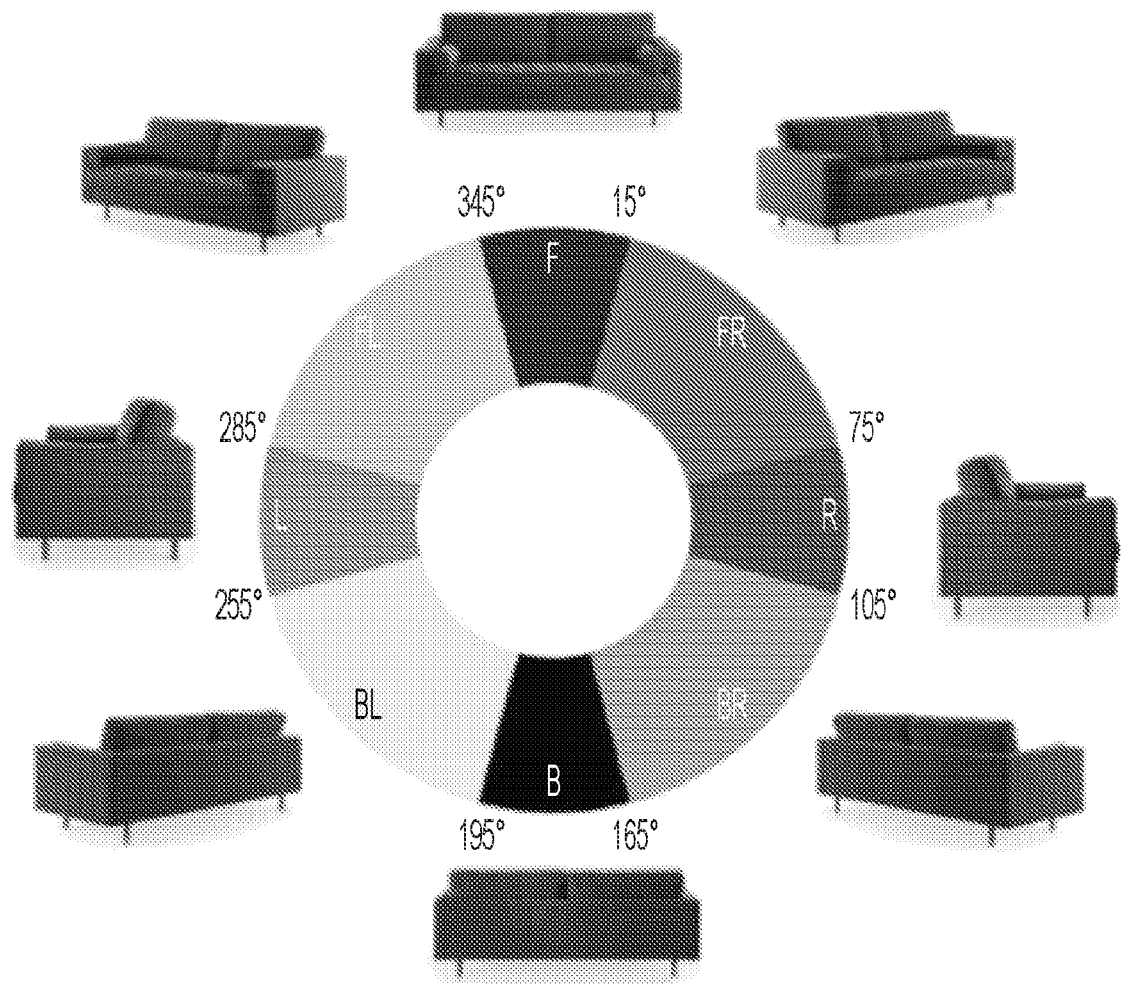
FIG. 17 shows examples of images of furniture with various orientations used for training neural networks, in accordance with some embodiments of the technology described herein.

FIG. 17 shows examples of images of furniture with various orientations used for training neural networks, in accordance with some embodiments of the technology described herein. In some embodiments, a training process may identify the shot-angle of each training images in the training data and tag the training images with shot-angles. The training process may use a shot-angle detection model trained on images of sofas. For each training image, the trained shot-angle detection model may be used to determine the shot-angle of the training image. In some examples, the shot-angle detection model may assign each training image into one of a plurality of classes. For example, the plurality of classes may include 0, 45, −45 degrees, where 45 and −45 degrees indicate non-front facing sofa images.

FIG. 18 shows an example web-based user interface 1800 that allows a user to vary characteristics of furniture shown in an image in order to generate a furniture image with which to search for one or more pieces of furniture, in accordance with some embodiments of the technology described herein. In some embodiments, the web-search user interface 1800 may be implemented in a system, such as system 100 of FIG. 1, 400 of FIG. 4, or in process 700 of FIG. 7. A user selection tool 1804 may be implemented in user interface 104 of FIG. 1. The system may provide user with an image 1802 in various ways, such as previously described in FIG. 1. For ease of description, descriptions of obtaining one or more images for user browsing are not repeated.

As shown in FIG. 18, user selection tool 1804 may include a plurality of slide bars. These slide bars may be configured to allow a user to change one or more furniture characteristics over a selected image, such as, width, height, orientation, color, and/or gloss of the furniture in the image. These slide bar may also be configured to allow a user to change characteristics of furniture materials and/or fabric, such as plush, color, material and/or pillow height. Other examples of furniture characteristics may include lighting, shadow, and/or any characteristics specific to certain materials, such as the grain of letter or texture of fabric, and/or gloss of paint etc. In the example shown, the user may use the user selection tool 1804 to adjust the values to one or more of the slide bars in the user selection tool 1804. The system (e.g., system 100 of FIG. 1) may use a neural network model (e.g., 112) to generate an output image using image 1802 as an input image and the user selection received from user's adjustments to the one of more slide bars. The system may return the resulting output image for display on the user device. For example, image 1802 may be updated to display the resulting output image.

Using the neural network model to generate the output image may be performed in real time because the neural network model is already trained. This allows the user to see the synthesized image instantly. As shown in the example in FIG. 18, the user may click a search button 1806 to search images using the synthesized image.

Figure 19:
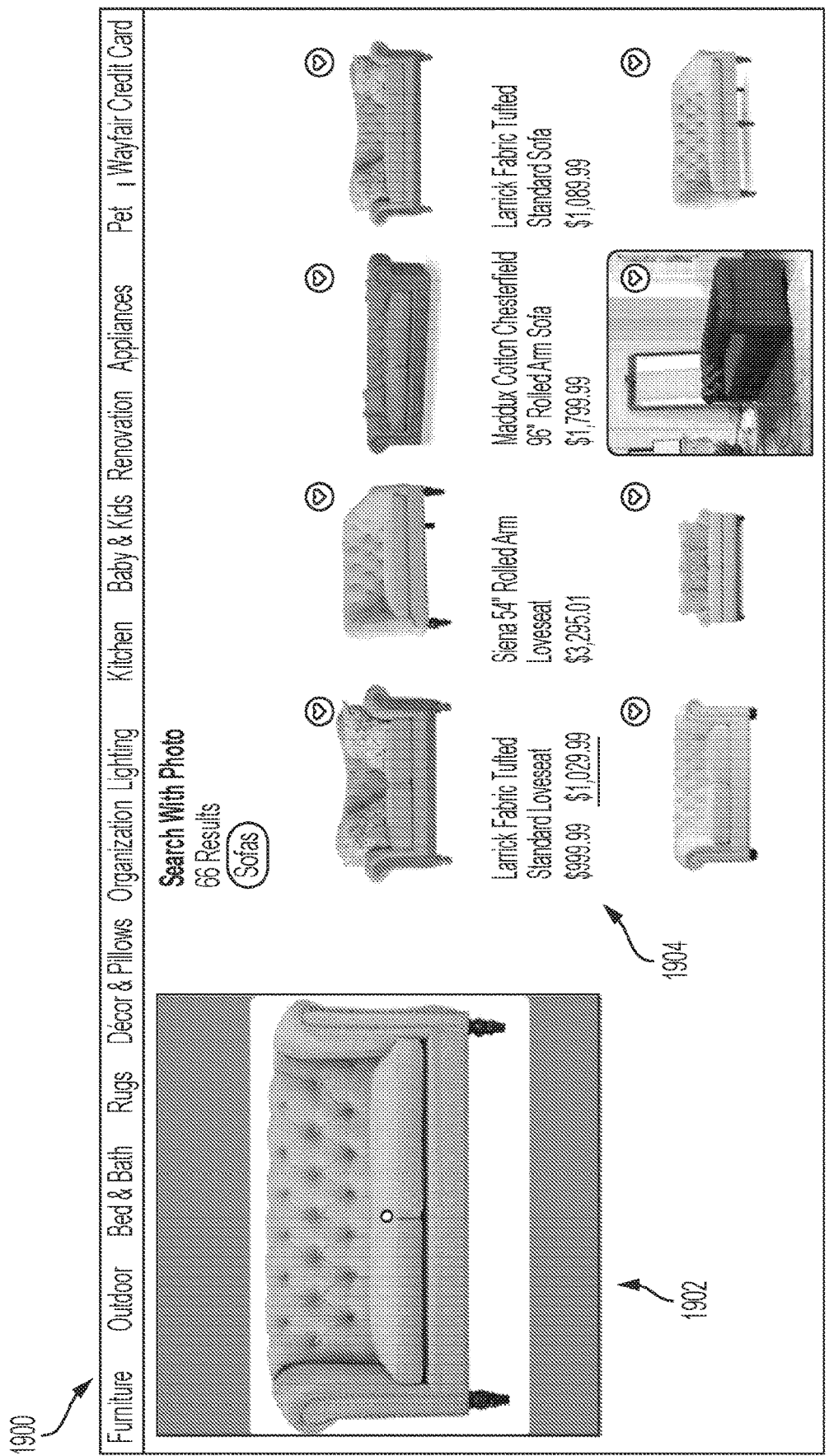
FIG. 19 shows an example web-based shopping system that allows users to search for furniture products using an image of furniture, in accordance with some embodiments of the technology described herein.

FIG. 19 shows an example web-based shopping system 1900 that allows users to search for furniture products using an image of furniture, in accordance with some embodiments of the technology described herein. In some embodiments, the shopping system 1900 may receive a visual query 1902 from a user, where the visual query is generated by a system previously described, such as, for example, system 100 of FIG. 1. For example, the visual query 1902 may be a synthesized image generated using a neural network model as described in various embodiments in FIGS. 1, 4-6 and processes described in FIGS. 7-10. The system 1900 may search for images of products using the visual query, and return images 1904 that contain furniture having similar characteristics of those in the visual query. As shown in FIG. 19, system 1900 helps to connect customers to the right products in a much faster way, without requiring specific language (e.g., text query) from the user to describe the products the customer is looking for, as in other conventional systems. This provides advantages in finding particular products that are difficult to describe or for customers that are not familiarized with usual search terms to convey what their ideal sofa looks like.

Figure 21B:
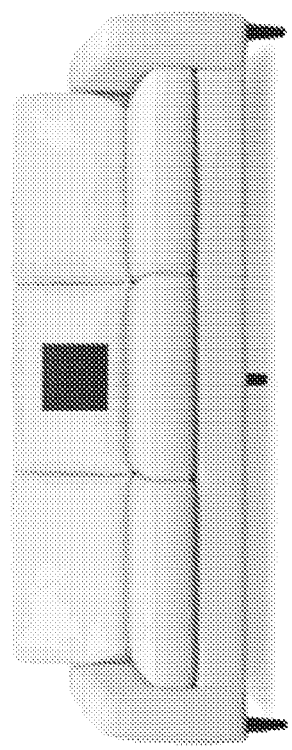
FIGS. 21A and 21B show examples of input images each overlaid with images showing a desired furniture characteristic (different colors, in this example), in accordance with some embodiments of the technology described herein.
Figure 21D:
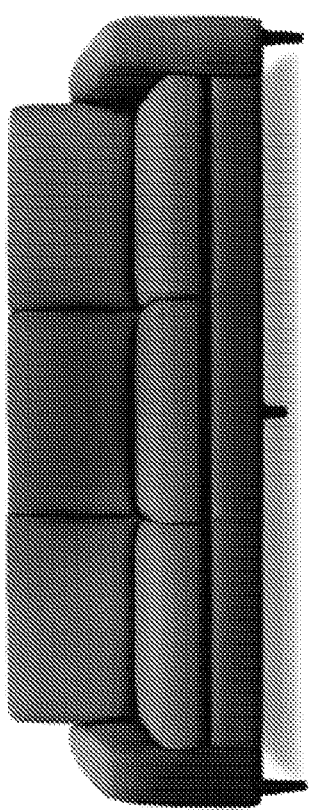
FIGS. 21C and 21D show examples of output images generated from the input images shown in FIGS. 21A and 21B respectively and the "missing characteristic" images with which the input images are overlaid, in accordance with some embodiments of the technology described herein.
Figure 21A:
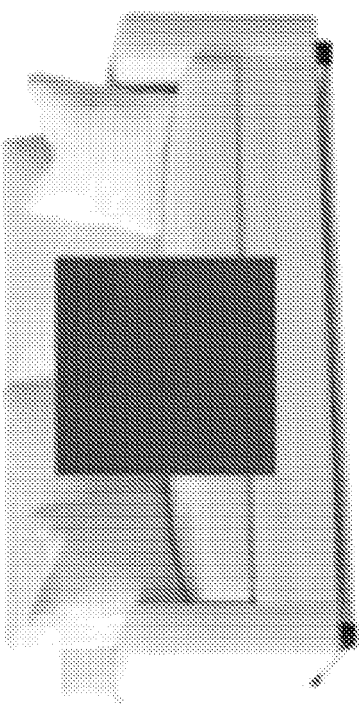
Figure 21C:
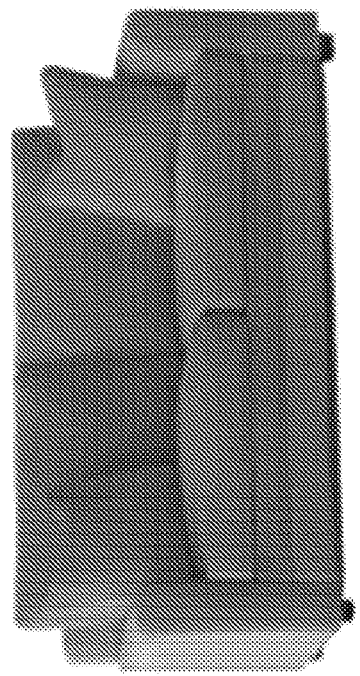

FIGS. 21C and 21D show examples of output images generated from the input images shown in FIGS. 21A and 21B respectively and the "missing characteristic" images with which the input images are overlaid, in accordance with some embodiments of the technology described herein. FIGS. 22A and 22B respectively show examples of input images and the input images overlaid with images showing desired furniture characteristics (different colors, in this example), in accordance with some embodiments of the technology described herein. FIGS. 22C and 22D show examples of output images generated from input images shown in FIG. 22A and the images shown in FIG. 22B, in accordance with some embodiments of the technology described herein. The output images in FIGS. 21C and 21D and FIGS. 22C and 22D may be generated using a neural network model as described in various embodiments in FIGS. 1, 5 and 8. By applying these techniques described in the present disclosure, synthesized output furniture images may be generated automatically where certain characteristics of furniture are replaced with desired characteristics that are not depicted (e.g., missing) in the input images. The synthesized output images may supplement the visual catalogue or online shopping system, such as shown in FIG. 19. Although masks are shown to enable a user to select desired missing characteristics, other tools may also be possible. Although color replacement is shown in FIGS. 21-22, other desired missing characteristics, such as materials, texture, gloss, or patterns may also be applied. These techniques provide advantages over some conventional systems that use graphical rendering techniques which require certain skills of the user. The techniques described in the present disclosure require little skill from the user, thus, non-experts could use tools to build synthesized images with complex patterns.

Figure 23:
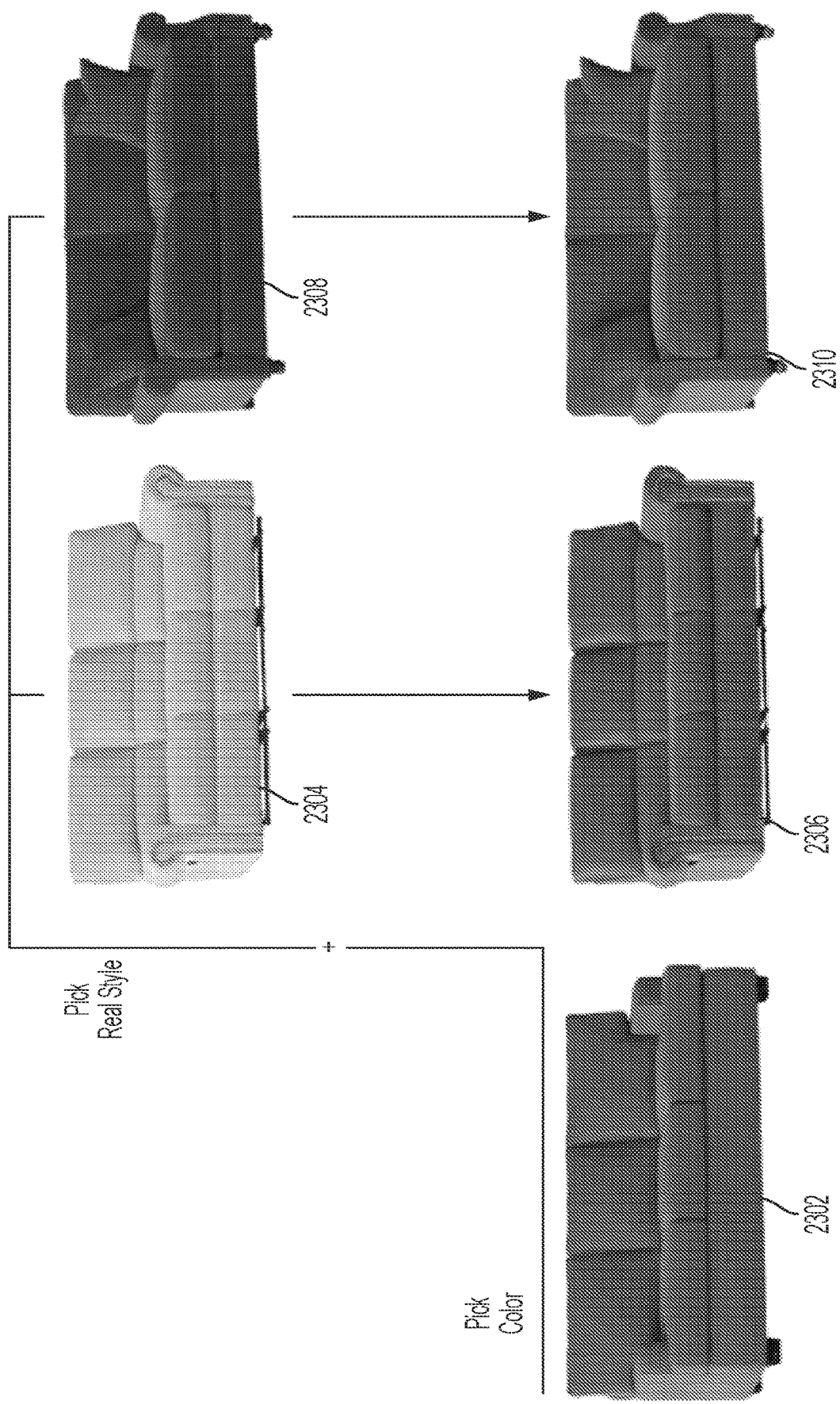
FIG. 23 shows example images each depicting furniture having a respective style and color, and output images depicting furniture with mixed style and color, in accordance with some embodiments of the technology described herein.

FIG. 23 shows example images each depicting furniture having a respective style and color, and output images depicting furniture with mixed style and color, in accordance with some embodiments of the technology described herein. In the examples shown, the system may allow a user to mix different furniture characteristics from different images and generate a synthesized output image that depicts furniture having mixed characteristics from different images. For example, the user may pick desired color from image 2302 and style from image 2304. The resultant image 2306 depicts another sofa that has the color from image 2303 and style from image 2304. In another example, the user may pick desired color from image 2302 and style from image 2308. The resultant image 2310 depicts another sofa that has the color from image 2303 and style from image 2308.

The output images 2306, 2310 may be generated using a neural network model as described in various embodiments in FIGS. 1, 5 and 9. By applying these techniques the system enables a user to create a hybrid furniture (e.g., a sofa hybrid) that incorporates all the features of a dream furniture. These techniques enable visual browsing in a shopping system where a customer can select products on site with desired features and use the generated examples to query for products that incorporate both desired traits. The combination of furniture characteristics described herein requires fewer computations than conventional systems, such as systems using graphical rendering techniques. Thus, the performance of systems that may employ the techniques described herein, such as online shopping system, may be improved in both speed and accuracy.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Figure 25:
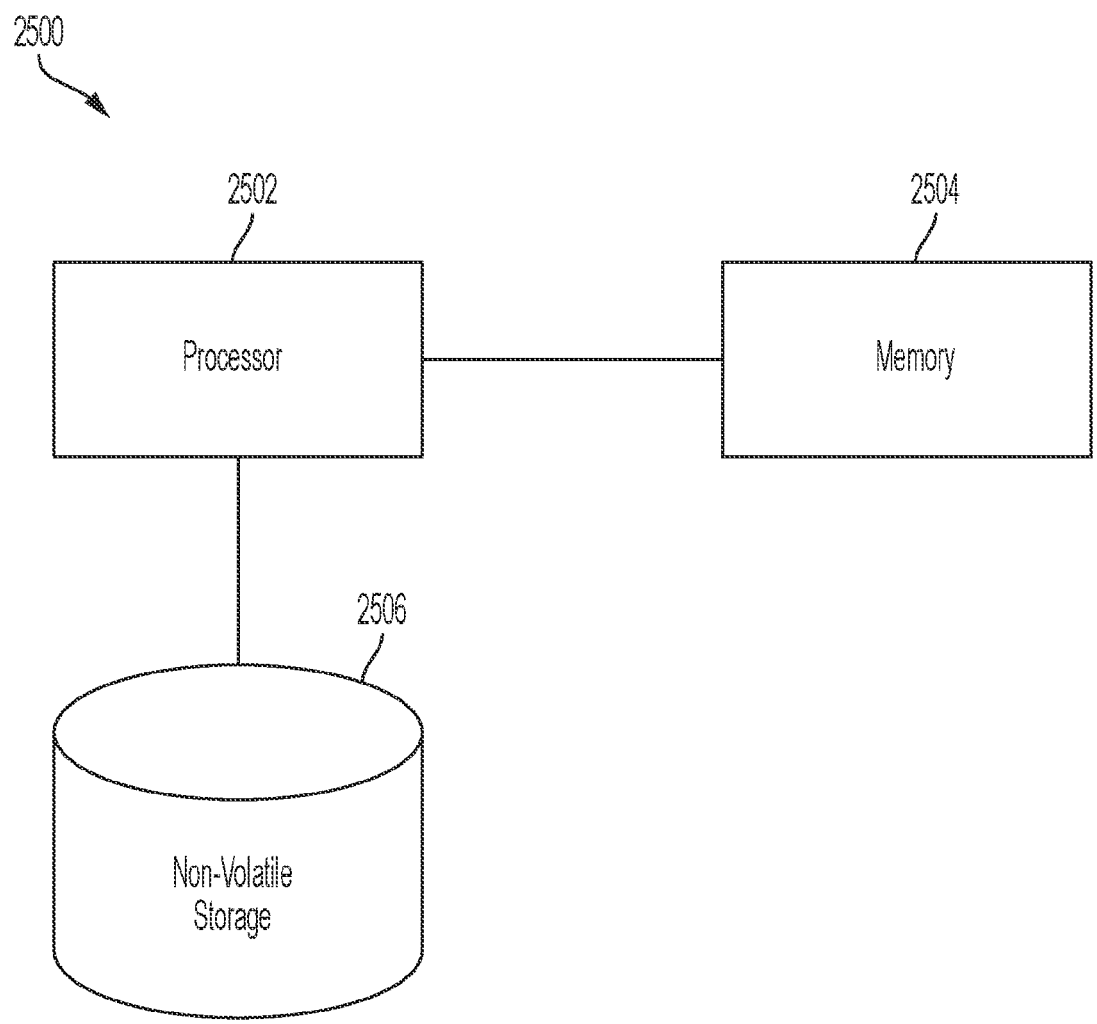
FIG. 25 shows a block diagram of a computing device, which may be used to implement some embodiments of the technology described herein.

FIG. 25 shows a block diagram of a computing device, which may implement some embodiments of the technology described herein. An illustrative implementation of a computing device 2500 that may be used in connection with any of the embodiments of the disclosure provided herein in FIGS. 1-24. The computing device 2500 may include one or more computer hardware processors 2502 and one or more articles of manufacture that comprise non-transitory computer-readable storage media (e.g., memory 2504 and one or more non-volatile storage devices 2506). The processor 2502(s) may control writing data to and reading data from the memory 2504 and the non-volatile storage device(s) 2506 in any suitable manner. To perform any of the functionality described herein, the processor(s) 2502 may execute one or more processor-executable instructions stored in one or more non-transitory computer-readable storage media (e.g., the memory 2504), which may serve as non-transitory computer-readable storage media storing processor-executable instructions for execution by the processor(s) 2502.

The terms "program" or "software" are used herein in a generic sense to refer to any type of computer code or set of processor-executable instructions that can be employed to program a computer or other processor (physical or virtual) to implement various aspects of embodiments as described above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

Various aspects are described in this disclosure, which include, but are not limited to, the following aspects:

(1) A method, comprising: using at least one computer hardware processor to perform: obtaining an input image depicting first furniture; obtaining, using a graphical user interface, at least one user selection indicative of a change in at least one furniture characteristic; and generating, using a neural network model, the input image, and the at least one user selection, an output image depicting second furniture different from the first furniture.

(2) The method of aspect 1, wherein obtaining the input image comprises: receiving the input image over at least one communication network or accessing the input image from a non-transitory computer-readable storage medium.

(3) The method of aspects 1 or 2, wherein obtaining the input image comprises: generating multiple images using respective points in a latent space associated with the neural network model; presenting the multiple images to a user using the graphical user interface; and receiving, using the graphical user interface, input indicative of a selection of one of the multiple images.

(4) The method of aspect 3, wherein generating multiple images comprises selecting the respective points in the latent space at random.

(5) The method of aspects 1 or 2, wherein generating the output image comprises: mapping the input image to a first point in a latent space associated with the neural network model; identifying a second point in the latent space using the first point and the at least one user selection; and generating the output image using the second point in the latent space.

(6) The method of any of aspects 3-5, wherein the latent space is one of an input latent space associated with the neural network model or an intermediate latent space associated with the neural network model.

(7) The method of aspects 5 or 6, wherein mapping the input image to the first point is performed using an iterative optimization technique to minimize an error between an image generated by the neural network from a point in the latent space and the input image.

(8) The method of any of aspects 7, wherein mapping the input image to the first point is performed further using an encoder network to determine an initial point in the latent space.

(9) The method of aspect 6, wherein the latent space is the intermediate space, wherein the first point comprises a plurality of values, wherein identifying the second point comprises identifying one or more changes in the plurality of values based on the at least one user selection.

(10) The method of aspect 6, wherein the neural network model comprises a generative network, the generative network comprising: a mapping network configured to map a point in the input latent space to a point in the intermediate latent space; and a synthesis network configured to generate images from respective points in the intermediate latent space.

(11) The method of aspects 6 or 10, wherein the first point and the second point are in the input latent space.

(12) The method of aspects 6 or 10, wherein the first point and the second point are in the intermediate latent space.

(13) The method of aspect 10, wherein generating the output image is performed using the synthesis network.

(14) The method of aspects 10 or 13, wherein generating the output image comprises performing operations in a plurality of layers in the synthesis network based on a plurality of control values each associated with a respective one of the plurality of layers.

(15) The method of aspect 14, wherein a point in the intermediate latent space has a plurality of values associated with respective dimensions in the intermediate latent space, and the method further comprising providing the plurality of control values based on one or more values of the point in the intermediate latent space.

(16) The method of aspect 1 or any other preceding aspects, further comprising displaying, in the graphical user interface, a graphical user element through which a user can provide the user selection indicative of the change in the at least one furniture characteristic.

(17) The method of aspect 16, wherein the graphical user element is a slide bar having a value range corresponding to the at least one furniture characteristic.

(18) The method of aspect 1 or any other preceding aspects, further comprising: transmitting the output image over at least one communication network to another electronic device.

(19) The method of aspect 1 or any other preceding aspects, further comprising using the output image to search for one or more images of furniture similar to the second furniture in the output image.

(20) The method of aspect 1 or any other preceding aspects, further comprising displaying the output image on a webpage.

(21) The method of aspect 1 or any other preceding aspects, further comprising displaying the output image in a virtual reality (VR) environment or an augmented reality (AR) environment.

(22) A system, comprising: at least one computer hardware processor; and at least one non-transitory computer-readable storage medium storing processor-executable instructions that, when executed by the at least one computer hardware processor, cause the at least one computer hardware processor to perform: (1) obtaining an input image depicting first furniture; (2) obtaining, using a graphical user interface, at least one user selection indicative of a change in at least one furniture characteristic; and (3) generating, using a neural network model, the input image, and the at least one user selection, an output image depicting second furniture different from the first furniture.

(23) At least one non-transitory computer-readable storage medium storing processor-executable instructions that, when executed by at least one computer hardware processor, cause the at least one computer hardware processor to perform: obtaining an input image depicting first furniture; obtaining, using a graphical user interface, at least one user selection indicative of a change in at least one furniture characteristic; and generating, using a neural network model, the input image, and the at least one user selection, an output image depicting second furniture different from the first furniture.

(24) A method, comprising: using at least one computer hardware processor to perform: obtaining an input image depicting furniture; obtaining information indicative of a furniture characteristic not depicted in the input image; and generating an output image using a neural network model, the input image, and the information indicative of the furniture characteristic not depicted in the input image.

(25) The method of aspect 24, wherein the information indicative of the furniture characteristic not depicted in the input image comprises an image depicting the furniture characteristic.

(26) The method of aspect 25, wherein the image depicting the furniture characteristic comprises an image of a material sample.

(27) The method of aspects 25 or 26, where generating the output image comprises: generating a mixed image by overlaying the input image with the image depicting the furniture characteristic; mapping the mixed image to a first point in a latent space associated with the neural network model; and identifying a second point in the latent space via an iterative search based on the first point in the latent space and an error metric computed in a region of the mixed image corresponding to the image depicting the furniture characteristic.

(28) The method of aspect 27, wherein the latent space is one of an input latent space associated with the neural network model or an intermediate latent space associated with the neural network model.

(29) The method of aspect 28, wherein the neural network model comprises a generative network, the generative network comprising: a mapping network configured to map a point in the input latent space to a point in the intermediate latent space; and a synthesis network configured to generate images from respective points in the intermediate latent space.

(30) The method of aspects 28 or 29, wherein the first point and the second point are in the input latent space.

(31) The method of aspects 28 or 29, wherein the first point and the second point are in the intermediate latent space.

(32) The method of aspect 29, wherein generating the output image is performed using the synthesis network.

(33) The method of aspects 29 or 32, wherein generating the output image comprises performing operations in a plurality of layers in the synthesis network based on a plurality of control values each associated with a respective one of the plurality of layers.

(34) The method of any of aspects 28-33, wherein a point in the intermediate latent space has a plurality of values associated with respective dimensions in the intermediate latent space, and the method further comprising providing the plurality of control values based on one or more values of the point in the intermediate latent space.

(35) The method of any of aspects 27-34, wherein mapping the mixed image to the first point is performed using an iterative optimization technique to minimize an error between an image generated by the neural network from a point in the latent space and the mixed image.

(36) The method of any of aspects 35, wherein mapping the mixed image to the first point is performed further using an encoder network to determine an initial point in the latent space.

(37) The method of aspect 24 or any other preceding aspects, further comprising: transmitting the output image over at least one communication network to another electronic device.

(38) The method of aspect 24 or any other preceding aspects, further comprising using the output image to search for one or more images of furniture having the furniture characteristic not depicted in the input image.

(39) The method of aspect 24 or any other preceding aspects, further comprising displaying the output image on a webpage.

(40) The method of aspect 24 or any other preceding aspects, further comprising displaying the output image in a virtual reality (VR) environment or an augmented reality (AR) environment.

(41) A system, comprising: at least one computer hardware processor; and at least one non-transitory computer-readable storage medium storing processor-executable instructions that, when executed by the at least one computer hardware processor, cause the at least one computer hardware processor to perform: (1) obtaining an input image depicting furniture; (2) obtaining information indicative of a furniture characteristic not depicted in the input image; and (3) generating an output image using a neural network model, the input image, and the information indicative of the furniture characteristic not depicted in the input image.

(42) At least one non-transitory computer-readable storage medium storing processor-executable instructions that, when executed by at least one computer hardware processor, cause the at least one computer hardware processor to perform: obtaining an input image depicting furniture; obtaining information indicative of a furniture characteristic not depicted in the input image; and generating an output image using a neural network model, the input image, and the information indicative of the furniture characteristic not depicted in the input image.

(43) A method for generating a furniture image by blending furniture images, the method comprising: using at least one computer hardware processor to perform: (1) obtaining a first image depicting first furniture having a first furniture characteristic; (2) obtaining a second image depicting second furniture having a second furniture characteristic; and (3) generating an output image using a neural network model, the first image and the second image, wherein the output image depicts third furniture different from the first furniture and the second furniture.

(44) The method of aspect 43, wherein: obtaining the first image comprises: (1) displaying, using a graphical user interface, a plurality of first images having the first furniture characteristic; and (2) receiving a user selection indicative of the first image from the plurality of first images; and obtaining the second image comprises: (1) displaying, using the graphical user interface, a plurality of second images having the second furniture characteristic; and (2) receiving a user selection indicative of the second image from the plurality of second images.

(45) The method of aspects 43 or 44, further comprising: obtaining the first image and the second image using a graphical user interface; obtaining, using the graphical user interface, a user selection indicative of mixing the first furniture characteristic in the first image with the second furniture characteristic in the second image; and generating the output image additionally using the user selection.

(46) The method of any of aspects 43-45, wherein generating the output image comprises: mapping the first image to a first point in a latent space associated with the neural network model; mapping the second image to a second point in the latent space associated with the neural network model; and generating the output image using the first point and the second point in the latent space.

(47) The method of aspect 46, wherein the latent space is one of an input latent space associated with the neural network model or an intermediate latent space associated with the neural network model.

(48) The method of aspect 47, wherein the neural network model comprises a generative network, the generative network comprising: a mapping network configured to map a point in the input latent space to a point in the intermediate latent space; and a synthesis network configured to generate images from respective points in the intermediate latent space.

(49) The method of aspects 47 or 48, wherein the first point and the second point are in the input latent space.

(50) The method of aspects 47 or 48, wherein the first point and the second point are in the intermediate latent space.

(51) The method of any of aspects 48, wherein generating the output image is performed using the synthesis network.

(52) The method of any of aspects 48 or 51, wherein generating the output image comprises performing operations in a plurality of layers in the synthesis network based on a plurality of control values each associated with a respective one of the plurality of layers.

(53) The method of aspect 52, wherein: a first set of control values in the plurality of control values are provided based on the first point in the latent space; and a second set of control values in the plurality of control values are provided based on the second point in the latent space.

(54) The method of any of aspects 46-53, wherein: mapping the first image to the first point is performed using an iterative optimization technique to minimize an error between an image generated by the neural network from a point in the latent space and the first image; and mapping the second image to the second point is performed using an iterative optimization technique to minimize an error between an image generated by the neural network from a point in the latent space and the second image.

(55) The method of any of aspects 54, wherein: mapping the first image to the first point is performed further using an encoder network to determine a first initial point in the latent space; and mapping the second image to the second point is performed further using an encoder network to determine a second initial point in the latent space.

(56) The method of aspect 43 or any other preceding aspects, further comprising: transmitting the output image over at least one communication network to another electronic device.

(57) The method of aspect 43 or any other preceding aspects, further comprising using the output image to search for one or more images of furniture similar to the third furniture in the output image.

(58) The method of aspect 43 or any other preceding aspects, further comprising displaying the output image on a webpage.

(59) The method of aspect 43 or any other preceding aspects, further comprising displaying the output image in a virtual reality (VR) environment or an augmented reality (AR) environment.

(60) A system, comprising: at least one computer hardware processor; and at least one non-transitory computer-readable storage medium storing processor-executable instructions that, when executed by the at least one computer hardware processor, cause the at least one computer hardware processor to perform a method for generating a furniture image by blending furniture images, the method comprising: (1) obtaining a first image depicting first furniture having a first furniture characteristic; (2) obtaining a second image depicting second furniture having a second furniture characteristic; and (3) generating an output image using a neural network model, the first image and the second image, wherein the output image depicts third furniture different from the first furniture and the second furniture.

(61) At least one non-transitory computer-readable storage medium storing processor-executable instructions that, when executed by the at least one computer hardware processor, cause the at least one computer hardware processor to perform a method for generating a furniture image by blending furniture images, the method comprising: obtaining a first image depicting first furniture having a first furniture characteristic; obtaining a second image depicting second furniture having a second furniture characteristic; and generating an output image using a neural network model, the first image and the second image, wherein the output image depicts third furniture different from the first furniture and the second furniture.

(62) A method, comprising: using at least one computer hardware processor to perform: obtaining a first image depicting first furniture; generating, using the first image and a neural network model, a second image depicting second furniture different from the first furniture; searching for one or more images of furniture similar to the second furniture using the second image to obtain search results comprising a third image of furniture; and outputting the third image.

(63) The method of aspect 62, wherein generating the third image further comprises: receiving user input indicative of a change in a furniture characteristic; and generating the second image further based on the user input.

(64) The method of aspect 63, wherein receiving the user input comprises: displaying, in a graphical user interface, a graphical element through which a user can provide input indicative of the change in the furniture characteristic.

(65) The method of aspect 64, wherein the graphical element is a slide bar.

(66) The method of any of aspects 63-65, wherein generating the second image comprises: mapping the first image to a first point in a latent space associated with the neural network model; identifying a second point in the latent space using the first point and the change in the furniture characteristic; and generating the second image using the second point in the latent space and the neural network model.

(67) The method of any of aspects 63-65, wherein the user input comprises information indicative of a furniture characteristic not depicted in the first image.

(68) The method of aspect 67, wherein the information indicative of the furniture characteristic not depicted in the first image comprises an image depicting the furniture characteristic.

(69) The method of aspect 68, wherein generating the second image further comprises: generating a mixed image by overlaying the first image with the image depicting the furniture characteristic; mapping the mixed image to a first point in a latent space associated with the neural network model; and identifying a second point in the latent space via an iterative search based on the first point in the latent space and an error metric computed in a region of the mixed image corresponding to the image depicting the furniture characteristic.

(70) The method of any of aspects 63-65, 67 and 68, wherein the first furniture includes a first furniture characteristic, the method further comprising: obtaining a fourth image depicting third furniture having a second furniture characteristic; and generating the second image further using the fourth image.

(71) The method of aspect 70, wherein generating the second image further comprising: mapping the first image to a first point in a latent space associated with the neural network model; mapping the fourth image to a second point in the latent space associated with the neural network model; and generating the second image using the first and second points in the latent space.

(72) The method of any of aspects 62-71, wherein generating the second image comprises: performing operations in a plurality of layers in the neural network model responsive to a plurality of control values each associated with a respective one of the plurality of layers.

(73) The method of aspect 72, wherein: a first set of control values in the plurality of control values are provided responsive to the first point in the latent space; and a second set of control values in the plurality of control values are provided responsive to the second point in the latent space.

(74) The method of aspect 62 or any other preceding aspects, wherein the third image depicts furniture that matches the second furniture.

(75) A system, comprising: at least one computer hardware processor; and at least one non-transitory computer-readable storage medium storing processor-executable instructions that, when executed by the at least one computer hardware processor, cause the at least one computer hardware processor to perform: (1) obtaining a first image depicting first furniture; (2) generating, using the first image and a neural network model, a second image depicting second furniture different from the first furniture; (3) searching for one or more images of furniture similar to the second furniture using the second image to obtain search results comprising a third image of furniture; and (4) outputting the third image.

(76) At least one non-transitory computer-readable storage medium storing processor-executable instructions that, when executed by the at least one computer hardware processor, cause the at least one computer hardware processor to perform: obtaining a first image depicting first furniture; generating, using the first image and a neural network model, a second image depicting second furniture different from the first furniture; searching for one or more images of furniture similar to the second furniture using the second image to obtain search results comprising a third image of furniture; and outputting the third image.

What is claimed is:

1. A method, comprising:
using at least one computer hardware processor to perform:
obtaining an input image depicting first furniture, wherein obtaining the input image comprises:
generating multiple images using respective points in a latent space associated with a neural network model;
presenting the multiple images to a user using a graphical user interface; and
receiving, using the graphical user interface, input indicative of a selection of one of the multiple images;
obtaining, using the graphical user interface, at least one user selection indicative of a change in at least one furniture characteristic; and
generating, using the neural network model, the input image, and the at least one user selection, an output image depicting second furniture different from the first furniture.

2. The method of claim 1, wherein obtaining the input image comprises:
receiving the input image over at least one communication network or accessing the input image from a non-transitory computer-readable storage medium.

3. The method of claim 1, wherein generating the multiple images comprises selecting the respective points in the latent space at random.

4. The method of claim 1, wherein generating the output image comprises:
mapping the input image to a first point in the latent space associated with the neural network model;
identifying a second point in the latent space using the first point and the at least one user selection; and
generating the output image using the second point in the latent space.

5. The method of claim 4, wherein the latent space is one of an input latent space associated with the neural network model or an intermediate latent space associated with the neural network model.

6. The method of claim 5, wherein the latent space is the intermediate latent space, wherein the first point comprises a plurality of values, wherein identifying the second point comprises identifying one or more changes in the plurality of values based on the at least one user selection.

7. The method of claim 5, wherein the neural network model comprises a generative network, the generative network comprising:

a mapping network configured to map a point in the input latent space to a point in the intermediate latent space; and a synthesis network configured to generate images from respective points in the intermediate latent space.

8. The method of claim 7, wherein generating the output image is performed using the synthesis network, and generating the output image further comprises:

performing operations in a plurality of layers in the synthesis network based on a plurality of control values each associated with a respective one of the plurality of layers.

9. The method of claim 8, wherein a point in the intermediate latent space has a plurality of values associated with respective dimensions in the intermediate latent space, and the method further comprising providing the plurality of control values based on one or more values of the point in the intermediate latent space.

10. The method of claim 5, wherein the first point and the second point are in the input latent space or the intermediate latent space.

11. The method of claim 4, wherein mapping the input image to the first point is performed using an iterative optimization technique to minimize an error between an image generated by the neural network model from a point in the latent space and the input image.

12. The method of claim 11, wherein mapping the input image to the first point is performed further using an encoder network to determine an initial point in the latent space.

13. The method of claim 1, further comprising:

displaying, in the graphical user interface, a graphical user element through which the user can provide the at least one user selection indicative of the change in the at least one furniture characteristic.

14. The method of claim 13, wherein the graphical user element is a slide bar having a value range corresponding to the at least one furniture characteristic.

15. The method of claim 1, further comprising:

transmitting the output image over at least one communication network to another electronic device.

16. The method of claim 1, further comprising using the output image to search for one or more images of furniture similar to the second furniture in the output image.

17. The method of claim 1, further comprising displaying the output image on a webpage, in a virtual reality (VR) environment or an augmented reality (AR) environment.

18. A system, comprising:

at least one computer hardware processor; and at least one non-transitory computer-readable storage medium storing processor-executable instructions that, when executed by the at least one computer hardware processor, cause the at least one computer hardware processor to perform:

obtaining an input image depicting first furniture, wherein obtaining the input image comprises:

generating multiple images using respective points in a latent space associated with a neural network model;

presenting the multiple images to a user using a graphical user interface; and receiving, using the graphical user interface, input indicative of a selection of one of the multiple images;

obtaining, using the graphical user interface, at least one user selection indicative of a change in at least one furniture characteristic; and generating, using the neural network model, the input image, and the at least one user selection, an output image depicting second furniture different from the first furniture.

19. At least one non-transitory computer-readable storage medium storing processor-executable instructions that, when executed by at least one computer hardware processor, cause the at least one computer hardware processor to perform:

obtaining an input image depicting first furniture, wherein obtaining the input image comprises:

generating multiple images using respective points in a latent space associated with a neural network model;

presenting the multiple images to a user using a graphical user interface; and receiving, using the graphical user interface, input indicative of a selection of one of the multiple images;

obtaining, using the graphical user interface, at least one user selection indicative of a change in at least one furniture characteristic; and generating, using the neural network model, the input image, and the at least one user selection, an output image depicting second furniture different from the first furniture.

* * * * *